United States Patent
Moritz et al.

(10) Patent No.: US 11,299,621 B2
(45) Date of Patent: Apr. 12, 2022

(54) ANTI-BLUSH AND CHEMICAL RESISTANT POLYESTER FILM

(71) Applicant: Toray Plastics (America), Inc., North Kingstown, RI (US)

(72) Inventors: Jan Moritz, Bristol, RI (US); Robert Ervolino, Foster, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 304 days.

(21) Appl. No.: 16/223,144

(22) Filed: Dec. 18, 2018

(65) Prior Publication Data
US 2020/0190315 A1   Jun. 18, 2020

(51) Int. Cl.
| | |
|---|---|
| *C08L 67/02* | (2006.01) |
| *C08K 5/527* | (2006.01) |
| *B32B 27/36* | (2006.01) |
| *B32B 15/08* | (2006.01) |
| *C08L 67/03* | (2006.01) |
| *C08K 5/52* | (2006.01) |

(52) U.S. Cl.
CPC .............. *C08L 67/02* (2013.01); *B32B 15/08* (2013.01); *B32B 27/36* (2013.01); *C08K 5/527* (2013.01); *B32B 2307/40* (2013.01); *C08K 5/52* (2013.01); *C08L 67/03* (2013.01); *C08L 2203/16* (2013.01); *C08L 2205/025* (2013.01); *Y10T 428/31681* (2015.04); *Y10T 428/31786* (2015.04)

(58) Field of Classification Search
None
See application file for complete search history.

(56) References Cited

U.S. PATENT DOCUMENTS

| | | | | |
|---|---|---|---|---|
| 3,141,032 A | * | 7/1964 | Friedman ................ | C08L 27/06 558/77 |
| 3,920,607 A | * | 11/1975 | Scott ...................... | C08K 5/527 524/117 |
| 4,154,775 A | * | 5/1979 | Axelrod .................. | C08K 5/527 524/120 |

(Continued)

FOREIGN PATENT DOCUMENTS

| | | | |
|---|---|---|---|
| CN | 106317792 A | * | 1/2017 |
| CN | 107057300 A | * | 8/2017 |

(Continued)

OTHER PUBLICATIONS

CN 107057300 A (Yao et al) (published Aug. 18, 2017) full English translation (Year: 2017).*

(Continued)

*Primary Examiner* — Vivian Chen
(74) *Attorney, Agent, or Firm* — Dave Law Group LLC; Raj S. Dave

(57) ABSTRACT

Embodiments herein relate to a polymer film comprising an anti-blushing composition in a blend comprising polyethylene terephthalate (PET) and polybutylene terephthalate (PBT); wherein the blend contains at least 50 wt. % of PBT; wherein the anti-blushing composition comprises a phosphorus containing compound but excludes certain phosphorus compounds; and wherein the anti-blushing composition is configured to prevent blushing in the polymer film laminated directly to a metal substrate sheet and exposed to steam at a temperature of 260° F. for 90 minutes.

19 Claims, 39 Drawing Sheets

(56) References Cited

U.S. PATENT DOCUMENTS

| | | | | |
|---|---|---|---|---|
| 4,390,477 | A | * | 6/1983 | Axelrod ............ C07F 9/657181 524/120 |
| 4,665,211 | A | * | 5/1987 | Marlin ................ C07F 9/65746 558/78 |
| 4,692,539 | A | * | 9/1987 | Spivack .............. C07F 9/65746 524/120 |
| 4,739,090 | A | * | 4/1988 | Tajima ................ C07F 9/65746 558/78 |
| 5,103,035 | A | * | 4/1992 | Elnagar ............... C07F 9/65746 558/78 |
| 11,110,688 | B2 | * | 9/2021 | Moritz ................. C08K 5/5333 |
| 2002/0040081 | A1 | * | 4/2002 | Stein ..................... C08K 5/526 524/121 |
| 2002/0102419 | A1 | * | 8/2002 | Kawahara ............... B32B 27/36 428/458 |
| 2004/0219316 | A1 | * | 11/2004 | Takahashi .................. C08J 5/18 428/35.7 |
| 2005/0053796 | A1 | * | 3/2005 | Kawahara .................. C08J 5/18 428/480 |
| 2005/0118442 | A1 | * | 6/2005 | Itoh ........................ B32B 27/36 428/480 |
| 2005/0131244 | A1 | * | 6/2005 | Larke .................. C07F 9/65746 558/78 |
| 2005/0191483 | A1 | * | 9/2005 | Yoshida .................. B32B 15/08 428/332 |
| 2006/0116526 | A1 | * | 6/2006 | Tanabe .............. C07F 9/657181 558/77 |
| 2016/0280911 | A1 | | 9/2016 | Mamino et al. |
| 2018/0044490 | A1 | | 2/2018 | Moritz et al. |
| 2018/0104930 | A1 | * | 4/2018 | Lin ........................ B32B 37/06 |
| 2020/0009835 | A1 | * | 1/2020 | Moritz ................. C08K 5/5333 |

FOREIGN PATENT DOCUMENTS

| | | | |
|---|---|---|---|
| JP | 2002-037973 A | * | 2/2002 |
| KR | 1999-0065021 A | | 8/1999 |
| WO | WO 92/02584 A | * | 2/1992 |

OTHER PUBLICATIONS

"PubChem—Ultranox 626—3,9-Bis(2,4-di-tert-butylphenoxy)-2,4,8,10-tetraoxa-3,9-diphosphaspiro[5.5]undecane" (https://pubchem.ncbi.nlm.nih.gov/compound/Antioxidant-24) (webpage retrieved May 27, 2021) (2021). (Year: 2021).*

"Additives For Polymers—Ultranox 626" (https://www.additivesforpolymer.com/portfolio/antioxidant-626/) (webpage retrieved May 27, 2021) (2021). (Year: 2021).*

International Search Report and Written Opinion dated Feb. 18, 2020 for PCT Application No. PCT/US2019/064345.

* cited by examiner or

MS Spectrum Peak List

| m/z | Calc m/z | Diff(ppm) | z | Abund | Ion |
|---|---|---|---|---|---|
| 595.1 | 595.1 | 0.21 | 1 | 30594.84 | (M+H)+ |
| 596.1 | 596.1 | 0.7 | 1 | 9815.26 | (M+H)+ |
| 597.2 | 597.2 | -1.32 | 1 | 2274.85 | (M+H)+ |
| 598.2 | 598.2 | -8.73 | 1 | 434.63 | (M+H)+ |
| 612.2 | 612.2 | -0.65 | 1 | 62260.34 | (M+NH4)+ |
| 613.2 | 613.2 | 0.37 | 1 | 20582.04 | (M+NH4)+ |
| 614.2 | 614.2 | -2.2 | 1 | 5443.41 | (M+NH4)+ |
| 617.1 | 617.1 | -0.01 | 1 | 12787.3 | (M+Na)+ |
| 618.1 | 618.1 | 0.1 | 1 | 4305.44 | (M+Na)+ |
| 619.1 | 619.1 | -9.64 | 1 | 1569.35 | (M+Na)+ |

| m/z | Calc m/z | Diff(ppm) | z | Abund | Ion |
|---|---|---|---|---|---|
| 473.1 | 473.1 | -1 | 1 | 84081.54 | (M+H)+ |
| 474.1 | 474.1 | 0.02 | 1 | 22199.59 | (M+H)+ |
| 475.2 | 475.2 | -3.03 | 1 | 5927.41 | (M+H)+ |
| 490.2 | 490.2 | -0.32 | 1 | 51004.03 | (M+NH4)+ |
| 491.2 | 491.2 | 0.73 | 1 | 14218.87 | (M+NH4)+ |
| 492.2 | 492.2 | 7.55 | 1 | 3518.89 | (M+NH4)+ |
| 495.1 | 495.1 | 0.06 | 1 | 21323.4 | (M+Na)+ |
| 496.1 | 496.1 | 0.12 | 1 | 5763.11 | (M+Na)+ |
| 497.1 | 497.1 | -5.2 | 1 | 6253.93 | (M+Na)+ |
| 498.1 | 498.1 | -20.73 | 1 | 1146.72 | (M+Na)+ |

MS Spectrum Peak List

| m/z | Calc m/z | Diff(ppm) | z | Abund | Ion |
|---|---|---|---|---|---|
| 429.1 | 429.1 | -1.17 | 1 | 126382.92 | (M+H)+ |
| 430.1 | 430.1 | -0.52 | 1 | 29829.52 | (M+H)+ |
| 431.1 | 431.1 | -3.04 | 1 | 6341.44 | (M+H)+ |
| 446.1 | 446.1 | -0.55 | 1 | 260264.59 | (M+NH4)+ |
| 447.1 | 447.1 | -0.34 | 1 | 62489.57 | (M+NH4)+ |
| 448.2 | 448.2 | -3.62 | 1 | 14585.21 | (M+NH4)+ |
| 449.2 | 449.2 | -7.7 | 1 | 2322.13 | (M+NH4)+ |
| 451.1 | 451.1 | -0.16 | 1 | 49918.38 | (M+Na)+ |
| 452.1 | 452.1 | 0.55 | 1 | 11458.17 | (M+Na)+ |
| 453.1 | 453.1 | -2.31 | 1 | 2705.86 | (M+Na)+ |

MS Spectrum Peak List

| m/z | Calc m/z | Diff(ppm) | z | Abund | Ion |
|---|---|---|---|---|---|
| 429.1 | | | | 162912.01 | |
| 429.1 | 429.1 | -0.65 | 1 | 162939.34 | (M+H)+ |
| 430.1 | 430.1 | -0.28 | 1 | 39657.26 | (M+H)+ |
| 431.1 | 431.1 | -1.97 | 1 | 7811.15 | (M+H)+ |
| 432.1 | 432.1 | -1.46 | 1 | 1213.49 | (M+H)+ |
| 433.1 | 433.1 | -0.02 | 1 | 141.58 | (M+H)+ |

MS Spectrum Peak List

| m/z | Calc m/z | Diff(ppm) | z | Abund | Ion |
|---|---|---|---|---|---|
| 441.2 | 441.2 | -0.41 | 1 | 45647.56 | (M+H)+ |
| 442.2 | 442.2 | 1.04 | 1 | 12175 | (M+H)+ |
| 443.2 | 443.2 | -0.27 | 1 | 2546.18 | (M+H)+ |
| 458.2 | 458.2 | -0.18 | 1 | 408799.94 | (M+NH4)+ |
| 459.2 | 459.2 | -1.11 | 1 | 110895.19 | (M+NH4)+ |
| 460.2 | 460.2 | -2.74 | 1 | 23431.89 | (M+NH4)+ |
| 461.2 | 461.2 | -6.58 | 1 | 3160.02 | (M+NH4)+ |
| 463.1 | 463.1 | -0.12 | 1 | 16322.09 | (M+Na)+ |
| 464.1 | 464.1 | 0.34 | 1 | 4491.5 | (M+Na)+ |
| 465.1 | 465.1 | -8.32 | 1 | 1280.01 | (M+Na)+ |

MS Spectrum Peak List

| m/z | Calc m/z | Diff(ppm) | z | Abund | Ion |
|---|---|---|---|---|---|
| 401.1 | | | | 79087.85 | |
| 401.1 | 401.1 | 1.02 | 1 | 79094.99 | (M-H)- |
| 402.1 | 402.1 | 1.81 | 1 | 16784.54 | (M-H)- |
| 403.1 | 403.1 | 1.83 | 1 | 3228.97 | (M-H)- |
| 404.1 | 404.1 | 2.17 | 1 | 531.61 | (M-H)- |

MS Spectrum Peak List

| m/z | Calc m/z | Diff(ppm) | z | Abund | Ion |
|---|---|---|---|---|---|
| 429.1 | | | | 162912.01 | |
| 429.1 | 429.1 | -0.65 | 1 | 162939.34 | (M+H)+ |
| 430.1 | 430.1 | -0.28 | 1 | 39657.26 | (M+H)+ |
| 431.1 | 431.1 | -1.97 | 1 | 7811.15 | (M+H)+ |
| 432.1 | 432.1 | -1.46 | 1 | 1213.49 | (M+H)+ |
| 433.1 | 433.1 | -0.02 | 1 | 141.58 | (M+H)+ |

MS Spectrum Peak List

| m/z | Calc m/z | Diff(ppm) | z | Abund | Ion |
|---|---|---|---|---|---|
| 399.3 | | | | 77024.28 | |
| 399.3 | 399.3 | -1.64 | 1 | 77027.45 | (M+H)+ |
| 400.3 | 400.3 | -0.33 | 1 | 14967.49 | (M+H)+ |
| 401.3 | 401.3 | 0.95 | 1 | 2548.42 | (M+H)+ |
| 402.3 | 402.3 | -6.5 | 1 | 327.35 | (M+H)+ |
| 421.2 | 421.2 | 2.18 | 1 | 2727.47 | (M+Na)+ |
| 422.2 | 422.2 | -8.63 | 1 | 400.75 | (M+Na)+ | or

MS Spectrum Peak List

| m/z | Calc m/z | Diff(ppm) | z | Abund | Ion |
|---|---|---|---|---|---|
| 513.2 | 513.2 | -1.38 | 1 | 108820.37 | (M+H)+ |
| 514.2 | 514.2 | -0.13 | 1 | 33527.3 | (M+H)+ |
| 515.2 | 515.2 | 1.03 | 1 | 7057.72 | (M+H)+ |
| 516.2 | 516.2 | -0.14 | 1 | 1026.06 | (M+H)+ |
| 530.2 | 530.2 | -0.42 | 1 | 61381.19 | (M+NH4)+ |
| 531.2 | 531.2 | -0.02 | 1 | 18476.67 | (M+NH4)+ |
| 532.2 | 532.2 | -0.12 | 1 | 3974.47 | (M+NH4)+ |
| 535.2 | 535.2 | 0.23 | 1 | 43057.27 | (M+Na)+ |
| 536.2 | 536.2 | 0.1 | 1 | 13003.38 | (M+Na)+ |
| 537.2 | 537.2 | -0.26 | 1 | 2723.12 | (M+Na)+ | or

MS Spectrum Peak List

| m/z | Calc m/z | Diff(ppm) | z | Abund | Ion |
|---|---|---|---|---|---|
| 577.1 | | | | 58594.19 | |
| 577.1 | 577.1 | -0.48 | 1 | 58603.84 | (M+H)+ |
| 578.1 | 578.1 | -0.12 | 1 | 18205.24 | (M+H)+ |
| 579.1 | 579.1 | -0.25 | 1 | 4492.45 | (M+H)+ |
| 580.1 | 580.1 | -3.07 | 1 | 839.37 | (M+H)+ |
| 581.1 | 581.1 | -6.71 | 1 | 52.63 | (M+H)+ |

MS Spectrum Peak List

| m/z | Calc m/z | Diff(ppm) | z | Abund | Ion |
|---|---|---|---|---|---|
| 513.2 | 513.2 | -1.38 | 1 | 108820.37 | (M+H)+ |
| 514.2 | 514.2 | -0.13 | 1 | 33527.3 | (M+H)+ |
| 515.2 | 515.2 | 1.03 | 1 | 7057.72 | (M+H)+ |
| 516.2 | 516.2 | -0.14 | 1 | 1026.06 | (M+H)+ |
| 530.2 | 530.2 | -0.42 | 1 | 61381.19 | (M+NH4)+ |
| 531.2 | 531.2 | -0.02 | 1 | 18476.67 | (M+NH4)+ |
| 532.2 | 532.2 | -0.12 | 1 | 3974.47 | (M+NH4)+ |
| 535.2 | 535.2 | 0.23 | 1 | 43057.27 | (M+Na)+ |
| 536.2 | 536.2 | 0.1 | 1 | 13003.38 | (M+Na)+ |
| 537.2 | 537.2 | -0.26 | 1 | 2723.12 | (M+Na)+ |

MS Spectrum Peak List

| m/z | Calc m/z | Diff(ppm) | z | Abund | Ion |
|---|---|---|---|---|---|
| 399.3 | | | | 77024.28 | |
| 399.3 | 399.3 | -1.64 | 1 | 77027.45 | (M+H)+ |
| 400.3 | 400.3 | -0.33 | 1 | 14967.49 | (M+H)+ |
| 401.3 | 401.3 | 0.95 | 1 | 2548.42 | (M+H)+ |
| 402.3 | 402.3 | -6.5 | 1 | 327.35 | (M+H)+ |
| 421.2 | 421.2 | 2.18 | 1 | 2727.47 | (M+Na)+ |
| 422.2 | 422.2 | -8.63 | 1 | 400.75 | (M+Na)+ |

ANTI-BLUSH AND CHEMICAL RESISTANT POLYESTER FILM

CROSS REFERENCE TO RELATED APPLICATIONS

This application is related to U.S. application Ser. No. 15/879,167, filed Jan. 24, 2019 (now U.S. Pat. No. 10,016,963, issued Jul. 10, 2018), entitled "Method of Packaging Product in Container with Blush and Chemical Resistant Polyester Film,", which is a divisional of U.S. application Ser. No. 14/555,542, filed Nov. 26, 2014, now U.S. Pat. No. 9,956,747, issued May 1, 2018, entitled "Blush and Chemical Resistant Polyester Film,", which claims priority from U.S. Provisional Application No. 61/989,605, filed May 7, 2014. The above mentioned cross referenced, related applications, and all patents and patent publications mentioned in the application are incorporated herein by reference in their entirety.

FIELD OF THE INVENTION

An embodiment herein relates to films made from blends of polyethylene terephthalate (PET) and polybutylene terephthalate (PBT) to be used in conjunction with metal cans so that the films can resist blushing or discoloration resulting from exposure to high temperature, steam and hot water during cooking and high temperature sterilization of the food contents stored in the metal cans and the films provide protective barriers or interface layers to maintain a safe and stable environment during food preparation, sterilization and storage.

BACKGROUND OF THE INVENTION

Metal containers are used for storage of many different materials in industrial and retail consumer product containment applications. Well known examples of consumer metal storage container include food cans, beverage cans, aerosol spray product cans and the like. Polymer films such as polyester films of various compositions are commonly laminated onto the can metal surface to provide a protective barrier against corrosive environmental conditions. These barrier films are typically laminated onto both sides of the metal containers so that the inner and outer metal surfaces of the container are protected from degradation by the internal contained material and the external ambient environment, respectively. In the case of food containers, after containers are filled, they are exposed to a retort process that typically involves the use of heated aqueous media or live steam to cook the food contents inside the metal containers followed by sterilization of the cooked food. It is thus both desirable and essential that the plastic and metal laminate structure of the container be able to withstand direct contact with heated aqueous media or live steam experienced during retort process conditions and have sufficient resistance to chemicals and chemically aggressive foods that may be stored in containers made from the metal and polymer film laminates.

Retort processing of the containers can adversely affect the quality or the properties of the polymer in the metal and polymer laminates used to line both the outside and inside surface the containers. An area of particular interest is a visually observable defect on the outer side of metal containers that manifests as discolored or cloudy spots or areas. In the canning industry this defect is known as "blushing." In the case of plastic film laminated on metal for canned goods, one type of blushing can be attributed to hydrolysis of the film surface on the outer side of the container promoted by potential exposure to the accelerated hydrolysis causing processing conditions such as contact with heated aqueous media or live steam during the retort process. Another type of blushing is increased haze after retort generally attributed to uneven changes in crystallinity and refractive index of the film.

Another area of interest is the chemical resistance of the polymeric film laminated to the inner side of the container. This film can degrade because of contact during the long-term storage of harsh chemicals and highly aggressive foods within the containers. Aggressive foods and chemicals can be corrosive to the container metal due to their proximity to ends of the pH scale, especially acidic materials having pH below about 3, and basic materials having pH above about 11. Aggressive foods may be acidic in nature and harsh chemicals may be basic in nature. Some examples of aggressive foods are beets, sauerkraut, and tomato products. Aggressive chemicals such as tub & tile cleaners may have a pH greater than 12.

Much attention has been devoted to the art of blush prevention during the retort process of metal and plastic film laminates on the outer side or external surface of the can. A preferred film composition is a blend of polyethylene terephthalate ("PET"). One of the most common methods cited to improve blush resistance uses films of PET blended with polybutylene terephthalate ("PBT") in the outer layers or at least as the outermost surface of the multilayered films. However, it has been discovered that films containing even high levels of PBT blends in the outer layer or layers do not completely eliminate or satisfactorily prevent the formation of blush especially for retort process using higher temperatures or for retort process with longer residence exposure at somewhat lower temperatures. Thus, there is a need in the canning industry for a polymeric lamination film that exhibits improved blushing resistance and excellent resistance to harsh chemicals and aggressive foods that are being stored in these containers. A need exists for polyester films, to be used as protective barriers on the outer side of a metal cans, that will withstand the rigorous conditions such as hydrolysis or accelerated hydrolysis experienced during retort processing without blushing. In addition, it remains desirable to have polyester films to provide a protective barrier on the inside of a metal can that is able to withstand chemical attack by aggressive foods and harsh chemicals during long term storage.

SUMMARY OF THE INVENTION

Embodiments herein relate to a polymer film comprising an anti-blushing composition in a blend comprising polyethylene terephthalate (PET) and polybutylene terephthalate (PBT). In order to provide satisfactory level of blushing reduction, the present invention discloses a composition comprising a blend of PET and PBT and blushing-retardant or blushing controlling component that can withstand the retort conditions and the composition demonstrated minimal blushing or no blushing.

The blushing controlling component or blushing-retardant comprises phosphate, monophosphate, diphosphate or orthophosphate or combinations thereof. The blushing controlling component or blushing-retardant further comprises phosphate, mono phosphate, pentaerythritol mono phosphate. The blushing controlling component or blushing-retardant further comprises phosphate, ortho phosphate, pentaerythritol ortho phosphate. The blushing controlling component or blushing-retardant further comprises phosphate, di-phosphate, pentaerythritol di phosphate. The blushing controlling component or blushing-retardant component comprises derivatives of bis(2,4-di-tert-butylphenyl) pentaerythritol diphosphite, wherein the derivative comprises monophosphate, diphosphate and orthophosphate or combinations thereof. The blushing controlling component or blushing-retardant component comprises derivatives of bis(2,4-di-tert-butylphenyl) pentaerythritol diphosphite, wherein the derivative comprises bis(2,4-di-tert-butylphenyl) pentaerythritol mono-phosphate or bis(2,4-di-tert-butylphenyl) pentaerythritol diphosphate or bis(2,4-di-tert-butylphenyl) pentaerythritol orthophosphate or combinations thereof.

The polymer in the polymer and metal laminate structure for safe and stable environment during food preparation, sterilization and storage is a blend of at least two polyesters. When PET and PBT are combined in the melt phase as part of the film making process, the polymers undergo trans-esterification resulting in reduced blushing resistance. The level of trans-esterification that occurs in the melt phase is time and temperature dependent. Where the options to control extrusion residence time are limited the addition of a blushing controlling component or blushing-retardant can reduce trans-esterification in the final film helping to retain crystallinity and improving blush resistance once the film is laminated to a metal substrate, formed into a can, packed with food contents, and processed through a retort operation. The higher melting point polyester, PET when it is blended with lower melting PBT, owing to incorporation of the blushing-retardant or blushing controlling component experiences lower drop in its melting point which is indicative of it retaining higher levels of crystallinity. The resultant polyester blend will resist corrosion, discoloration, oxidation, hydrolysis and degradation during the retort process that can lead to the formation of cracks or gaps or holes associated with blushing.

Other embodiments relate to manufacturing and processing of metal laminated sheet comprising a metal sheet and the polymer film and variations thereof described above.

Preferably, the metal sheet comprises an electrolytic chromium coated steel sheet, an electro tin plated steel sheet, an aluminum sheet or combinations thereof.

Yet other embodiments relate to a metal can or a lid of a metal can comprise the metal laminated sheet and variations thereof described above.

BRIEF DESCRIPTION OF DRAWINGS

Some embodiments of the invention and of the making and using the invention are described in the Detailed Description and the descriptions are to be read with reference to accompanying drawings presented below by the way of examples.

DETAILED DESCRIPTION

Figure 1:
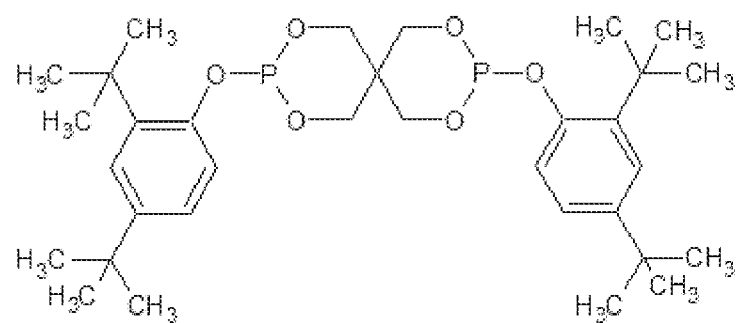
FIG. 1: Structure of Bis(2,4-di-tert-butylphenyl)pentaerythritol diphosphite (Mass: 604.6).

While this specification concludes with claims particularly pointing out and distinctly claiming that, which is regarded as the invention, it is anticipated that the invention can be more readily understood through reading the following detailed description of the invention and study of the included examples.

An objective of an embodiment herein is to provide a polymer film coated metal composite suitable for fabrication of food storage cans and chemical storage cans, such as are used to package canned foods and chemical goods for individual consumers, for example, household cleaners. To sterilize food-containing cans, the container material is subjected to direct contact with steam or heated aqueous media. Exposure to steam can cause undesirable discoloration on the outer side surface of the can that is known in the industry as "blushing."

PET is a preferred polymeric composition for this utility however, PET is subject to blushing. Research has shown that blushing of PET is likely the result of accelerated surface hydrolysis and/or uneven changes in film crystallinity and refractive index. To protect the film from such accelerated surface hydrolysis it has been found to be important to limit the number of total end groups in the surface layer of polymer and to additionally limit the number of carboxyl end groups.

As used in relation to an embodiment herein, the term "retort process" means a procedure of contacting a surface with live steam for a period of time. "Live steam" means that steam directly contacts the surface of the container. The steam is usually superheated, i.e., above the boiling point of water. In context of an embodiment herein, the surface usually is a wall of a metal container. A nominal retort process calls for exposure to steam at temperature of about 251° F. or 121.6° C. for 90 minutes. The temperature and duration of exposure of the retort process can vary depending on the container size and food contents to provide adequate sterilization and food pasteurization.

The metal substrates suitable for use in the embodiments herein are electrolytic chromium coated steel plate (occasionally referred to as "tin free substrate" or "TFS"), electro tin plated steel, aluminum, and the like. The PET film of the inner and outer side of the container can have the same or different physical properties depending on the end use application for the composite. For example, in a canned food utility after packing with food, the container is subjected to a retort process for sterilizing the food contents. Later, during service life the outer side laminated film will be exposed to ambient atmospheric environmental conditions. In contrast, the inner laminated film in addition to the retort process will be subjected to extended time contact with contents that may exhibit potentially adverse interaction with the composite. Thus, different inner and outer side polymer films can be utilized where the conditions of exposure are different.

Embodiments herein relate to a composition for the polymer film that forms one component of the polymer and metal laminate structure used as the container for food products. The PET and PBT blend film composition comprises a blush controlling component or a blushing-retardant to prevent blushing, discoloration, or formation of cloudy spots in the PET and PBT polymer film that can form during the retort process. The PET and PBT blend film composition also prevents chemical or structural changes to the metal such as corrosion, discoloration and degradation during the storage period.

An embodiment herein discloses the process to make the composition for the polymer film comprising blush controlling component or a blushing-retardant and a blend of PET and PBT to prevent blushing of the polymer film during the retort process. An embodiment herein discloses the lamination process between the PET/PBT film comprising blush controlling component or a blushing-retardant and metal sheets.

Metal containers are widely used as storage for multiple consumer product application areas covering, food, beverage, cosmetics, personal care, medicines, and construction. The metallic food cans or beverage cans primarily act as containers for storing the food articles preventing contamination and loss of nutritional value.

The sealed cans, especially those for food products, also need to be made from material which when exposed to high temperature in presence of water or steam during cooking and sterilization of the food inside the can will not undergo chemical or structural changes such as corrosion, discoloration, oxidation hydrolysis and degradation.

After the food containers or cans are filled with precooked food or ingredients, they are exposed to a retort process that involves heating of the cans to partially cook or fully cook the food or contents inside the metal containers or the metal cans. The retort process also aims to sterilize the cooked food products brought about by destruction of all contaminating bacteria including their spores. The heat treatment process of such products must be intense or aggressive not only to inactivate but also to kill the bacterial microorganisms. The retort process involves directly contacting the outer surface of the food containers or the walls of metal container or cans with live steam for a predetermined amount of time depending on the desired time to cook and obtain a specific degree of sterilization, preferably full sterilization. The term live steam usually means that the steam is superheated or above the normal atmospheric boiling point of water of 100° C.

The food products, that are at least partially cooked or fully cooked and undergo complete thermal sterilization by application of heat during the retort process, contain one or more types of food from the list including but not limited to cooked hams, cooked pork, cooked sausages, cooked fish, cooked vegetables, beef in gravy, beef with vegetables, beef with rice, chicken in gravy, chicken with vegetables, chicken with rice, fish with gravy, fish with vegetables, fish with rice, vegetables with gravy, vegetables with rice and mixtures thereof.

Unlike pasteurized cooked food products where the survival of heat resistant microorganisms is accepted, the aim of sterilization is the complete destruction of all contaminating bacteria including their spores. If spores are not completely inactivated in the canned foods, microorganisms will grow in the intervening time period after the completion of the thermal treatment and during the time when the food products are stored under ambient conditions. The surviving microorganisms can contaminate or spoil the food by producing toxins that are harmful to humans and pet animals.

Two types of heat resistant bacterial microorganisms found in food products, such as meat, are *Bacillus* and *Clostridium* and the food products must be heated above 100° C. in sealed containers such as pressure cookers to deactivate and kill the spores from these two microorganisms. Although 100° C. or temperatures close to 100° C. may be sufficient to fully cook the food products in the can, in one embodiment the food products need to be heated at or above 100° C. to kill the microorganisms and achieve a sterilized product. In another embodiment, the food products in the can need to be heated by water, steam or live steam so the temperature of the food product can reach 100° C. or higher to kill the microorganisms and achieve a sterilized product.

*Clostridium* is more heat-resistant than *Bacillus* between the two groups of spore-producing microorganisms. An exposure to a temperature of 110° C. will kill most of the *Bacillus* spores within a short time while an exposure to a higher temperature of 121° C. are needed to kill the *Clostridium* spores within a relatively short time. In one embodiment, the products are kept for a defined period of time at temperature levels required for the sterilization depending on type of product. In another embodiment, the products are kept for a defined period of time at temperature levels required for the sterilization depending on the size of container.

In one embodiment, the retort temperature required for sterilization of the food in the can is at or above 105° C. In another embodiment, the retort temperature required for sterilization of the food in the can is at or above 110° C. In another embodiment, the retort temperature required for sterilization of the food in the can is at or above 115° C. In another embodiment, the retort temperature required for sterilization of the food in the can is at or above 120° C. In another embodiment, the retort temperature required for sterilization of the food in the can is at or above 121° C. In another embodiment, the retort temperature required for sterilization of the food in the can is at or above 125° C.

In one embodiment, the time of exposure during the retort process required for both cooking and sterilization of the food in the can is at least 15 minutes. In another embodiment, the time of exposure during the retort process required for both cooking and sterilization of the food in the can is at least 30 minutes. In another embodiment, the time of exposure during the retort process required for both cooking and sterilization of the food in the can is at least 60 minutes. In another embodiment, the time of exposure during the retort process required for both cooking and sterilization of the food in the can is at least 90 minutes.

One requirement of the sealed cans needs to be that they are made from material which when exposed to food during cooking, sterilization and storage on the inside and to steam and hot aqueous fluids during cooking, sterilization and ambient environmental storage conditions on the outside will not undergo chemical or structural changes such as corrosion, discoloration, oxidation, hydrolysis and degradation. Another requirement of the sealed cans also needs to be that they are made from material that will withstand the elevated temperatures experienced during cooking and sterilization by not undergoing chemical or structural changes such as corrosion, discoloration, oxidation, hydrolysis and degradation both inside and outside the can. The sealed cans for containing or storing foods will need to be made from material that allow the food to be safely partially or fully cooked and allow for full heat sterilization for food inside the cans without contaminating or introducing any unwanted materials or leaching unwanted materials into the food. The sealed cans for containing or storing canned foods will need to be made from material that will not change or modify the appearance of the external surface of the cans. Metal cans for food products are usually made from steel, tin-free steel, electro-tin-plated steel or aluminum. Although they can at least partially satisfy a number of the above-mentioned requirements or functionalities during cooking, sterilization and storage, the metals by themselves cannot provide all the above-mentioned requirements or functionalities. This is especially true when the metals cans are subject to high temperature during cooking, sterilization and storage on the inside and when subject to steam and hot aqueous fluids during cooking and sterilization and ambient storage conditions during its shelf-life on the outside. The metals have a potential to undergo chemical or structural changes such as corrosion, discoloration, oxidation, hydrolysis and degradation. In one embodiment, polymer film or polymeric layer is adhered or bonded to inner and outer surfaces of the metal cans to provide barriers or protective barriers or interface layers for safe and stable environment during food preparation, sterilization and storage. In another embodiment, polymer film or polymeric layer is bonded to inner surfaces of the metal cans to provide barriers or protective barriers or interface layers for safe and stable environment during food preparation, sterilization and storage. In another embodiment, polymer film or polymeric layer is adhered or bonded to the outer surfaces of the metal cans to provide barriers or protective barriers or interface layers for safe and stable environment during food preparation, sterilization and storage.

The metal substrate is primarily in sheet form having a substantially uniform thickness. In one embodiment, thickness of the metal sheet is in the range of about 50 µm to about 1300 µm (about 2 mils to about 50 mils). In another embodiment, thickness of the metal sheet is in the range about 150 µm to about 300 µm (about 6 mils to about 12 mils).

In one embodiment, the polymer film or polymeric layer is adhered or bonded to inner and outer surfaces of the metal cans to provide barriers or protective barriers or interface layers to prevent corrosion of the can, prevent contamination of the food and beverages with dissolved metals, prevent the formation and growth of bacteria and provide a safe and stable environment during food preparation, sterilization and storage. In another embodiment, polymer film or polymeric layer is adhered or bonded to inner surfaces of the metal cans to provide barriers or protective barriers or interface layers to prevent corrosion of the can, prevent contamination of the food and beverages with dissolved metals, prevent the formation and growth of bacteria and provide a safe and stable environment during food preparation, sterilization and storage. In another embodiment, the polymer film or polymeric layer is adhered or bonded to outer surfaces of the metal cans to provide barriers or protective barriers or interface layers to prevent corrosion of the can, prevent contamination of the food and beverages with dissolved metals, prevent the formation and growth of bacteria and provide for safe and stable environment during food preparation, sterilization and storage.

In one embodiment, these polymer films or polymeric layers or barrier films are made from polyesters such as PET or its blend and can be laminated onto both sides of the metal by application of heat to fuse the polymer on to the metal so that the inner and outer side metal surfaces of the container are protected from degradation by the contained material food material inside the can and the external ambient environment, respectively, and both sides during the cooking and sterilization associated with the retort process.

The polymer films or polymeric layers are adhered or bonded or incorporated onto the surface of the metal or metal substrate that are used to make the cans by laminating polymer films on either one side of the metal can or substrate or on both sides of the metal can or substrate. For the purpose of this invention or application, the side of the metal can or substrate used to the make the can that is in contact with the food or facing the interior contents of the can or is in contact with the food and facing the interior contents of the can will be referenced or called the interior surface, the internal surface, or the inner surface. For the purpose of this invention or application, the side of the metal can or substrate used to the make the can that is not in direct contact with the food and is in contact with the outside or faces the ambient environmental conditions during storage or is subjected directly to the externally applied heat during cooking of the food after they have been placed in the can or is subjected directly to the externally applied heating media during cooking and sterilization of the food after they have been placed in the can will be referenced or called the exterior surface, the external surface, or the outer surface.

In one embodiment, these polymer films or polymeric layers or barrier films are laminated onto both sides of the metal cans or metal substrate so that the inner and outer sides of the metal surfaces of the container are protected from corrosion, discoloration, oxidation, hydrolysis and degradation both from external ambient environmental conditions as well as cooking and sterilization associated with the retort process. In another embodiment, these polymer films or polymeric layers or barrier films are laminated by application of heat onto both sides of the metal so that the inner and outer side metal surfaces of the container are protected from corrosion, discoloration, oxidation hydrolysis and degradation both from external ambient environmental conditions as well as, cooking and sterilization associated with the retort process. In another embodiment, these polymer films or polymeric layers or barrier films can be laminated onto both sides of the metal by application of heat to fuse the polymer on to the metal so that the inner and outer side metal surfaces of the container are protected from corrosion, discoloration, oxidation hydrolysis and degradation both from external ambient environmental conditions as well as cooking and sterilization associated with the retort process. In one embodiment, these polymer films or polymeric layers or barrier films are made from polyesters such as polyethylene terephthalate or PET or a blend thereof and are laminated onto both sides of the metal so that the inner and outer side metal surfaces of the container are protected from degradation by the contained food material inside the can and the external ambient environment, respectively, both sides during the cooking and sterilization associated with the retort process. In another embodiment, these polymer films or polymeric layers or barrier films are made from polyesters such as PET or a blend thereof are laminated by application of heat onto both sides of the metal so that the inner and outer side metal surfaces of the container are protected from degradation by the contained material food material inside the can and the external ambient environment, respectively, and both sides during the cooking and sterilization of the retort process.

In one embodiment, the thickness of the polymer film is in the range of about 1 µm to 80 µm. In another embodiment, the thickness of the polymer film is in the range of about 1 µm to 50 µm. In another embodiment, the thickness of the polymer film is in the range of about 5 µm to 20 µm. In another embodiment, the thickness of the polymer film is in the range of about 5 µm to 15 µm.

In one embodiment, the containers made from metal-polymer laminate, after they are filled and exposed to the retort process, the exterior surface or the external surface of the polymer and metal laminate structure of the container is able to withstand processing conditions experienced as a result of direct contact with heated water, heated aqueous media, steam or live steam during the retort process by not displaying or demonstrating effects of chemical or structural changes such as corrosion, discoloration, oxidation hydrolysis and degradation. In another embodiment, the containers, made from metal-polymer laminate, after they are filled and are exposed to a retort process, the interior surface or the internal surface of the polymer and metal laminate structure of the container be able to withstand processing conditions experienced as a result of direct contact with chemicals in the food and chemically aggressive foods during the retort processing by not displaying or demonstrating effects of chemical or structural changes such as corrosion, discoloration, oxidation, hydrolysis and degradation, and leaching unwanted materials into the food. The hydrolysis, accelerated hydrolysis, change of crystallinity, lowering of melting point, change of refractive index, or degradation triggered by contacting hot water, heated aqueous media, water vapor above 100° C. or live steam with the polymer films in the polymer and metal laminate structure during the retort process leads to discoloration or formation of cloudy spots in the polymer film and is termed blushing. The term blushing can be extended to include hydrolysis, accelerated hydrolysis, change of crystallinity, lowering of melting point, change of refractive index, or degradation triggered by contacting hot water, heated aqueous media, water vapor above 100° C. or live steam with the polymer films such as polyester films or polyester blended films in the polymer and metal laminate structure during the retort process leading to structural changes or compositional changes or discoloration or formation of cloudy spots in the polymer film. The term blushing can be further extended to include hydrolysis, accelerated hydrolysis, change of crystallinity, change of refractive index, or degradation triggered by contacting hot water, heated aqueous media, water vapor above 100° C., or live steam with the polymer films such as polyester films comprising polyethylene terephthalate or PET film or comprising blends of PET with another crystallizable polyester in the polymer and metal laminate structure during the retort process leading to discoloration or formation of cloudy spots in the polymer film.

The retort process can cause blushing by adversely affecting the polymer in the polymer and metal laminate structure of the container by the causing hydrolysis, or degradation or both hydrolysis and degradation of the polymeric film surface on the outer side of the container owing to its exposure by heating medium such as hot water, heated aqueous media, and live steam during the retort process. The retort process can cause blushing by adversely affecting the polymer in the polymer and metal laminate structure of the container by the causing hydrolysis of the polymer film surface such as polyester film surface on the outer side of the container owing to its exposure by heating medium such as hot water, heated aqueous media, and steam during the retort process. The retort process can cause blushing by adversely affecting the polymer in the polymer and metal laminate structure of the container by causing hydrolysis, changing crystallinity, lowering of melting point, or changing the refractive index of the PET film or the PET blended with another crystallizable polyester film on the external surface of the container owing to its exposure by heating medium such as hot water and steam during the retort process.

In one embodiment, the polymer in the polymer and metal laminate structure for safe and stable environment during food preparation, sterilization and storage include but not limited to polyesters. In another embodiment, the polymer in the polymer and metal laminate structure for safe and stable environment during food preparation, sterilization and storage is a polyester. In another embodiment, the polymer in the polymer and metal laminate structure for safe and stable environment during food preparation, sterilization and storage is a polyester such as polyethylene terephthalate or PET. In another embodiment, the polymer in the polymer and metal laminate structure for safe and stable environment during food preparation, sterilization and storage is PET.

In one embodiment, the polymer in the polymer and metal laminate structure for safe and stable environment during food preparation, sterilization and storage is a blend of two or more polyesters. In another embodiment, the polymer in the polymer and metal laminate structure for safe and stable environment during food preparation, sterilization and storage is a blend of PET with at least one other polyester. In another embodiment, the polymer in the polymer and metal laminate structure for safe and stable environment during food preparation, sterilization and storage is a blend of PET and one other polyester. In another embodiment, the polymer in the polymer and metal laminate structure for safe and stable environment during food preparation, sterilization and storage is a blend of PET and one other crystallizable polymer.

In another embodiment, the polymer in the polymer and metal laminate structure for safe and stable environment during food preparation, sterilization and storage is a blend of at least two semi crystalline polyesters. In another embodiment, the polymer in the polymer and metal laminate structure for safe and stable environment during food preparation, sterilization and storage is a blend of two semi-crystalline polyesters. In another embodiment, the polymer in the polymer and metal laminate structure for safe and stable environment during food preparation, sterilization and storage is a blend of two semi-crystalline polyesters comprising higher melting PET and lower melting polybutylene terephthalate (PBT). In another embodiment, the polymer in the polymer and metal laminate structure for safe and stable environment during food preparation, sterilization and storage is a blend of two semi-crystalline polyesters comprising PET with higher melting point and polybutylene terephthalate (PBT) with lower melting point. In another embodiment, the polymer in the polymer and metal laminate structure for safe and stable environment during food preparation, sterilization and storage is a blend of two semi-crystalline polyesters comprising higher melting PET and lower melting PBT.

In one embodiment, the polymer in the polymer and metal laminate structure for safe and stable environment during food preparation, sterilization and storage is modified polyester or modified PET or PET blend to add specific functionalities to the polymer layer in the metal-polymer laminate. In one embodiment, the polymer in the polymer and metal laminate structure for safe and stable environment during food preparation, sterilization and storage is a polyester modified by including and/or incorporating moieties into the polymer chain that will allow for ease of lamination by lowering the fusion temperature of the polyester or polyester blend. In another embodiment, the polymer in the polymer and metal laminate structure for safe and stable environment during food preparation, sterilization and storage is a polyester modified by including and/or incorporating moieties into the polymer chain that will allow for ease of lamination by lowering the lamination temperature by reducing the crystallinity of the polyester or polyester blend. In another embodiment, the polymer in the polymer and metal laminate structure for safe and stable environment during food preparation, sterilization and storage is polyethylene terephthalate modified by lowering the lamination temperature by reducing the crystallinity of higher melting polyester such as PET. In another embodiment, the polymer in the polymer and metal laminate structure for safe and stable environment during food preparation, sterilization and storage is PET modified by the presence or increasing the amount of lower melting polyester such as PBT that will melt at lower temperature and allow for lamination or fusion at lower temperature. In another embodiment, the polymer in the polymer and metal laminate structure for safe and stable environment during food preparation, sterilization and storage is PET or PET/PBT layer modified by attaching another layer to the PET or PET/PBT layer that will allow for ease of lamination by lowering the lamination temperature by making this additional layer comprising an amorphous polyester such as amorphous PET.

In one embodiment, the polymer in the polymer and metal laminate structure for safe and stable environment during food preparation, sterilization and storage is a polyester or polyester blend with higher molecular weight or higher intrinsic viscosity that will be resist the formation of cracks or gaps or holes which can occur due to corrosion, discoloration, oxidation, hydrolysis and degradation during the retort process or during long term storage. In another embodiment, the polymer in the polymer and metal laminate structure for safe and stable environment during food preparation, sterilization and storage is PET or a blend of PET with another polyester with either the PET or the PET blend having higher molecular weight or higher intrinsic viscosity that will be resist the formation of cracks or gaps or discoloration or holes which can occur due to hydrolysis and degradation during the retort process or during long term storage. Without being bound by any particular theory, having a higher molecular weight or higher intrinsic viscosity allows a polymer to withstand disruptive deformational forces by the virtue of higher entanglements and less chain ends. In one embodiment, having a higher molecular weight or higher intrinsic viscosity allows a polymer to withstand disruptive deformational forces by the virtue of higher entanglements and less chain carboxyl ends.

In one embodiment, the polymer in the polymer and metal laminate structure for safe and stable environment during food preparation, sterilization and storage is a blend comprising of PET and one or more faster crystallizing but lower melting point polyesters to resist the formation of cracks or gaps or holes or discoloration associated with hydrolysis or hydrolysis and degradation during the retort process or continuing during long term storage. In another embodiment, the polymer in the polymer and metal laminate structure for safe and stable environment during food preparation, sterilization and storage is a block copolymer comprising of PET and one or more faster crystallizing polyesters but lower melting point polyesters to resist the formation of cracks or gaps or holes or discoloration associated with hydrolysis and degradation during the retort process or during long term storage.

Without being bound by any particular theory, the faster crystallizing polyester crystallizes early or first and provides for more nucleation or additional nucleation sites for the subsequent crystallization of PET leading to a higher overall crystallinity content that will resist blushing. Faster crystallizing polyester can have a large effect on increasing the crystallization rate of the slower crystalizing PET and can affect the PET in both block polyester copolymers and polyester blends. Higher crystallinity of PET can potentially also make the polymer blends or block copolymers more difficult to laminate or fuse to the metal in the polymer and metal. Lower lamination or fusion temp is obtained by the presence or addition of lower melting point PBT. Thus PBT can be used to retain higher crystallinity of PET and for facilitating lower fusion or laminating temperature for the blend.

Without being bound by any particular theory, the blend or block copolymer comprising PET and a faster crystallizing lower melting point polyester can lead to tensile properties such as higher elongation to break that imparts or results in higher toughness that will resist blushing and resist blushing and the formation of cracks or gaps or holes which can occur due to corrosion, discoloration, oxidation hydrolysis and degradation during the retort process or during long term storage. An embodiment herein discloses a composition in which the melting point of PET in a two-component blend will be lower than that of pure PET but it will resist the formation of cracks or gaps or holes which can occur due to corrosion, discoloration, oxidation hydrolysis and degradation during the retort process or during long term storage. If the melting point of PET in a two-component blend is more than about 13° C. lower than that of pure PET, it will not be able to resist the formation of cracks or gaps or holes and will resist corrosion, discoloration, oxidation hydrolysis and degradation during the retort process or during long term storage. It had been reported that blending PET with faster crystallizing and lower melting point polyester such as polybutylene terephthalate (PBT)

improves the blush resistance of the polymer in the polymer and metal laminate structure of the container. PBT is lower melting and faster crystallizing polyester compared to PET and it is added to provide all the advantages of blending PET with PBT or forming a block copolymer of PET with PBT such as resisting the formation of cracks or gaps or holes and resisting corrosion, discoloration, oxidation, hydrolysis and degradation during the retort process or during long term storage. However, blending of PBT with PET do not completely eliminate or substantially remove or satisfactorily prevent the formation of blush especially for retort process using higher temperatures or for retort process with longer residence exposure at lower temperatures.

In an embodiment herein, it has been observed that films containing PBT in PET/PBT blend do not provide satisfactory level of blushing reduction as observed by performing the Blush resistance test described later in Test Method Section.

As a part of an embodiment herein, it has also been observed that films containing PBT in PET/PBT blend do not guarantee satisfactory level of blushing reduction or ensure that blushing is completely eliminated or substantially removed even with high levels of PBT. The present discloses a composition comprising a blend of PET and PBT, and blushing-retardant or blushing controlling component that can withstand the retort conditions in which the temperature is above 115° C. and the composition demonstrates minimal blushing or no blushing. In another embodiment, the present invention discloses a composition comprising a blend of PET and PBT, and blushing-retardant or blushing controlling component that can withstand the retort conditions in which the temperature is above 115° C. and the composition demonstrates no blushing where the film is completely clear with no hazing or clouding. In another embodiment, the present invention discloses a composition comprising a blend of PET and PBT, and blushing-retardant or blushing controlling component that can withstand the retort conditions in which the temperature is above 115° C. and the composition demonstrates isolated areas of hazing or clouding.

The present discloses a composition comprising a blend of PET and PBT, and blushing-retardant or blushing controlling component that can withstand the retort conditions in which the temperature is above 120° C. and the composition demonstrate minimal blushing or no blushing. In another embodiment, the present discloses a composition comprising a blend of PET and PBT, and blushing-retardant or blushing controlling component that can withstand the retort conditions in which the temperature is above 120° C. and the composition demonstrates no blushing where the film is completely clear with no hazing or clouding. In another embodiment, the present discloses a composition comprising a blend of PET and PBT and blushing-retardant or blushing controlling component that can withstand the retort conditions in which the temperature is above 120° C. and the composition demonstrates isolated areas of hazing or clouding.

In order to provide satisfactory level of blushing reduction, the present discloses a composition comprising a blend of PET and PBT, and blushing-retardant or blushing controlling component that can withstand the retort conditions in which the temperature is above 125° C. and the composition demonstrate minimal blushing or no blushing. In another embodiment, the present discloses a composition comprising a blend of PET and PBT, and blushing-retardant or blushing controlling component that can withstand the retort conditions in which the temperature is above 125° C. and the composition demonstrates no blushing where the film is completely clear with no hazing or clouding. In another embodiment, the present discloses a composition comprising a blend of PET and PBT, and blushing-retardant or blushing controlling component that can withstand the retort conditions in which the temperature is above 125° C. and the composition demonstrates isolated areas of hazing or clouding.

In one embodiment, an embodiment herein discloses a composition for the polymer in the polymer and metal laminate structure of the container for food products that comprises a blushing controlling component or blushing-retardant component and a blend of PET and PBT to prevent blushing of the polymer film during the retort process.

An embodiment herein discloses a composition for the polymer in the polymer and metal laminate structure of the container for food products that comprises a blushing controlling component or blushing-retardant component and a blend of PET and PBT to prevent blushing of the polymer film during the retort process where the retort temperature is at or above 110° C. An embodiment herein discloses a composition for the polymer in the polymer and metal laminate structure of the container for food products that comprises a blushing controlling component or blushing-retardant component and a blend of PET and PBT to prevent blushing of the polymer film during the retort process where the retort temperature is at or above 115° C. An embodiment herein discloses a composition for the polymer in the polymer and metal laminate structure of the container for food products that comprises a blushing controlling component or blushing-retardant component and a blend of PET and PBT to prevent blushing of the polymer film during the retort process where the retort temperature is at or above 120° C. An embodiment herein discloses a composition for the polymer in the polymer and metal laminate structure of the container for food products that comprises a blushing controlling component or blushing-retardant component and a blend of PET and PBT to prevent blushing of the polymer film during the retort process where the retort temperature is at or above 125° C.

An embodiment herein discloses a composition for the polymer in the polymer and metal laminate structure of the container for food products that comprises a blushing controlling component or blushing-retardant component, and a blend of PET and PBT with the intrinsic viscosity being greater than 0.75 to prevent, retard or minimize blushing of the polymer film during the retort process. In another embodiment, an embodiment herein discloses a composition for the polymer in the polymer and metal laminate structure of the container for food products that comprises a blushing controlling component or blushing-retardant component, and a blend of PET and PBT with the intrinsic viscosity being greater than 0.76 to prevent, retard or minimize blushing of the polymer film during the retort process. In another embodiment, an embodiment herein discloses a composition for the polymer in the polymer and metal laminate structure of the container for food products that comprises a blushing controlling component or blushing-retardant component, and a blend of PET and PBT with the intrinsic viscosity being greater than 0.77 to prevent, retard or minimize blushing of the polymer film during the retort process. In another embodiment, an embodiment herein discloses a composition for the polymer in the polymer and metal laminate structure of the container for food products that comprises a blushing controlling component or blushing-retardant component, and a blend of PET and PBT with the intrinsic viscosity being greater than 0.80 to prevent, retard or minimize blushing of the polymer film during the retort process. In another embodiment, an embodiment herein discloses a composition for the polymer in the polymer and metal laminate structure of the container for food products that comprises a blushing controlling component or blushing-retardant component, and a blend of PET and PBT with the intrinsic viscosity being around 0.90 to prevent, retard or minimize blushing of the polymer film during the retort process. In another embodiment, an embodiment herein discloses a composition for the polymer in the polymer and metal laminate structure of the container for food products that comprises a blushing controlling component or blushing-retardant component, and a blend of PET and PBT with the intrinsic viscosity being greater than 0.90 to prevent, retard or minimize blushing of the polymer film during the retort process.

An embodiment herein discloses a composition for the polymer in the polymer and metal laminate structure of the container for food products that comprises a blushing controlling component or blushing-retardant component, and a blend of PET and PBT with the PBT content being about 40% or at least 40% by weight (% wt) to prevent, retard or minimize blushing of the polymer film during the retort process. In another embodiment, a composition for the polymer in the polymer and metal laminate structure of the container for food products that comprises a blushing controlling component or blushing-retardant component, and a blend of PET and PBT with the PBT content being about 50% or at least 50% by weight to prevent, retard or minimize blushing of the polymer film during the retort process. In another embodiment, a composition for the polymer in the polymer and metal laminate structure of the container for food products that comprises a blushing controlling component or blushing-retardant component, and a blend of PET and PBT with the PBT content being about 55% or at least 55% by weight to prevent, retard or minimize blushing of the polymer film during the retort process. In another embodiment, a composition for the polymer in the polymer in the polymer and metal laminate structure of the container for food products that comprises a blushing controlling component or blushing-retardant component, and a blend of PET and PBT with the PBT content being about 60% or at least 60% by weight to prevent, retard or minimize blushing of the polymer film during the retort process. In another embodiment, a composition for the polymer in the polymer and metal laminate structure of the container for food products that comprises a blushing controlling component or blushing-retardant component, and a blend of PET and PBT with the PBT content being about 70% or at least 70% by weight to prevent, retard or minimize blushing of the polymer film during the retort process.

An embodiment herein discloses a composition for the polymer in the polymer and metal laminate structure of the container for food products that comprises a blushing controlling component or blushing-retardant component, and a blend of PET and PBT with the PBT content being about 40% to about 80% by weight to prevent, retard or minimize blushing of the polymer film during the retort process. In another embodiment, a composition for the polymer in the polymer and metal laminate structure of the container for food products that comprises a blushing controlling component or blushing-retardant component, and a blend of PET and PBT with the PBT content being about 50% to 70% by weight to prevent, retard or minimize blushing of the polymer film during the retort process. In another embodiment, a composition for the polymer in the polymer in the polymer and metal laminate structure of the container for food products that comprises a blushing controlling component or blushing-retardant component, and a blend of PET and PBT with the PBT content being about 50% to 65% by weight prevent, retard or minimize blushing of the polymer film during the retort process. In another embodiment, a composition for the polymer in the polymer and metal laminate structure of the container for food products that comprises a blushing controlling component or blushing-retardant and a blend of PET and PBT with the PBT content being about 51% to 64% by weight to prevent, retard or minimize blushing of the polymer film during the retort process. In another embodiment, a composition for the polymer in the polymer and metal laminate structure of the container for food products that comprises a blushing controlling component or blushing-retardant component, and a blend of PET and PBT with the PBT content being about 52% to 62% by weight to prevent, retard or minimize blushing of the polymer film during the retort process. In another embodiment, a composition for the polymer in the polymer and metal laminate structure of the container for food products that comprises a blushing controlling component or blushing-retardant component, and a blend of PET and PBT with the PBT content being about 53% to 58% by weight to prevent, retard or minimize blushing of the polymer film during the retort process. In another embodiment, a composition for the polymer in the polymer and metal laminate structure of the container for food products that comprises a blushing controlling component or blushing-retardant component, and a blend of PET and PBT with the PBT content being about 54% to 56% by weight to prevent, retard or minimize blushing of the polymer film during the retort process.

An embodiment herein discloses a composition for the polymer in the polymer and metal laminate structure of the container for food products that comprises a blushing controlling component or blushing-retardant and a blend of PET and PBT with the blushing controlling component or blushing-retardant component content being about 0.01% to about 1% by weight of the overall PET and PBT blend composition to prevent, retard or minimize blushing of the polymer film during the retort process. An embodiment herein discloses a composition for the polymer in the polymer and metal laminate structure of the container for food products that comprises a blushing controlling component or blushing-retardant and a blend of PET and PBT with the blushing controlling component or blushing-retardant component content being about 0.025% to about 0.8% by weight of the overall PET and PBT blend composition to prevent, retard or minimize blushing of the polymer film during the retort process. An embodiment herein discloses a composition for the polymer in the polymer and metal laminate structure of the container for food products that comprises a blushing controlling component or blushing-retardant and a blend of PET and PBT with the blushing controlling component or blushing-retardant component content being about 0.05% to about 0.6% by weight of the overall PET and PBT blend composition to prevent, retard or minimize blushing of the polymer film during the retort process. An embodiment herein discloses a composition for the polymer in the polymer and metal laminate structure of the container for food products that comprises a blushing controlling component or blushing-retardant and a blend of PET and PBT with the blushing controlling component or blushing-retardant component content being about 0.05% to about 0.3% by weight of the overall PET and PBT blend composition to prevent, retard or minimize blushing of the polymer film during the retort process.

The surface roughness, Ra, of the exposed outer surfaces skin layers each independently may be about 5-350 nm, preferably 10-250 nm, and more preferably 15-150 nm. The blushing controlling component or blushing-retardant component comprising a derivative of bis(2,4-di-tert-butylphenyl)pentaerythritol diphosphite. An embodiment herein discloses the blushing controlling component or blushing-retardant component comprising a derivative of bis(2,4-di-tert-butylphenyl)pentaerythritol diphosphite, wherein the derivative comprises a phosphate.

An embodiment herein discloses the blushing controlling component or blushing-retardant component comprising a derivative of bis(2,4-di-tert-butylphenyl)pentaerythritol diphosphite, wherein the derivative comprises phosphate. In one embodiment, monophosphate which is a derivative of bis(2,4-di-tert-butylphenyl)pentaerythritol diphosphite comprises bis(2,4-di-tert-butylphenyl)pentaerythritol monophosphate. In one embodiment, the blushing controlling component or blushing-retardant component comprising a derivative of bis(2,4-di-tert-butylphenyl)pentaerythritol diphosphite, wherein the derivative comprises bis(2,4-di-tert-butylphenyl)pentaerythritol monophosphate. An embodiment herein discloses the blushing controlling component or blushing-retardant component comprising a derivative of bis(2,4-di-tert-butylphenyl)pentaerythritol diphosphite, wherein the derivative comprises monophosphate. In one embodiment, monophosphate which is a derivative of bis(2,4-di-tert-butylphenyl) pentaerythritol diphosphite comprises bis(2,4-di-tert-butylphenyl)pentaerythritol monophosphate. In one embodiment, the blushing controlling component or blushing-retardant component comprising a derivative of bis(2,4-di-tert-butylphenyl)pentaerythritol diphosphite, wherein the derivative comprises bis(2,4-di-tert-butylphenyl)pentaerythritol monophosphate.

An embodiment herein discloses the blushing controlling component or blushing-retardant component comprising a derivative of bis(2,4-di-tert-butylphenyl) pentaerythritol diphosphite, wherein the derivative comprises orthophosphate. In one embodiment, orthophosphate which is a derivative of bis(2,4-di-tert-butylphenyl) pentaerythritol diphosphite comprises bis(2,4-di-tert-butylphenyl) pentaerythritol orthophosphate. In one embodiment, the blushing controlling component or blushing-retardant component comprising a derivative of bis(2,4-di-tert-butylphenyl) pentaerythritol diphosphite, wherein the derivative comprises bis(2,4-di-tert-butylphenyl) pentaerythritol orthophosphate.

An embodiment herein discloses the blushing controlling component or blushing-retardant component comprising a derivative of bis(2,4-di-tert-butylphenyl)pentaerythritol diphosphite, wherein the derivative comprises diphosphate. In another embodiment, diphosphate which is a derivative of bis(2,4-di-tert-butylphenyl)pentaerythritol diphosphite comprises bis(2,4-di-tert-butylphenyl)pentaerythritol diphosphate. In another embodiment, the blushing controlling component or blushing-retardant component comprising a derivative of bis(2,4-di-tert-butylphenyl)pentaerythritol diphosphite, wherein the derivative comprises a bis(2,4-di-tert-butylphenyl)pentaerythritol diphosphate.

An embodiment herein discloses the blushing controlling component or blushing-retardant component comprising a derivative of bis(2,4-di-tert-butylphenyl)pentaerythritol diphosphite, wherein the derivative comprises a monophosphate and a diphosphate. An embodiment herein discloses the blushing controlling component or blushing-retardant component comprising a derivative of bis(2,4-di-tert-butylphenyl)pentaerythritol diphosphite, wherein the derivative comprises monophosphate, diphosphate or combinations thereof. In another embodiment, the blushing controlling component or blushing-retardant component comprising a derivative of bis(2,4-di-tert-butylphenyl)pentaerythritol diphosphite, wherein the derivative comprises bis(2,4-di-tert-butylphenyl)pentaerythritol monophosphate, bis(2,4-di-tert-butylphenyl)pentaerythritol diphosphate or combinations thereof.

An embodiment herein discloses the blushing controlling component or blushing-retardant component comprising a derivative of bis(2,4-di-tert-butylphenyl)pentaerythritol diphosphite, wherein the derivative comprises phosphate, monophosphate diphosphate and orthophosphate. An embodiment herein discloses the blushing controlling component or blushing-retardant component comprising a derivative of bis(2,4-di-tert-butylphenyl) pentaerythritol diphosphite, wherein the derivative comprises phosphate, monophosphate, diphosphate orthophosphate or combinations thereof. In another embodiment, the blushing controlling component or blushing-retardant component comprising a derivative of bis(2,4-di-tert-butylphenyl) pentaerythritol diphosphite, wherein the derivative comprises bis(2,4-di-tert-butylphenyl) pentaerythritol phosphate, bis(2,4-di-tert-butylphenyl)pentaerythritol monophosphate or bis(2,4-di-tert-butylphenyl)pentaerythritol diphosphate or bis(2,4-di-tert-butylphenyl) pentaerythritol orthophosphate combinations thereof.

In one embodiment, the blushing controlling component or blushing-retardant component comprising a derivative of bis(2,4-di-tert-butylphenyl)pentaerythritol diphosphite wherein the derivative has a higher molecular weight than that of the bis(2,4-di-tert-butylphenyl)pentaerythritol diphosphite. In another embodiment, the blushing controlling component or blushing-retardant component comprising a derivative of bis(2,4-di-tert-butylphenyl)pentaerythritol diphosphite wherein the derivative has a molecular weight greater than 604. In one embodiment, the blushing controlling component or blushing-retardant component comprising a derivative of bis(2,4-di-tert-butylphenyl)pentaerythritol diphosphite wherein the derivative has a molecular weight in the range of about 605 to 700. In one embodiment, the blushing controlling component or blushing-retardant component comprising a derivative of bis(2,4-di-tert-butylphenyl)pentaerythritol diphosphite wherein the derivative has a molecular weight in the range of about 610 to 660. In one embodiment, the blushing controlling component or blushing-retardant component comprising a derivative of bis(2,4-di-tert-butylphenyl)pentaerythritol diphosphite wherein the derivative has a molecular weight in the range of about 618 to 640. In one embodiment, the blushing controlling component or blushing-retardant component comprising a derivative of bis(2,4-di-tert-butylphenyl)pentaerythritol diphosphite wherein the derivative has a molecular weight greater than 618.

An embodiment herein discloses the blushing controlling component or blushing-retardant component comprising a derivative of bis (2,4-di-tert-butylphenyl)pentaerythritol diphosphite, wherein the derivative comprises phosphate, monophosphate, diphosphate, phosphite, monophosphite, diphosphite, phosphonate, monophosphonate, diphosphonate, phosphonoacetate, polyphosphoric acid, phosphoric acid, or combinations thereof. An embodiment herein discloses the blushing controlling component or blushing-retardant component comprising a derivative of bis(2,4-di-tert-butylphenyl)pentaerythritol diphosphite, wherein the derivative comprises phosphate, monophosphate, diphosphate, phosphite, monophosphite, diphosphite, phosphonate, monophosphonate, di phosphonate or combinations thereof.

An embodiment herein discloses the blushing controlling component or blushing-retardant component comprising a derivative of bis (2,4-di-tert-butylphenyl)pentaerythritol diphosphite, wherein the derivative comprises phosphate, monophosphate, diphosphate, esters of phosphoric acid or combinations thereof. An embodiment herein discloses the blushing controlling component or blushing-retardant component comprising a derivative of bis (2,4-di-tert-butylphenyl)pentaerythritol diphosphite, wherein the derivative comprises phosphate, monophosphate, diphosphate esters of phosphoric acid, organophosphates that are esters of phosphoric acid or combinations thereof. An embodiment herein discloses the blushing controlling component or blushing-retardant component comprising a derivative of bis (2,4-di-tert-butylphenyl)pentaerythritol diphosphite, wherein the derivative comprises phosphate, esters of phosphorous acid, organophosphonates that are esters of phosphorous acid or combinations thereof.

In one embodiment, the blushing controlling component or blushing-retardant comprises phosphate. In another embodiment, the blushing controlling component or blushing-retardant comprises phosphate which further comprises a pentaerythritol structure. In another embodiment, the blushing controlling component or blushing-retardant comprises pentaerythritol phosphate. In another embodiment, the blushing controlling component or blushing-retardant comprises pentaerythritol monophosphate. In another embodiment, the blushing controlling component or blushing-retardant comprises pentaerythritol diphosphate. In another embodiment, the blushing controlling component or blushing-retardant comprises pentaerythritol monophosphate pentaerythritol diphosphate, pentaerythritol phosphate or combinations thereof.

In one embodiment, the blushing controlling component or blushing-retardant comprises phosphate and phosphonate. In another embodiment, the blushing controlling component or blushing-retardant comprises phosphate and phosphonate wherein the phosphate comprises a pentaerythritol structure and the phosphonate comprises a pentaerythritol structure.

In another embodiment, the blushing controlling component or blushing-retardant comprises a pentaerythritol phosphate and a pentaerythritol monophosphonate. In another embodiment, the blushing controlling component or blushing-retardant comprises a pentaerythritol phosphate and a pentaerythritol diphosphonate. In another embodiment, the blushing controlling component or blushing-retardant comprises a phosphate, and further comprises pentaerythritol monophosphonate, pentaerythritol diphosphonate, or combinations thereof. In another embodiment, the blushing controlling component or blushing-retardant comprises a pentaerythritol phosphate, and further comprises pentaerythritol monophosphonate, pentaerythritol diphosphonate, or combinations thereof. In another embodiment, the blushing controlling component or blushing-retardant comprises a pentaerythritol phosphate, pentaerythritol monophosphate, pentaerythritol diphosphate and further comprises pentaerythritol monophosphonate, pentaerythritol diphosphonate, or combinations thereof.

In another embodiment, the blushing controlling component or blushing-retardant comprises a phosphate and a pentaerythritol mono-phosphite. In another embodiment, the blushing controlling component or blushing-retardant comprises a phosphate and a pentaerythritol diphosphite. In another embodiment, the blushing controlling component or blushing-retardant comprises a pentaerythritol phosphate, and further comprises pentaerythritol monophosphite, pentaerythritol diphosphite or combinations thereof.

An embodiment herein discloses a film comprising a PET, a PBT and a derivative of bis(2,4-di-tert-butylphenyl)pentaerythritol diphosphite, wherein the derivative comprises a phosphate. Another embodiment herein discloses a film comprising a PET, a PBT and a derivative of bis(2,4-di-tert-butylphenyl)pentaerythritol diphosphite, wherein the derivative comprises a phosphate, monophosphate, diphosphate or combinations thereof.

Another embodiment herein discloses a film comprising a PET, a PBT and a derivative of bis(2,4-di-tert-butylphenyl) pentaerythritol diphosphite, wherein the derivative comprises a pentaerythritol phosphate and the derivative has a higher molecular weight than that of the bis(2,4-di-tert-butylphenyl) pentaerythritol diphosphite. Another embodiment herein discloses a film comprising a PET, a PBT and a derivative of bis(2,4-di-tert-butylphenyl)pentaerythritol diphosphite, wherein the derivative comprises a pentaerythritol phosphate and the derivative has a higher molecular weight greater than 604. Another embodiment herein discloses a film comprising a PET, a PBT and a derivative of bis(2,4-di-tert-butylphenyl)pentaerythritol diphosphite, wherein the derivative comprises a pentaerythritol phosphate and the derivative has a higher molecular weight greater than 618.

An embodiment herein discloses a film comprising a PET, a PBT and a derivative of bis(2,4-di-tert-butylphenyl)pentaerythritol diphosphite, wherein the derivative comprises a phosphate and the derivative has a higher molecular weight in the range of about 605 to 700. Another embodiment herein discloses a film comprising a PET, a PBT and a derivative of bis(2,4-di-tert-butylphenyl) pentaerythritol diphosphite, wherein the derivative comprises a phosphate and the derivative has a higher molecular weight in the range of about 610 to 660. Another embodiment herein discloses a film comprising a PET, a PBT and a derivative of bis(2, 4-di-tert-butylphenyl)pentaerythritol diphosphite, wherein the derivative comprises a phosphate and the derivative has a higher molecular weight in the range of about 620 to 640.

An embodiment herein discloses a film comprising a PET, a PBT and a derivative of bis(2,4-di-tert-butylphenyl)pentaerythritol diphosphite, wherein the derivative comprises phosphate and wherein the phosphate further comprises monophosphate and has a higher molecular weight than that of the bis(2,4-di-tert-butylphenyl)pentaerythritol diphosphite. Another embodiment herein discloses a film comprising a PET, a PBT and a derivative of bis(2,4-di-tert-butylphenyl)pentaerythritol diphosphite, wherein the derivative comprises phosphate and wherein the phosphate further comprises bis(2,4-di-tert-butylphenyl)pentaerythritol monophosphate and has a higher molecular weight than that of the bis(2,4-di-tert-butylphenyl)pentaerythritol diphosphite.

An embodiment herein discloses a film comprising a PET, a PBT and a derivative of bis(2,4-di-tert-butylphenyl)pentaerythritol diphosphite, wherein the derivative comprises a phosphate and wherein the phosphate further comprises diphosphate and has a higher molecular weight than that of the bis(2,4-di-tert-butylphenyl)pentaerythritol diphosphite. Another embodiment herein discloses a film comprising a PET, a PBT and a derivative of bis(2,4-di-tert-butylphenyl) pentaerythritol diphosphite, wherein the derivative comprises a phosphate wherein the phosphate further comprises bis(2,4-di-tert-butylphenyl)pentaerythritol diphosphate and has a higher molecular weight than that of the bis(2,4-di-tert-butylphenyl) pentaerythritol diphosphite.

An embodiment herein discloses a film comprising a PET, a PBT and a derivative of bis(2,4-di-tert-butylphenyl)pentaerythritol diphosphite, wherein the derivative comprises phosphate and the phosphate has a higher molecular weight than that of the bis(2,4-di-tert-butylphenyl)pentaerythritol diphosphite wherein the phosphate further comprises a monophosphate and a diphosphate. Another embodiment herein discloses a film comprising a PET, a PBT and a derivative of bis(2,4-di-tert-butylphenyl)pentaerythritol diphosphite, wherein the derivative comprises a phosphate and the phosphate has a higher molecular weight than that of the bis(2,4-di-tert-butylphenyl)pentaerythritol diphosphite wherein the monophosphate comprises bis(2,4-di-tert-butylphenyl)pentaerythritol monophosphate and the diphosphate comprises bis(2,4-di-tert-butylphenyl)pentaerythritol diphosphate.

An embodiment herein discloses a film comprising a PET, a PBT and a derivative of bis(2,4-di-tert-butylphenyl)pentaerythritol diphosphite, wherein the derivative comprises a phosphate and the derivative has a higher molecular weight than that of the bis(2,4-di-tert-butylphenyl)pentaerythritol diphosphite wherein the derivative comprises monophosphate, diphosphate or combinations thereof. An embodiment herein discloses a film comprising a PET, a PBT and a derivative of bis(2,4-di-tert-butylphenyl)pentaerythritol diphosphite, wherein the derivative comprises a phosphate and the derivative has a higher molecular weight than that of the bis(2,4-di-tert-butylphenyl)pentaerythritol diphosphite wherein the derivative comprises bis(2,4-di-tert-butylphenyl)pentaerythritol monophosphate, bis(2,4-di-tert-butylphenyl) pentaerythritol diphosphate or combinations thereof.

In one exemplary method, the molecular weights of the derivative of bis(2,4-di-tert-butylphenyl) pentaerythritol diphosphite is measured by QTOF-LCMS which combines high mass accuracy time of flight mass spectroscopy with the power of a liquid chromatography separation to provide detailed information about the elemental composition of unknowns. The QTOF-LCMS method is described in the TEST METHODS section. The derivative of bis(2,4-di-tert-butylphenyl) pentaerythritol diphosphite that were identified by analyzing a film containing a PET, a PBT and an about 0.1% by weight of bis(2,4-di-tert-butylphenyl)pentaerythritol diphosphite using QTOF-LCMS. Derivatives of bis(2,4-di-tert-butylphenyl)pentaerythritol diphosphite were identified and they were bis(2,4-di-tert-butylphenyl) pentaerythritol monophosphate and bis(2,4-di-tert-butylphenyl) pentaerythritol di-phosphate. The molecular weight of bis(2,4-di-tert-butylphenyl)pentaerythritol monophosphate was 620.6. and the molecular weight of bis(2,4-di-tert-butylphenyl) pentaerythritol diphosphate was 636.6. The analysis also identified residual bis(2,4-di-tert-butylphenyl) pentaerythritol diphosphite and its the molecular weight was 604.6.

The conversion or derivatization of bis(2,4-di-tert-butylphenyl)pentaerythritol diphosphite to bis(2,4-di-tert-butylphenyl)pentaerythritol monophosphate and/or bis(2,4-di-tert-butylphenyl)pentaerythritol diphosphate takes place in the melt phases steps associated with the process for making biaxially oriented film for the polymer in the polymer and metal laminate structure that comprises a blend of PET and PBT and a blushing controlling component to prevent blushing of the polymer film during the retort process. The conversion or derivatization of bis(2,4-di-tert-butylphenyl)pentaerythritol diphosphite to bis(2,4-di-tert-butylphenyl)pentaerythritol monophosphate and/or bis(2,4-di-tert-butylphenyl)pentaerythritol diphosphate occurs initially and at least partially when the Ultranox 626 powder is melt blended with PET to form a 10 wt % Ultranox 626 masterbatch in PET. Further conversion or derivatization of bis(2,4-di-tert-butylphenyl) pentaerythritol diphosphite to bis(2,4-di-tert-butylphenyl)pentaerythritol monophosphate and/or bis(2,4-di-tert-butylphenyl)pentaerythritol diphosphate occurs during extrusion in the melt phase as part of the film making process.

The invention discloses a film comprising a PET, a PBT and a derivative of bis(2,4-di-tert-butylphenyl)pentaerythritol diphosphite, wherein the derivative, generated during processing of the film, comprises a phosphate which has unexpectedly found to lower or minimize co-polyester copolymer formation or lower or minimize transesterification during the preparation of the PET/PBT blend films. The derivative of bis(2,4-di-tert-butylphenyl)pentaerythritol diphosphite has a higher molecular weight than that of the bis(2,4-di-tert-butylphenyl)pentaerythritol diphosphite. This was surprising since Ultranox 626 is designed as an antioxidant and not a trans-esterification inhibitor. This was further surprising as both the blend components being polyesters or crystallizable semi-crystalline polyesters are more likely to incorporate themselves into other co-polyester copolymers or copolymers or transesterify during exposure to higher temperatures and/or longer times in the melt phase during extrusion. The present invention is unlike situations where the other component in a blend with PET can be a non-polyester or not a semi-crystalline polyester, such as an amorphous polymer like polycarbonate, and thus is less likely to transesterify or form polyester copolymers; thus, the formation of co-polyester copolymers of PET or transesterification of PET can be easily controlled. Without being bound by any particular theory, it is suspected that the residual titanium based catalyst system from the PBT is one of the primary drivers for transesterification between PET and PBT and that the Ultranox 626 derivative or derivatives form a complex with the titanium catalyst or masks the titanium catalyst thereby preventing it from initializing or promoting transesterification. An embodiment herein discloses a composition for the polymer film in the polymer and metal laminate structure of the container for food products that comprises a blushing controlling component or blushing-retardant, and a blend of PET and PBT to prevent blushing of the polymer film during the retort process and the Differential Scanning calorimeter (DSC) measured melting point of PET in the polymer film ranged from 244.0° C. to 248.5° C. An embodiment herein discloses a composition for the polymer film in the polymer and metal laminate structure of the container for food products that comprises a blushing controlling component or blushing-retardant and a blend of PET and PBT to prevent blushing of the polymer film during the retort process and the Differential Scanning calorimeter (DSC) measured average melting point of PET in the polymer film ranged from 244.0° C. to 248.5° C. An embodiment herein discloses a composition for the polymer film in the polymer and metal laminate structure of the container for food products that comprises a blushing controlling component or blushing-retardant and a blend of PET and PBT to prevent blushing of the polymer film during the retort process and the DSC measured melting point of PET in the polymer film ranged from 244.0° C. to 250.5° C. An embodiment herein discloses a composition for the polymer film in the polymer and metal laminate structure of the container for food products that comprises a blushing controlling component or blushing-retardant and a blend of PET and PBT to prevent blushing of the polymer film during the retort process and the DSC measured average melting point of PET in the polymer film ranged from 244.0° C. to 250.5° C.

An embodiment herein discloses a composition for the polymer film in the polymer and metal laminate structure of the container for food products that comprises a blushing controlling component or blushing-retardant and a blend of PET and PBT to prevent blushing of the polymer film during the retort process and the DSC measured melting point of PET in the polymer film is greater than 244.0° C. An embodiment herein discloses a composition for the polymer film in the polymer and metal laminate structure of the container for food products that comprises a blushing controlling component or blushing-retardant and a blend of PET and PBT to significantly reduce blushing of the polymer film during the retort process and the DSC measured melting point of the PET in polymer film is greater than 245.0° C. An embodiment herein discloses a composition for the polymer film in the polymer and metal laminate structure of the container for food products that comprises a blushing controlling component or blushing-retardant and a blend of PET and PBT to significantly reduce blushing of the polymer film during the retort process and the DSC measured melting point of the PET in polymer film is greater than 247.0° C. An embodiment herein discloses a composition for the polymer film in the polymer and metal laminate structure of the container for food products that comprises a blushing controlling component or blushing-retardant and a blend of PET and PBT to prevent blushing of the polymer film during the retort process and the DSC measured average melting point of PET in the polymer film is greater than 244.0° C. An embodiment herein discloses a composition for the polymer film in the polymer and metal laminate structure of the container for food products that comprises a blushing controlling component or blushing-retardant and a blend of PET and PBT to significantly reduce blushing of the polymer film during the retort process and the DSC measured average melting point of PET in the polymer film is greater than 245.0° C. An embodiment herein discloses a composition for the polymer film in the polymer and metal laminate structure of the container for food products that comprises a blushing controlling component or blushing-retardant and a blend of PET and PBT to significantly reduce blushing of the polymer film during the retort process and the DSC measured average melting point of PET in the polymer film is greater than 247.0° C.

An embodiment herein discloses a film comprising a PET, a PBT and a derivative of bis(2,4-di-tert-butylphenyl)pentaerythritol diphosphite, wherein the derivative comprises a phosphate and has a higher molecular weight than that of the bis(2,4-di-tert-butylphenyl)pentaerythritol diphosphite wherein Differential Scanning calorimeter (DSC) measured melting point or DSC measured average melting of PET in the polymer film ranged from 244.0° C. to 248.5° C. Another embodiment herein discloses a film comprising a PET, a PBT and a derivative of bis(2,4-di-tert-butylphenyl) pentaerythritol diphosphite, wherein the derivative comprises a phosphate and has a higher molecular weight than that of the bis(2,4-di-tert-butylphenyl) pentaerythritol diphosphite wherein DSC measured melting point or DSC measured average melting of PET in the polymer film ranged from 244.0° C. to 250.0° C.

An embodiment herein discloses a film comprising a PET, a PBT and a derivative of bis(2,4-di-tert-butylphenyl)pentaerythritol diphosphite, wherein the derivative comprises a phosphate and has a higher molecular weight than that of the bis(2,4-di-tert-butylphenyl)pentaerythritol diphosphite wherein DSC measured melting point or DSC measured average melting of PET in the polymer film is greater than 244.0° C. Another embodiment herein discloses a film comprising a PET, a PBT and a derivative of bis(2,4-di-tert-butylphenyl)pentaerythritol diphosphite, wherein the derivative comprises a phosphate and has a higher molecular weight than that of the bis(2,4-di-tert-butylphenyl)pentaerythritol diphosphite wherein DSC measured melting point or DSC measured average melting of PET in the polymer film is greater than 247.0° C.

In contrast to the compositions for the polymer film in the polymer and metal laminate structure of the container for food products that do comprise a blushing controlling component or blushing-retardant, the DSC measured melting point of PET in the polymer film having the same PET and PBT blend composition but without the blushing controlling component or blushing-retardant ranged below 242.5° C. and in some cases ranged below 240.5° C. In some other cases, the DSC measured average melting of the polymer film using the same blend composition of PET and PBT composition but without the blushing controlling component or blushing-retardant, the DSC measured melting point of PET in the polymer film ranged below 242.5° C. and in some cases ranged below 240.5° C. In contrast to the compositions for PET/PBT films that do not comprise the derivative of bis(2,4-di-tert-butylphenyl)pentaerythritol diphosphite with the derivative comprising a phosphate has a higher molecular weight than that of the bis(2,4-di-tert-butylphenyl)pentaerythritol diphosphite, DSC measured melting point or DSC measured average melting of PET in the polymer film ranged below 242.5° C. and in some cases ranged below 240.5° C.

The polymer films or polymeric layers comprising a blushing controlling component or blushing-retardant and a blend of PET and PBT are primarily laminated or thermally laminated or thermally fused onto the exterior surface or the external metal surface of the container for food and contain one or more layers of polymer film or polymeric layer.

The polymer films or polymeric layers comprising a blushing controlling component or blushing-retardant and a blend of PET and PBT also can be laminated or thermally laminated or thermally or fused onto the interior surface or the internal metal surface of the container for food contain one or more layers of polymer film or polymeric layer.

In one embodiment, the polymer film containing the blushing controlling component or blushing-retardant and a blend of PET and PBT may comprise one layer. In another embodiment, the polymer film containing the blushing controlling component or blushing-retardant and a blend of PET and PBT may comprise at least 2 layers. In another embodiment, the polymer film containing the blushing controlling component or blushing-retardant and a blend of PET and PBT may comprise multiple layers.

A multilayered film for the exterior surface or the external metal surface of the container for food may include a container-side or inside layer or bonding layer (for fusing, heat sealing or laminating to the metal), an external environment contacting or direct hot water or steam contacting outside layer or a skin layer. In addition, there may be one or more core layers between the layer between the inside layer or bonding layer and the skin layer. In one embodiment, only the core layer or the core layers of the multilayered film for the exterior surface or the external metal surface of the container contain the blushing controlling component or blushing-retardant. In another embodiment, at least one layer of the multilayered film for the exterior surface or the external metal surface of the container contain the blushing controlling component or blushing-retardant. In another embodiment, all the layers of the multilayered film for the exterior surface or the external metal surface of the container contain the blushing controlling component or blushing-retardant. In another embodiment, the core layer or the core layers of the multilayered film for the exterior surface or the external metal surface of the container contain the blushing controlling component or blushing-retardant. In another embodiment, at least the skin layer of the multilayered film for the exterior surface or the external metal surface of the container that is in direct contact with the external environment comprises the blushing controlling component or blushing-retardant.

In one embodiment, only one layer of the multilayered film for the exterior surface or the external metal surface of the container comprise the blushing controlling component or blushing-retardant and a blend of PET and PBT. In another embodiment, at least one layer of the multilayered film for the exterior surface or the external metal surface of comprise the blushing controlling component or blushing-retardant and a blend of PET and PBT. In another embodiment, the core layer or layers of the multilayered film for the exterior surface or the external metal surface of comprise the blushing controlling component or blushing-retardant and a blend of PET and PBT.

In another embodiment, all the layers of the multilayered film for the exterior surface or the external metal surface comprise the blushing controlling component or blushing-retardant and a blend of PET and PBT. In another embodiment, the core layer or the core layers of the multilayered film for the exterior surface or the external metal surface comprise the blushing controlling component or blushing-retardant and a blend of PET and PBT. In another embodiment, at least skin layer of the multilayered film for the exterior surface or the external metal surface comprise the blushing controlling component or blushing-retardant and a blend of PET and PBT.

A multilayered film for the interior surface or the internal metal surface of the container for food may include a container-side or inside layer or bonding layer (for fusing, heat sealing or laminating to the metal), a food-side or food contacting or outside layer and a food release layer. In addition, there may be one or more core layers between the layer bonded to the metal surface and the food side layer that is in direct contact with the food stored inside the container.

In one embodiment, only the core layer or the core layers the multilayered film for the interior surface or the internal metal surface of the container for food contain the blushing controlling component or blushing-retardant. In another embodiment at least one layer of the multilayered film for the interior surface or the internal metal surface of the container for food contain the blushing controlling component or blushing-retardant. In another embodiment, all the layer of the multilayered film for the interior surface or the internal metal surface of the container for food contain the blushing controlling component or blushing-retardant. In another embodiment, the core layer or the core layers of the multilayered film for the interior surface or the internal metal surface of the container for food contain the blushing controlling component or blushing-retardant.

In one embodiment, only one layer of the multilayered film for the interior surface or the internal metal surface comprises the blushing controlling component or blushing-retardant and a blend of PET and PBT. In another embodiment, at least one layer of the multilayered film for the interior surface or the internal metal surface of comprise the blushing controlling component or blushing-retardant and a blend of PET and PBT. In another embodiment, all the layer of the multilayered film for the interior surface or the internal metal surface comprise the blushing controlling component or blushing-retardant and a blend of PET and PBT.

The single layer or the multi-layered polymer films comprising a blushing controlling component or blushing-retardant and a blend of PET and PBT is a biaxially drawn film. The single layer or the multi-layered polymer films comprising a blushing controlling component or blushing-retardant and a blend of PET and PBT is a biaxially oriented film.

In one embodiment, an embodiment herein discloses a composition for the polymer in the polymer and metal laminate structure of the container for food products that comprises a blushing controlling component or blushing-retardant and a blend of PET and PBT to prevent blushing of the polymer film during the retort process also comprises a dye or a pigment for coloring the polymer. Preferably, the polymer film comprises a multi-layer film and at least one layer of the multi-layer film contains a dye or pigment.

An embodiment herein also discloses the process to prepare the composition for the polymer in the polymer and metal laminate structure of the container for food products that comprises a blushing controlling component and a blend of PET and PBT to prevent blushing of the polymer film during the retort process.

Process for Making Biaxially Oriented Film

Preferably the PET film suitable for use in this invention is biaxially oriented prior to laminating it to the metal substrate.

A masterbatch of 10 wt % Addivant Ultranox 626 and 90 wt % PET is made by add mixing the Ultranox 626 powder and PET pellets into a single or twin-screw extruder, then re-extruding into pellets for use in the film making process.

A pre-mixed polymer blend of resin pellets is well mixed and dried in vacuum dryer at 300° F. for 6 hours. The dried pellets are transferred to a feed hopper, also under vacuum to maintain moisture content below 50 ppm, of a tandem set of single screw extruders with a maximum barrel temperature of 270° C. The molten polymer blend passes through filtration and into a die. The molten polymer exits the die and a temperature of about 250° C. and is cast onto a water-cooled drum whose surface temperature is about 20° C. in order to rapidly cool and solidify the film with minimal or no crystallization.

The single layer extruded film or multi-layer coextruded films are made using a sequential process consisting of extrusion of a film followed by biaxial orientation process. The single layer extruded film or multi-layer coextruded film is extruded after being heated, melted and pumped through one or more single or twin-screw extruders and the extruded film exits a die as a sheet of polymer which is quenched in air before being cast onto a chilled roll or drum, preferably using an electrostatic pinner. The cast sheet after solidification is heated and oriented or stretched in the machine direction (or MD) through a series of heated and different rotation speeds speed rolls, followed by heating in a tenter oven and transverse direction (or TD), i.e. perpendicular to the MD stretching or orientation of the film. The single layer film is extruded using a single or twin-screw extruder and the multilayer coextruded film is made by a single or twin-screw main extruder for melting and conveying the core blend to the die and by one or two sub-extruders for melting and conveying the other layer such as the skin layers to the die. In one embodiment, extrusion through the main extruder takes place at processing temperatures of about 250° C. to 285° C. C and extrusion through the sub-extruders take place at processing temperatures of about 250° C. to 280° C.

The polymer is melted to form a single layer film, as do both the main and the sub polymer melt streams to form a multi-layered film, flow through a die and is cast onto a cooling drum whose surface temperature is controlled at about 21° C. to solidify the non-oriented laminate. The non-oriented laminate sheet is stretched in the longitudinal direction at about 75° C. to 85° C. at a stretching ratio of about 2.5× to 4.5× times the original length and the resulting stretched sheet is optionally annealed at around 70° C. to obtain a uniaxially oriented film.

The uniaxially oriented film is introduced into a tenter and is heated to temperatures between 75° C. and 95° C. and stretched in the transverse direction about 3.5× to 5.0× times the original width and then heat-set or annealed at a temperature from about 180° C. to 220° C. to reduce internal stresses due to the orientation and minimize shrinkage and give a relatively thermally stable biaxially oriented sheet.

Process for Laminating the Film on to the Metal Sheet: A metal substrate, such as tin-free steel (TFS), with a thickness of 0.154 mm (0.0061") to 0.251 mm (0.0099") is preheated to about 190° C. (374° F.). The steel and film were passed through a set of nipped rolls forming the initial bond of film to steel. The film and steel laminate structure are then passed through a secondary heating operation at about 190° C. (374° F.) to 225° C. (437° F.) for about 5 to 10 seconds and then cooled to room temperature by way of a chilled roller or immersion in a water bath. An embodiment herein discloses a method of reducing blushing on a film laminated to a metal, comprising: exposing the film to a retort process, obtaining a substantially blush-free film after the retort process, wherein the film comprises a PET, a PBT and a derivative of bis(2,4-di-tert-butylphenyl)pentaerythritol diphosphite, and wherein the derivative comprises a phosphate and has a higher molecular weight than that of the bis(2,4-di-tert-butylphenyl)pentaerythritol diphosphite.

Another embodiment herein discloses the method of reducing blushing on a film laminated to a metal by exposing the film to a retort process, and obtaining a substantially blush-free film after the retort process wherein the film comprises a PET, a PBT and a derivative of bis(2,4-di-tert-butylphenyl)pentaerythritol diphosphite, and wherein the derivative comprises a phosphate and has a higher molecular weight than that of the bis(2,4-di-tert-butylphenyl)pentaerythritol diphosphite and wherein the derivative has a molecular weight greater than 604. Another embodiment herein discloses the method of reducing blushing on a film laminated to a metal by exposing the film to a retort process, and obtaining a substantially blush-free film after the retort process wherein the film comprises a PET, a PBT and a derivative of bis(2,4-di-tert-butylphenyl)pentaerythritol diphosphite, and wherein the derivative comprises a phosphate and has a higher molecular weight than that of the bis(2,4-di-tert-butylphenyl)pentaerythritol diphosphite and wherein the derivative has a molecular weight in the range of about 605 to 700. Another embodiment herein discloses the method of reducing blushing on a film laminated to a metal by exposing the film to a retort process, and obtaining a substantially blush-free film after the retort process wherein the film comprises a PET, a PBT and a derivative of bis(2,4-di-tert-butylphenyl)pentaerythritol diphosphite, and wherein the derivative comprises a phosphate and has a higher molecular weight than that of the bis(2,4-di-tert-butylphenyl)pentaerythritol diphosphite and wherein the derivative has a molecular weight in the range of about 610 to 660. Another embodiment herein discloses the method of reducing blushing on a film laminated to a metal by exposing the film to a retort process, and obtaining a substantially blush-free film after the retort process wherein the film comprises a PET, a PBT and a derivative of bis(2,4-di-tert-butylphenyl)pentaerythritol diphosphite, and wherein the derivative comprises a phosphate and has a higher molecular weight than that of the bis(2,4-di-tert-butylphenyl)pentaerythritol diphosphite and wherein the derivative has a molecular weight in the range of about 620 to 640. Another embodiment herein discloses the method of reducing blushing on a film laminated to a metal by exposing the film to a retort process, and obtaining a substantially blush-free film after the retort process wherein the film comprises a PET, a PBT and a derivative of bis(2,4-di-tert-butylphenyl)pentaerythritol diphosphite, and wherein the derivative comprises a phosphate and has a higher molecular weight than that of the bis(2,4-di-tert-butylphenyl)pentaerythritol diphosphite and wherein the derivative comprises a monophosphate. Another embodiment herein discloses the method of reducing blushing on a film laminated to a metal by exposing the film to a retort process, and obtaining a substantially blush-free film after the retort process wherein the film comprises a PET, a PBT and a derivative of bis(2,4-di-tert-butylphenyl)pentaerythritol diphosphite, and wherein the derivative comprises a phosphate and has a higher molecular weight than that of the bis(2,4-di-tert-butylphenyl)pentaerythritol diphosphite and wherein the monophosphate comprises bis(2,4-di-tert-butylphenyl)pentaerythritol monophosphate. Another embodiment herein discloses the method of reducing blushing on a film laminated to a metal by exposing the film to a retort process, and obtaining a substantially blush-free film after the retort process wherein the film comprises a PET, a PBT and a derivative of bis(2,4-di-tert-butylphenyl) pentaerythritol diphosphite, and wherein the derivative comprises a phosphate and has a higher molecular weight than that of the bis(2,4-di-tert-butylphenyl)pentaerythritol diphosphite and wherein the derivative comprises a diphosphate. Another embodiment herein discloses the method of reducing blushing on a film laminated to a metal by exposing the film to a retort process, and obtaining a substantially blush-free film after the retort process wherein the film comprises a PET, a PBT and a derivative of bis(2,4-di-tert-butylphenyl)pentaerythritol diphosphite, and wherein the derivative comprises a phosphate and has a higher molecular weight than that of the bis(2,4-di-tert-butylphenyl)pentaerythritol diphosphite and wherein the diphosphate comprises bis(2,4-di-tert-butylphenyl)pentaerythritol diphosphate. Another embodiment herein discloses the method of reducing blushing on a film laminated to a metal by exposing the film to a retort process, and obtaining a substantially blush-free film after the retort process wherein the film comprises a PET, a PBT and a derivative of bis(2,4-di-tert-butylphenyl)pentaerythritol diphosphite, and wherein the derivative comprises a phosphate and has a higher molecular weight than that of the bis(2,4-di-tert-butylphenyl)pentaerythritol diphosphite and wherein the derivative comprises a monophosphate and a diphosphate. Another embodiment herein discloses the method of reducing blushing on a film laminated to a metal by exposing the film to a retort process, and obtaining a substantially blush-free film after the retort process wherein the film comprises a PET, a PBT and a derivative of bis(2,4-di-tert-butylphenyl)pentaerythritol diphosphite, and wherein the derivative comprises a phosphate and has a higher molecular weight than that of the bis(2,4-di-tert-butylphenyl)pentaerythritol diphosphite and wherein the derivative comprises bis(2,4-di-tert-butylphenyl)pentaerythritol monophosphate, bis(2,4-di-tert-butylphenyl)pentaerythritol diphosphate or combinations thereof.

Test Methods

Thickness: Overall film thickness of a monolithic film was determined by measuring thickness of a stack of 10 sheets of the film by micrometer and dividing the measurement by 10. Measurements are repeated every 9 inches (22.9 cm) in the transverse direction of the film. Thickness of each coextruded layer of the multilayer film and total thickness were measured by adding alumina pigment particles to alternating film layers effective to differentiate adjacent layers of small cross-sectional pieces of film cut perpendicular to the plane of the film and examined by scanning electron microscope (SEM).

Surface Roughness: Surface roughness was measured with a Surfcorder SE-500 surface roughness measurement instrument (Kosaka Laboratory, Ltd., Japan). The measurements were repeated 3 times and the average value of Ra was recorded.

Intrinsic viscosity: IV was measured using a solution viscometer at 25° C. Sample solution was prepared by dissolving at 103° C. 100±1 mg polymer in 30 mL solution of a mixture of 40% 1,1,2,2-tetrachloroethane and 60% phenol. IV is calculated by the formula, IV=[(tavg/t0−1)−2 ln(tavg/t0]0.5/[(sample/20)*(100%)], where tavg and t0 are the average of four trial times in seconds to run dissolved polymer solution and solvent solution only through the viscometer, respectively.

Carboxyl End Group Concentration: Carboxyl end group concentration was determined by ASTM Standard method D7409-07.

Trans-esterification (% ester exchange): calculated by taking the difference between the melt temperature of pure PET (255° C.) and the PET melt peak of the finished film as measured by DSC method below, all divided by 2.1(° C. per mol % substitution). Method provided by David A. Schiraldi, Department of Macromolecular Science & Engineering, Case Western Reserve University. The DSC method is consistent with, and can be directly correlated to, NMR results. The DSC method is preferred due to ease of measurement and calculation.

DSC Method: The sample is put in a pan and a lid was crimped on. The sample in the pan and an empty pan with crimped lid (control) are heated at a rate of 10° C./min from 40° C. to 280° C. (1st heat) and held there for 5 min, then cooled to 40° C. at a rate of 10° C./min and held at 40° C. for 5 minutes before being heated at a rate of 10° C./min to 280° C. (2nd heat).

Blush resistance: Laminated film-on-metal samples are stamped into metal container lids. Metal containers (food can bodies) that have approximate interior dimensions of 2.75 inches in diameter and 4 inches high are filled with tap water at approximately 25° C. The sample lids are attached to the containers using a seamer to form a finished food can. Finished cans are placed into an Allpax retort chamber lid-side-down so that the water inside the container is in contact with the lid. The retort sequence is 103 minutes in total, 4 minutes to ramp up the steam pressure to 15.3 psi (215° F.), 90 minutes at 251° F., followed by 9 minutes of cooling with city water (chamber flooding). Samples are removed from the chamber, allowed to cool to room temperature, and evaluated visually for blushing. Blushing results are evaluated by holding the can at arm's length with the sample lid perpendicular to the floor and approximately 12" below eye level as follows.

a) Excellent: Film is completely clear with no hazing or clouding as compared to a non-steamed control sample.

b) Good: samples show slight, isolated areas of hazing or clouding as compared to a non-steamed control sample when viewed. Metal substrate is still clearly visible through the film on all parts of the sample.

c) Fair: Up to 50% of the sample surface shows obvious clouding or hazing with the metal substrate still visible through the film.

d) Poor: More than 50% of the entire surface of the sample has hazed over with sufficient opacity to partially obscure the metal surface.

Chemical resistance: Laminated film/metal sheets are cut into 2 inch×2 inch (5 cm×5 cm) samples. The samples are reverse impacted using a Gardco impact tester, Model #5512, (Paul N. Gardner Company, Inc., Pompano Beach, Fla.) with 2 lb (4.4 kg) weight and 0.500 inch (1.25 cm) diameter die at a height of 14 cm. Impacted samples are immersed in Walgreens Tub & Tile Cleaner at 100° F. (37.8° C.) and evaluated for delamination and color change after 30, 60, and 90 day soak periods.

QTOF-LCMS (Quadrupole Time of Flight Liquid Chromatography-Mass Spectrometry) Analysis: QTOF-LCMS requires that the molecule of interest be ionized. Thus, data is typically plotted in positive and negative modes indicating the charge on the ions. Ion formation is accomplished through the formation of a molecular adduct using a charge carrying species after separation of the sample using Quadrupole Time of Flight Liquid Chromatography. Typical charge carriers in positive ion mode includes $H^+$, $Na^+$, $K^+$, $NH_4^+$ etc. Also, elimination of a proton can lead to the formation of $(M-H)^-$ ion during the process of fragmentation. Thus, the observed mass is typically the mass of the compound plus or minus the mass of the charge carrier with respect to positive or negative modes. Here, the plot of m/z versus relative ion abundance is carried out to determine the molecular mass of the given compounds or components under inspection.

In the mass spectral analysis of PET-PBT film containing anti-blush component of the current invention, total mass of the parent molecule or fragment ion formed from the film can be viewed by addition of either proton or ammonium ion or sodium ion. Also, elimination of proton from the parent molecule or fragment ion present in the film can be viewed. The (m/z) of the ionized parent molecule or fragmentated ions formed after ionization of the parent molecules in the MS plot is analyzed to aid in identification of possible structures of the compounds present in the film.

Sample Preparation: Approximately 300 mg of the sample was extracted with 5 mL of methanol/isopropanol (80/20, v/v) with 1% formic acid at 60° C. for 2 hours. The same solvent was injected as a method blank. Both the sample and the method blank were analyzed using QTOF-LCMS.

The following conditions were used for the qualitative QTOF-LCMS analysis:
Instrument: Agilent 6520A QTOF LCMS with Agilent 1290 HPLC system
Source: Dual ESI Source
Flow Rate: 0.65 ml/min
Temperature: 45° C.
Column: Agilent Zorbax Eclipse Plus C-8, 1.8 μm, 2.1×50 mm
Gradient Conditions
Solvent A: 0.05% aqueous formic acid/0.03% ammonium hydroxide/5% methanol
Solvent B: Methanol with 0.05% formic acid
Solvent C: Isopropanol Run time=10.3 minutes
Post Time=1.5 minutes

| Time (min) | % composition Solvent A | % composition Solvent B | % composition Solvent C |
|---|---|---|---|
| 0.3 | 100 | 0 | 0 |
| 5.3 | 0 | 80 | 20 |
| 8.3 | 0 | 50 | 50 |

Detector Settings:
Gas Temp: 350° C.
Drying Gas: 12 L/min
Nebulizer: 15 psi
VCap: 3500 (0-5.5 min), 4500 (5.5-10.3 min)
Fragmentor Voltage: 125 (0-5.5 min); 220 (5.5-10.3 min.)
Skimmer: 65
OCT 1 RF VPP: 750
Ionization Mode: ESI
Ion Polarity: positive & negative, separately
Mass Range: 80-3000 scan mode; 50-3000 MSMS mode

EXAMPLES

Production Film Examples

Example 1: Standard Antiblush Production Film without Ultranox (First Comparative Example)

This example describes the extrusion followed by biaxial stretching to form a biaxially oriented film using a blend in which the two major components are PET and PBT polymers. The input polymer blend is pre-mixed in the ratio of 55% by weight of PBT homopolymer 1200M from Toray Plastics and 45% by weight of PET which consists of 25% by weight of PET homopolymer F21MP from Toray Plastics, 5% by weight of PET homopolymer with 2% of 2.5 micron average size silica particles for friction control and handling from Toray Plastics, and 15% by weight of a PET based pinning masterbatch F27M from Toray Plastics. The pre-mixed polymer blend is well mixed and dried in vacuum dryer at 300° F. for 6 hours. The dried pellets are transferred to a feed hopper, also under vacuum to maintain moisture content below 50 ppm, of tandem set of single screw extruders with a maximum barrel temperature of 270° C. and an estimated residence time of about 13 minutes. The molten polymer blend exits the dye and a die temperature of about 250° C. and is cast onto a water-cooled drum whose surface temperature is about 20° C. in order to rapidly cool and solidify the film with minimal or no crystallization. The average thickness of the extruded film is 167 μm.

The extruded and cast film is biaxially oriented by first preheating the film to around 80° F. by way of heated rollers and then stretched 3.4× in the machine direction and quickly cooled to 20° C. The film is then reheated in a tentering oven to about 80° C. and subsequently stretched 4.0× in the transverse direction. The biaxially drawn film is then annealed at about 210° C. to the increase the crystallinity on lock in the polymer orientation. The average film thickness of the biaxially oriented film is 12 μm.

The intrinsic viscosity (IV) of the biaxially oriented film of Example 1 was 0.765. The DSC scan of the biaxially oriented film showed two distinct melting peaks for PET and PBT. The melting points (Tm) of the PET were measured at three points along the transverse direction of the web and they were 241.4° C., 242.0° C. and 240.8° C. for operator side, center, and drive side respectively. The corresponding degree of transesterification at the locations of the Tm measurements was calculated to be 6.47 mol %, 6.17 mol % and 6.78 mol % respectively for an overall average of 6.47 mol %. The blushing performance of this film when laminated to steel and tested as represented by Example 7 of this application is fair.

Example 2: Antiblush Production Film with 0.1% Ultranox

This example describes the extrusion followed by biaxial stretching to form a biaxially oriented film using a blend in which the two major components are PET and PBT polymers. The input polymer blend is pre-mixed in the ratio of 55% by weight of PBT homopolymer 1200 M from Toray Plastics and 45% by weight of PET which consists of 24% by weight of PET homopolymer F21MP from Toray Plastics, 5% by weight of PET homopolymer with 2% of 2.5 micron average size silica particles for friction control and handling from Toray Plastics, and 15% of a PET based pinning masterbatch F27M from Toray Plastics, and 1% of a PET homopolymer PQB7-76 Prime melt blended with 10% of a blushing-retardant or blushing controlling component, Ultranox 626 from Addivant, so that the blushing-retardant or blushing controlling component is 0.1% by weight of the total blend composition of the film. The pre-mixed polymer blend is well mixed and dried in vacuum dryer at 300° F. for 6 hours. The dried pellets are transferred to a feed hopper, also under vacuum to maintain moisture content below 50 ppm, of tandem set of single screw extruders with a maximum barrel temperature of 270° C. and an estimated residence time of about 13 minutes. The molten polymer blend exits the dye and a die temperature of about 250° C. and is cast onto a water-cooled drum whose surface temperature is about 20° C. in order to rapidly cool and solidify the film with minimal or no crystallization. The average thickness of the extruded film is 167 μm.

The extruded and cast film is biaxially oriented by first preheating the film to around 80° F. by way of heated rollers and then stretched 3.4× in the machine direction and quickly cooled to 20° C. The film is then reheated in a tentering oven to about 80° C. and subsequently stretched 4.0× in the transverse direction. The biaxially drawn film is then annealed at about 210° C. to the increase the crystallinity on lock in the polymer orientation. The average film thickness of the biaxially oriented film is 12 μm.

The IV of the biaxially oriented film containing blushing-retardant or blushing controlling component of Example 2 was 0.772. The DSC scan of the biaxially oriented film containing blushing-retardant or blushing controlling component of Example 2 showed two distinct melting peaks for PET and PBT. The melting points (Tm) of the PET were measured at three points along the transverse direction of the web and they and were 244.8° C., 245.2° C., AND 245.5° C. for operator side, center, and drive side respectively. The corresponding degree of transesterification at the locations of the Tm measurements was calculated to be 4.88 mol %, 4.66 mol %, and 4.50 mol %, respectively for an overall average of 4.68 mol %. The melting point (Tm) of the PET increased by an average of 3.8° C. and the degree of transesterification between the PET and PBT decreased across the web by an average of 1.79 mol % for the biaxially oriented film containing blushing-retardant or blushing controlling component compared to the biaxially oriented film not containing blushing-retardant or blushing controlling component. The blushing performance of this film when laminated to steel and tested as represented by Example 8 of this application is excellent.

Pilot Film Examples

Example 3: Pilot Antiblush Film without Ultranox

This example describes the extrusion followed by biaxial stretching to form a biaxially oriented film using a blend in which the two major components are PET and PBT polymers. The input polymer blend is pre-mixed in the ratio of 55% by weight of PBT homopolymer 1200M from Toray Plastics and 45% by weight of PET which consists of 25% by weight of PET homopolymer F21MP from Toray Plastics, 5% by weight of PET homopolymer with 2% of 2.5 micron average size silica particles for friction control and handling from Toray Plastics, and 15% by weight of a PET based pinning masterbatch F27M from Toray Plastics. The pre-mixed polymer blend is well mixed and dried at 250° F. for 12 hours. The dried pellets are transferred to a feed hopper of a single screw extruder with a maximum barrel temperature of 277° C. and an estimated residence time of less than 4 minutes. The molten polymer blend exits the dye and a die temperature of about 250° C. and is cast onto a water-cooled drum whose surface temperature is about 20° C. in order to rapidly cool and solidify the film with minimal or no crystallization. The average thickness of the extruded film is 165 µm.

The extruded and cast film is biaxially oriented by first preheating the film to around 71° F. by way of heated rollers and then stretched 2.8× in the machine direction and cooled to 32° C. The film is then reheated in a tentering oven to about 74° C. and subsequently stretched 4.0× in the transverse direction. The biaxially drawn film is then annealed at about 193° C. to the increase the crystallinity on lock in the polymer orientation. The average film thickness of the biaxially oriented film is 12 µm.

The intrinsic viscosity (IV) of the biaxially oriented film was 0.826. The DSC scan of the biaxially oriented film showed two distinct melting peaks for PET and PBT. The melting point (Tm) of the PET was 252.3° C. and the melting point (Tm) of the PBT was 220.4° C. The corresponding degree of transesterification was calculated to be 1.28%

Example 4: Pilot Antiblush Film with 0.1 wt % Ultranox

This example describes the extrusion followed by biaxial stretching to form a biaxially oriented film using a blend in which the two major components are PET and PBT polymers. The input polymer blend is pre-mixed in the ratio of 55% by weight of PBT homopolymer 1200M from Toray Plastics and 45% by weight of PET which consists of 24% by weight of PET homopolymer F21 MP from Toray Plastics, 5% by weight of PET homopolymer with 2% of 2.5 micron average size silica particles for friction control and handling from Toray Plastics, and 15% of a PET based pinning masterbatch F27M from Toray Plastics, and 1% of a PET homopolymer PQB7-76 Prime melt blended with 10% by weight of a blushing-retardant or blushing controlling component, Ultranox 626 from Addivant, so that the blushing-retardant or blushing controlling component is 0.1% by weight of the total blend composition of the film. The pre-mixed polymer blend is well mixed and dried at 250° F. for 12 hours. The dried pellets are transferred to a feed hopper of a single screw extruder with a maximum barrel temperature of 277° C. and an estimated residence time of less than 4 minutes. The molten polymer blend exits the dye and a die temperature of about 250° C. and is cast onto a water-cooled drum whose surface temperature is about 20° C. in order to rapidly cool and solidify the film with minimal or no crystallization. The average thickness of the extruded film is 165 µm.

The extruded and cast film is biaxially oriented by first preheating the film to around 71° F. by way of heated rollers and then stretched 2.8× in the machine direction and cooled to 32° C. The film is then reheated in a tentering oven to about 74° C. and subsequently stretched 4.0× in the transverse direction. The biaxially drawn film is then annealed at about 193° C. to the increase the crystallinity on lock in the polymer orientation. The average film thickness of the biaxially oriented film is 12 µm.

The intrinsic viscosity (IV) of the biaxially oriented film was 0.854. The DSC scan of the biaxially oriented film showed two distinct melting peaks for PET and PBT. The melting point (Tm) of the PET was 253.1° C. and the melting point (Tm) of the PBT was 221.1° C. The corresponding degree of transesterification was calculated to be 0.92% and represents a significant reduction in trans-esterification compared to Example 3 without Ultranox 626 added.

Example 5: Pilot Antiblush Film with 0.2% Ultranox

This example describes the extrusion followed by biaxial stretching to form a biaxially oriented film using a blend in which the two major components are PET and PBT polymers. The input polymer blend is pre-mixed in the ratio of 55% by weight of PBT homopolymer 1200M from Toray Plastics and 45% by weight of PET which consists of 23% by weight of PET homopolymer F21MP from Toray Plastics, 5% by weight of PET homopolymer with 2% of 2.5 micron average size silica particles for friction control and handling from Toray Plastics, and 15% by weight of a PET based pinning masterbatch F27M from Toray Plastics, and 2% by weight of a PET homopolymer PQB7-76 Prime melt blended with 10% by weight of a blushing-retardant or blushing controlling component, Ultranox 626 from Addivant, so that the blushing-retardant or blushing controlling component is 0.2% by weight of the total blend composition of the film. The pre-mixed polymer blend is well mixed and dried at 250° F. for 12 hours. The dried pellets are transferred to a feed hopper of a single screw extruder with a maximum barrel temperature of 277° C. and an estimated residence time of less than 4 minutes. The molten polymer blend exits the dye and a die temperature of about 250° C. and is cast onto a water-cooled drum whose surface temperature is about 20° C. in order to rapidly cool and solidify the film with minimal or no crystallization. The average thickness of the extruded film is 165 µm.

The extruded and cast film is biaxially oriented by first preheating the film to around 71° F. by way of heated rollers and then stretched 2.8× in the machine direction and cooled to 32° C. The film is then reheated in a tentering oven to about 74° C. and subsequently stretched 4.0× in the transverse direction. The biaxially drawn film is then annealed at about 193° C. to the increase the crystallinity on lock in the polymer orientation. The average film thickness of the biaxially oriented film is 12 µm.

The intrinsic viscosity (IV) of the biaxially oriented film was 0.851. The DSC scan of the biaxially oriented film showed two distinct melting peaks for PET and PBT. The melting point (Tm) of the PET was 253.5° C. and the melting point (Tm) of the PBT was 221.1° C. The corresponding degree of transesterification was calculated to be 0.70%. Again, this represents a further significant reduction in trans-esterification compared to Example 4 with 0.1% Ultranox and Example 3 without Ultranox 626.

Example 6: Pilot Antiblush Film with 0.5% Ultranox

This example describes the extrusion followed by biaxial stretching to form a biaxially oriented film using a blend in which the two major components are PET and PBT polymers. The input polymer blend is pre-mixed in the ratio of 55% by weight of PBT homopolymer 1200M from Toray Plastics and 45% by weight of PET which consists of 20% by weight of PET homopolymer F21MP from Toray Plastics, 5% by weight of PET homopolymer with 2% of 2.5 micron average size silica particles for friction control and handling from Toray Plastics, and 15% of a PET based pinning masterbatch F27M from Toray Plastics, and 5% by weight of a PET homopolymer PQB7-76 Prime melt blended with 10% by weight of a blushing-retardant or blushing controlling component, Ultranox 626 from Addivant, so that the blushing-retardant or blushing controlling component is 0.5% by weight of the total blend composition of the film. The pre-mixed polymer blend is well mixed and dried at 250° F. for 12 hours. The dried pellets are transferred to a feed hopper of a single screw extruder with a maximum barrel temperature of 277° C. and an estimated residence time of less than 4 minutes. The molten polymer blend exits the dye and a die temperature of about 250° C. and is cast onto a water-cooled drum whose surface temperature is about 20° C. in order to rapidly cool and solidify the film with minimal or no crystallization. The average thickness of the extruded film is 165 μm.

The extruded and cast film is biaxially oriented by first preheating the film to around 71° F. by way of heated rollers and then stretched 2.8× in the machine direction and cooled to 32° C. The film is then reheated in a tentering oven to about 74° C. and subsequently stretched 4.0× in the transverse direction. The biaxially drawn film is then annealed at about 193° C. to the increase the crystallinity on lock in the polymer orientation. The average film thickness of the biaxially oriented film is 12 μm.

The intrinsic viscosity (IV) of the biaxially oriented film was 0.794. The DSC scan of the biaxially oriented film showed two distinct melting peaks for PET and PBT. The melting point (Tm) of the PET was 254.4° C. and the melting point (Tm) of the PBT was 220.3° C. The corresponding degree of transesterification was calculated to be 0.30%, which represents a still further reduction in transesterification compared to Example 5 with 0.2 wt % Ultranox, Example 4 with 0.1 wt % Ultranox, and Example 3 without Ultranox 626.

Laminate Examples

Example 7: Standard Production Grade Antiblush Film without Ultranox Laminated to Steel (Second Comparative Example)

The biaxially oriented film of Example 1 was thermally laminated onto surface of a 0.21 mm tin free steel sheet by preheating the metal surface to about 195° C. and bringing the film into contact with the metal surface by passing the film and metal through a pair of nipped rollers. Subsequently the entire laminated structure is reheated to 190° C. for about 5 seconds by passing through secondary heating process, then rapidly cooled by immersion in a water bath at about 20° C.

The biaxially oriented film-steel laminate was tested for its Blush Resistance according to the method described under Test Methods. The Blush Resistance of the biaxially oriented film-steel laminate was Fair, meaning that the film underwent non-uniform change in crystallinity and refractive index creating a hazy appearance.

Example 8: The Production Antiblush Film with 0.1 wt % Ultranox of Example 2, Laminated to Steel The biaxially oriented film of Example 2 containing blushing-retardant or blushing controlling component was thermally laminated onto surface of a 0.21 mm tin free steel sheet by preheating the metal surface to about 195° C. and bringing the film into contact with the metal surface by passing the film and metal through a pair of nipped rollers. Subsequently the entire laminated structure is reheated to 190° C. for about 5 seconds by passing through secondary heating process, then rapidly cooled by immersion in a water bath at about 20° C.

The biaxially oriented blushing-retardant or blushing controlling component containing film-steel laminate was tested for its Blush Resistance according to the method described under Test Methods. The Blush Resistance of biaxially oriented blushing-retardant or blushing controlling component containing film-steel laminate from Example 5 was Excellent. The Blush Resistance of the biaxially oriented film containing blushing-retardant or blushing controlling component is significantly higher or better compared to the biaxially oriented film not containing blushing-retardant or blushing controlling component.

Analytical Examples

Example 9: Analysis of Ultranox 626 Derivatives in Example 2 by Mass Spectroscopy The derivative of bis(2,4-di-tert-butylphenyl)pentaerythritol diphosphite that were identified by analyzing a film containing a PET, a PBT and an about 0.1 wt % of bis(2,4-di-tert-butylphenyl)pentaerythritol diphosphite using QTOF-LCMS described in the TEST METHODS section.

Structures of ions (m/z) formed after fragmentation of the derivatives of bis(2,4-di-tert-butylphenyl)pentaerythritol diphosphite and their associated Mass Spectrum are analyzed to identify the structures of the derivatives of bis(2,4-di-tert-butylphenyl)pentaerythritol diphosphite before ionization. In other words, by analyzing the fragmentation pattern of the specific chemical species or compound observed using Mass Spectra plots of Abundance (counts vs. mass to charge ratio (m/z), the LC-MS analysis identified the derivatives of bis(2,4-di-tert-butylphenyl)pentaerythritol diphosphite before ionization.

At least two derivatives of bis(2,4-di-tert-butylphenyl) pentaerythritol diphosphite were identified and they were bis(2,4-di-tert-butylphenyl)pentaerythritol monophosphate and bis(2,4-di-t-butylphenyl)pentaerythritol diphosphate. Also detected was residual bis(2,4-di-tert-butylphenyl)pentaerythritol diphosphite.

Figure 2A:
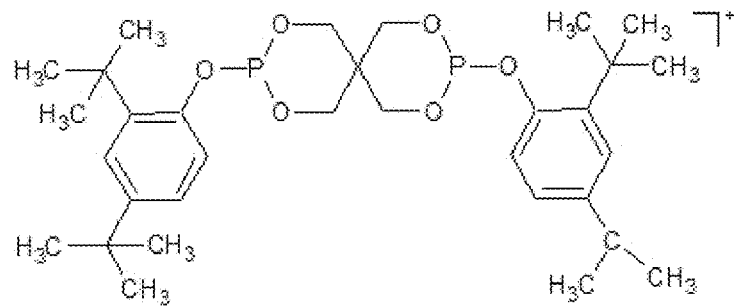
FIG. 2a: Structure of ions formed after fragmentation of one methyl group from Bis(2,4-di-tert-butylphenyl)pentaerythritol diphosphite (Mass: 589.6).
Figure 2A:
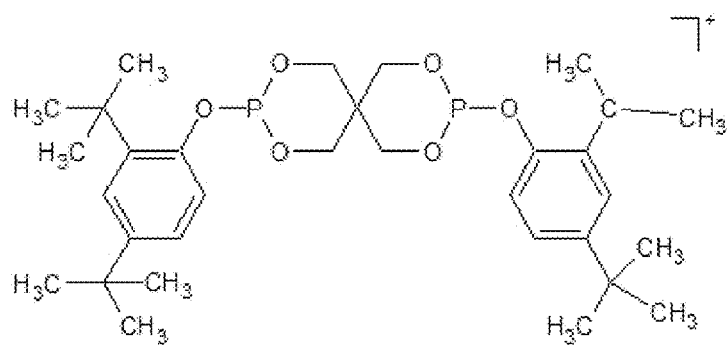
Figure 2B:
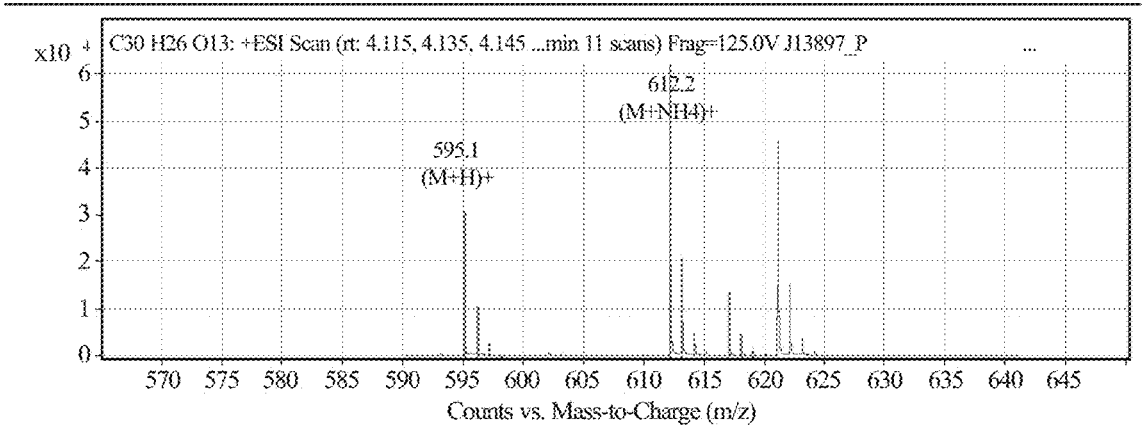
FIG. 2b: Mass Spectrum for the fragmentation of one methyl group from Bis(2,4-di-tert-butylphenyl)pentaerythritol diphosphite.
Figure 3A:
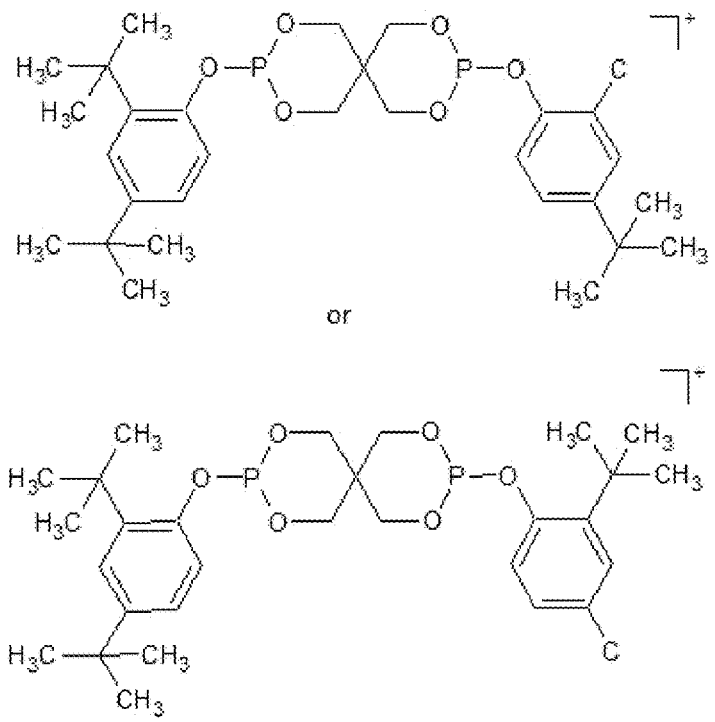
FIG. 3a: Structure of ions formed after fragmentation of three methyl groups from Bis(2,4-di-tert-butylphenyl)pentaerythritol diphosphite (Mass: 559.5).
Figure 3B:
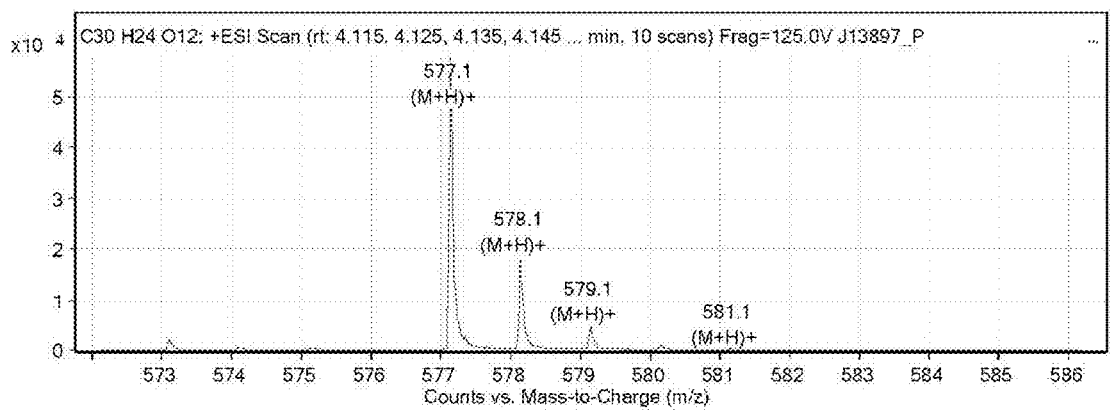
FIG. 3b: Mass Spectrum for the fragmentation of three methyl groups from Bis(2,4-di-tert-butylphenyl)pentaerythritol diphosphite.
Figure 4A:
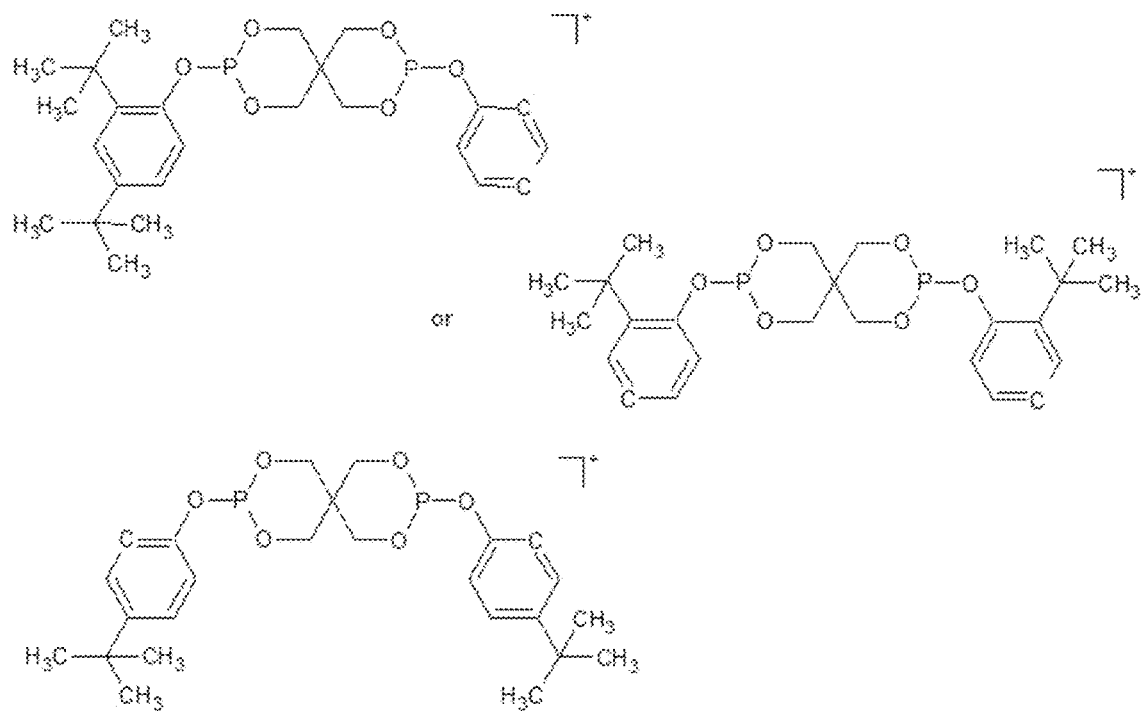
FIG. 4a: Structure of ions formed after fragmentation of two tert-butyl groups from Bis(2,4-di-tert-butylphenyl)pentaerythritol diphosphite (Mass: 490.6).
Figure 4B:
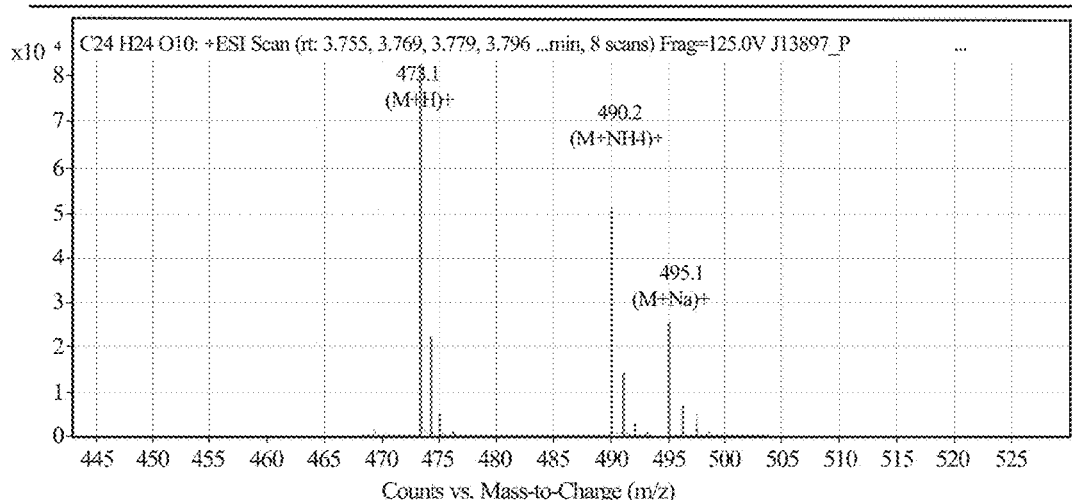
FIG. 4b: Mass Spectrum for the fragmentation of two tert-butyl groups from Bis(2,4-di-tert-butylphenyl)pentaerythritol diphosphite.
Figure 5A:
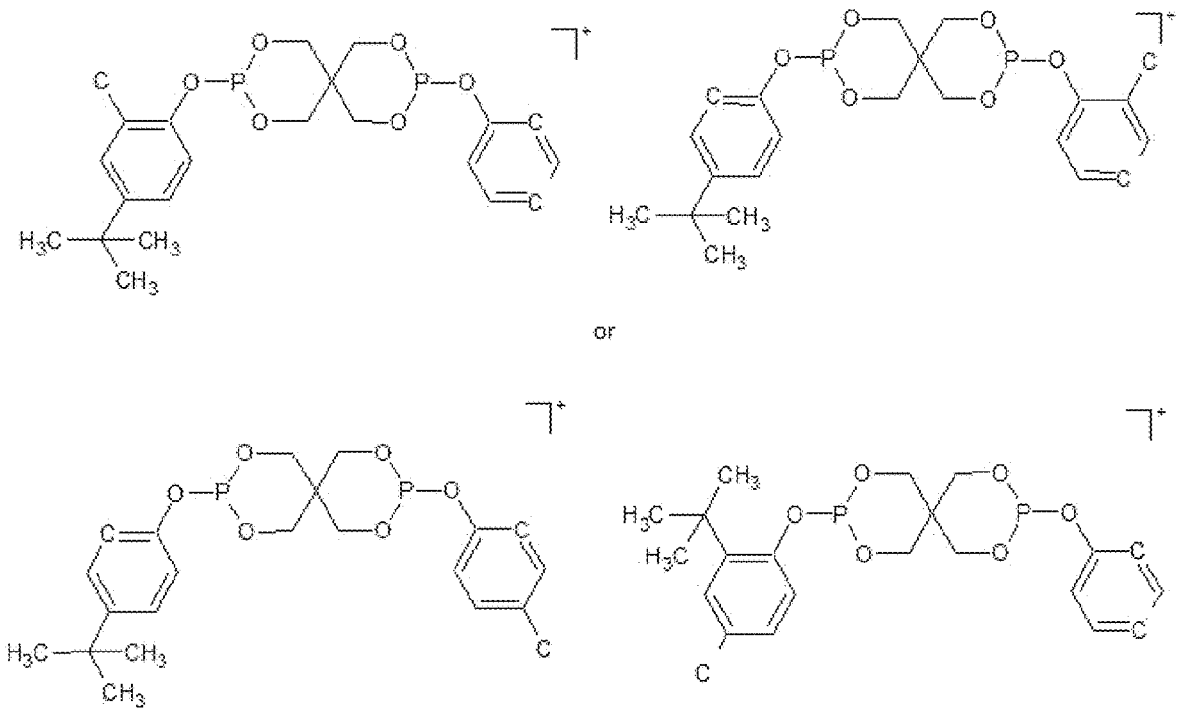
FIG. 5a: Structure of ions formed after fragmentation of two tert-butyl and three methyl groups from Bis(2,4-di-tert-butylphenyl)pentaerythritol diphosphite (Mass: 445.3).
Figure 5B:
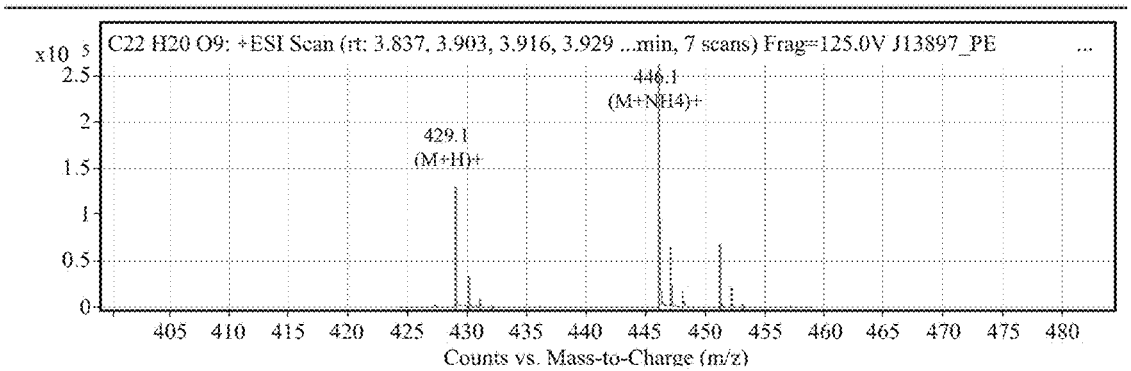
FIG. 5b: Mass Spectrum for the fragmentation of two tert-butyl and three methyl groups from Bis(2,4-di-tert-butylphenyl)pentaerythritol diphosphite.
Figure 6A:
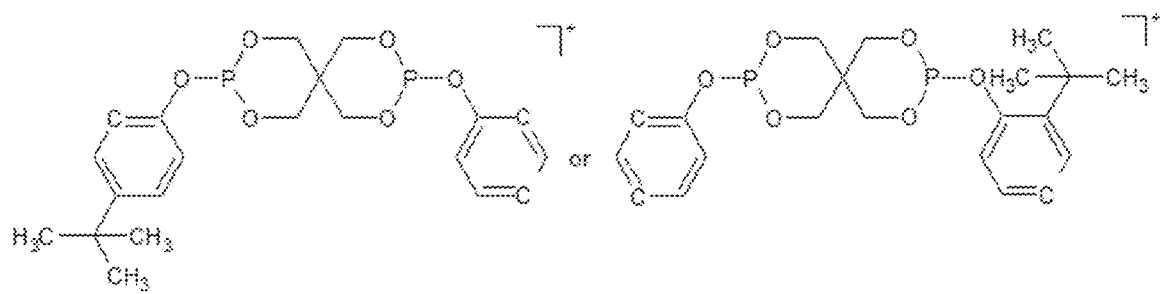
FIG. 6a: Structure of ions formed after fragmentation of three tert-butyl groups from Bis(2,4-di-tert-butylphenyl) pentaerythritol diphosphite (Mass: 433.3).
Figure 6B:
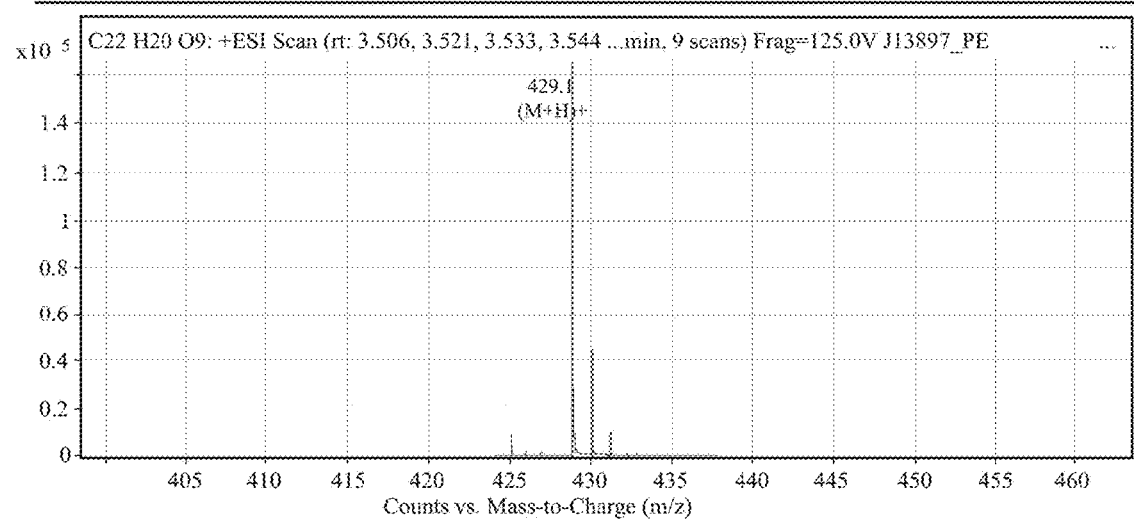
FIG. 6b: Mass Spectrum for the fragmentation of three tert-butyl groups from Bis(2,4-di-tert-butylphenyl)pentaerythritol diphosphite.
Figure 7A:
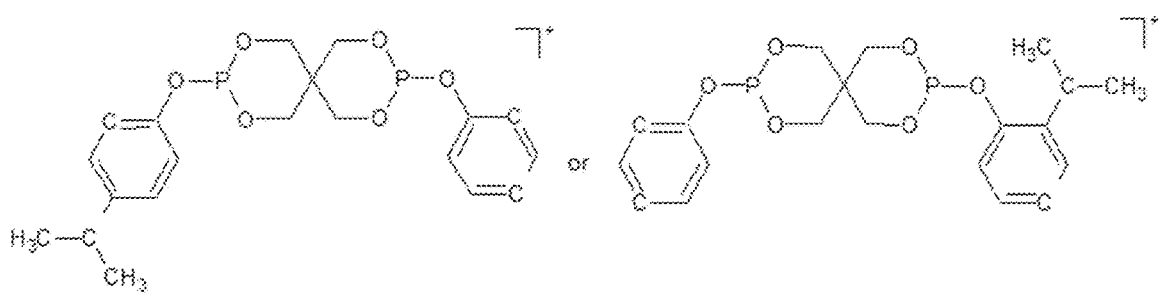
FIG. 7a: Structure of ions formed after fragmentation of three tert-butyl and one methyl groups from Bis(2,4-di-tert-butylphenyl)pentaerythritol diphosphite (Mass: 418.3).
Figure 7B:
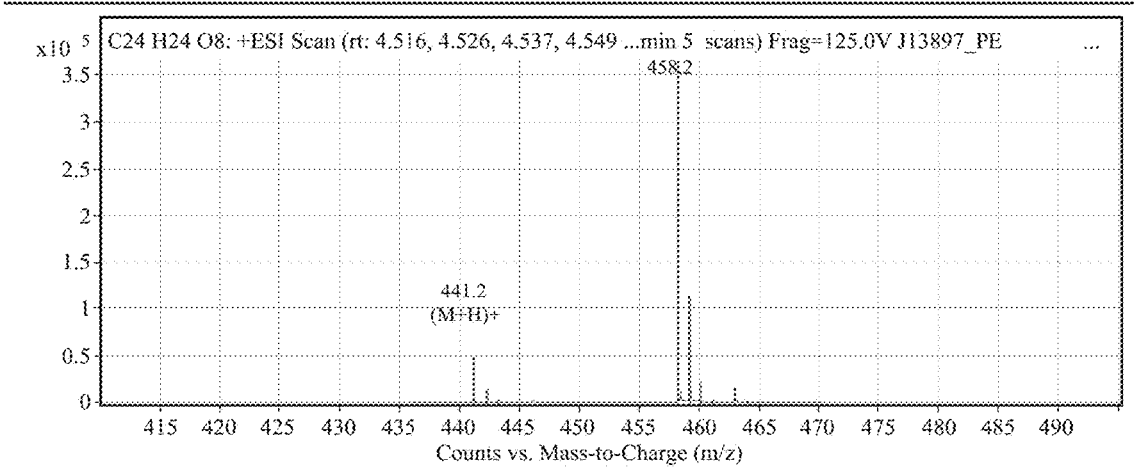
FIG. 7b: Mass Spectrum for the fragmentation of three tert-butyl and one methyl groups from Bis(2,4-di-tert-butylphenyl)pentaerythritol diphosphite.
Figure 8A:
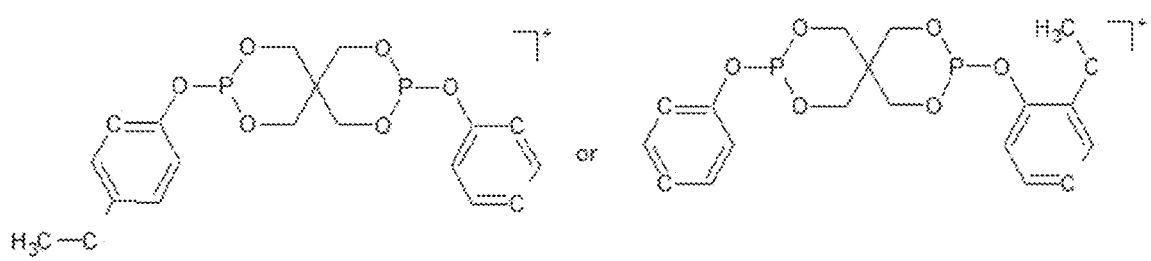
FIG. 8a: Structure of ions formed after fragmentation of three tert-butyl and two methyl groups from Bis(2,4-di-tert-butylphenyl)pentaerythritol diphosphite (Mass: 403.2).
Figure 8B:
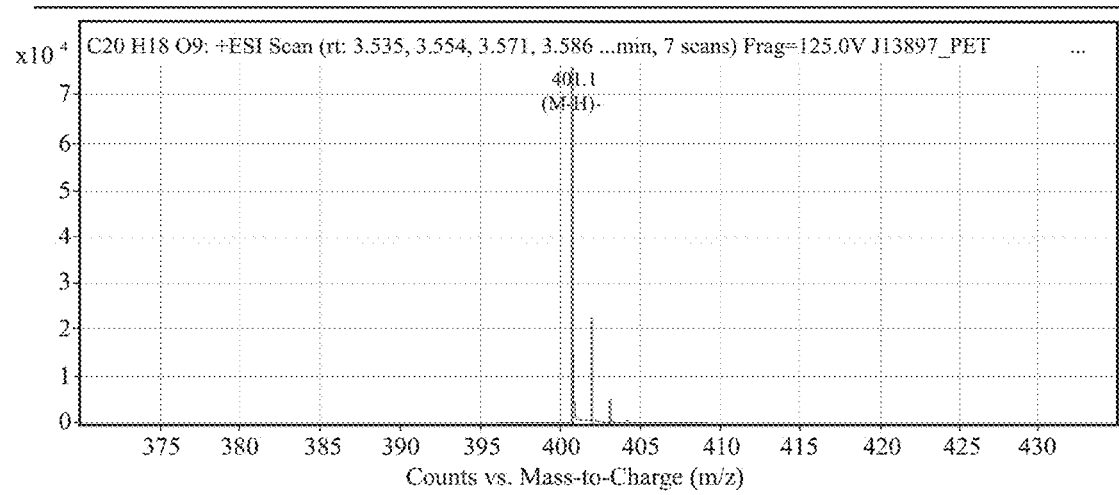
FIG. 8b: Mass Spectrum for the fragmentation of three tert-butyl and two methyl groups from Bis(2,4-di-tert-butylphenyl)pentaerythritol diphosphite.
Figure 9A:
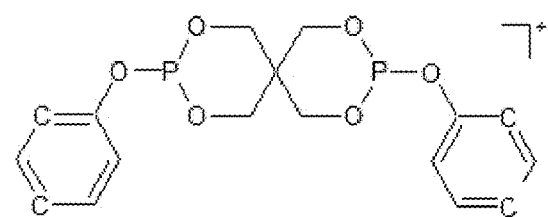
FIG. 9a: Structure of ion formed after fragmentation of four tert-butyl groups from Bis(2,4-di-tert-butylphenyl)pentaerythritol diphosphite (Mass: 376.2).
Figure 9B:
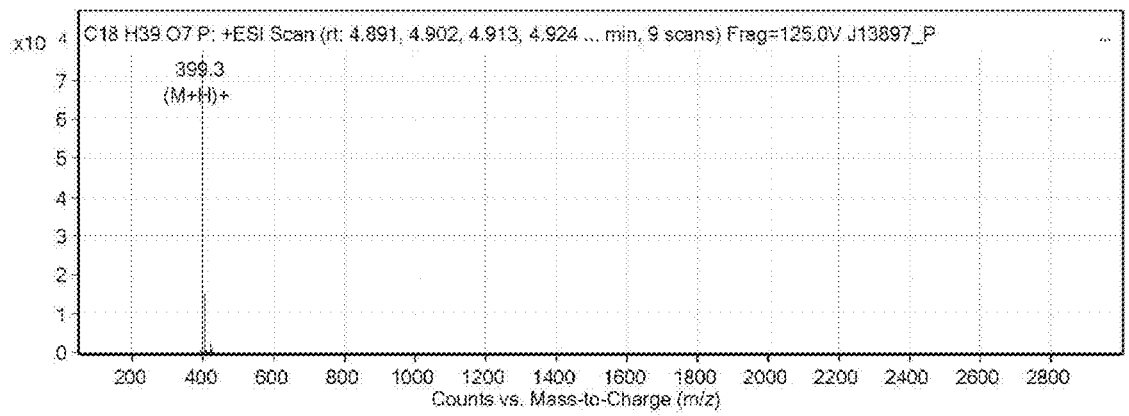
FIG. 9b Mass Spectrum for the fragmentation of four tert-butyl groups from Bis(2,4-di-tert-butylphenyl)pentaerythritol diphosphite.
Figure 10A:
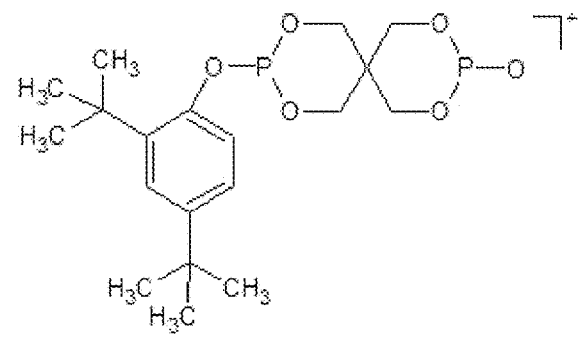
FIG. 10a: Structure of ion formed after fragmentation of one 2,4-di-tert-butylphenyl group from Bis(2,4-di-tert-butylphenyl)pentaerythritol diphosphite (Mass: 415.3).
Figure 10B:
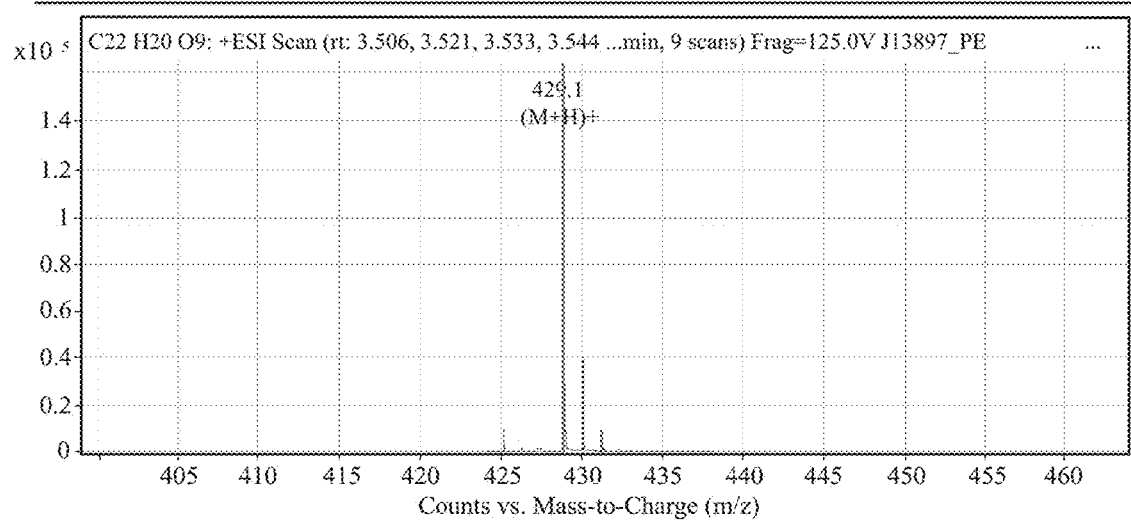
FIG. 10b: Mass Spectrum for the fragmentation of one 2,4-di-tert-butylphenyl group from Bis(2,4-di-tert-butylphenyl)pentaerythritol diphosphite.
Figure 11A:
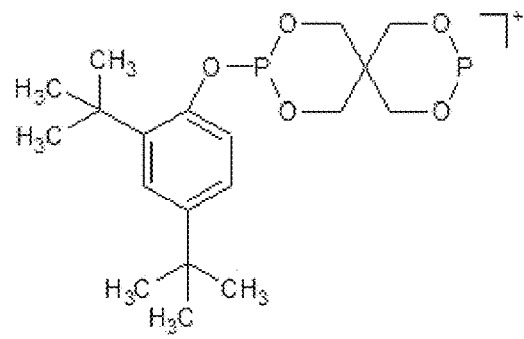
FIG. 11a: Structure of ion formed after fragmentation of one 2,4-di-tert-butylphenoxy group from Bis(2,4-di-tert-butylphenyl)pentaerythritol diphosphite (Mass: 399.3).
Figure 11B:
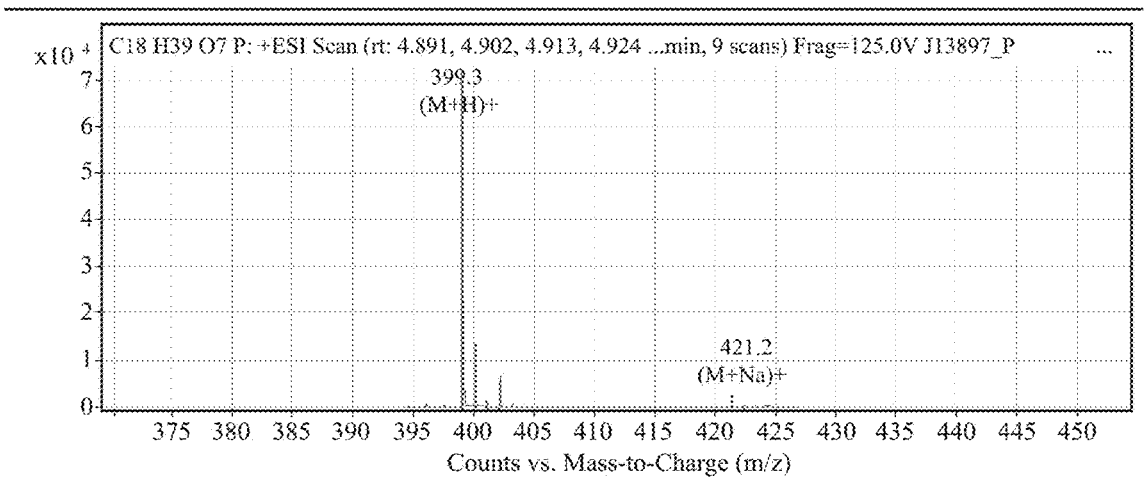
FIG. 11b: Mass Spectrum for the fragmentation of one 2,4-di-tert-butylphenoxy group from Bis(2,4-di-tert-butylphenyl)pentaerythritol diphosphite.
Figure 12:
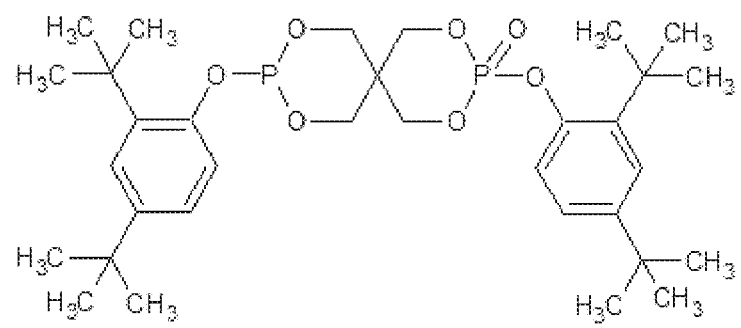
FIG. 12: Structure of Bis(2,4-di-tert-butylphenyl)pentaerythritol monophosphate (Mass: 620.6).
Figure 13A:
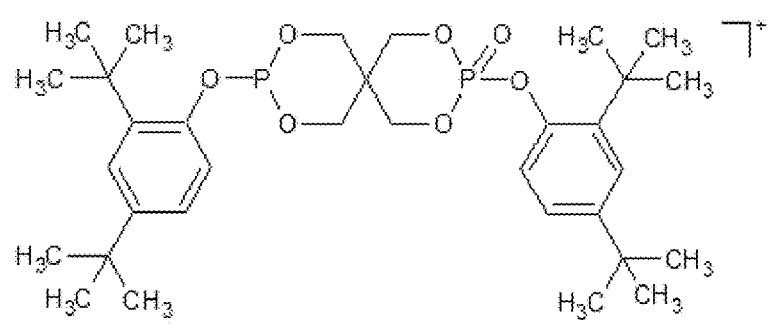
FIG. 13a: Structure of Bis(2,4-di-tert-butylphenyl)pentaerythritol monophosphate ion (Mass: 620.6).
Figure 13B:
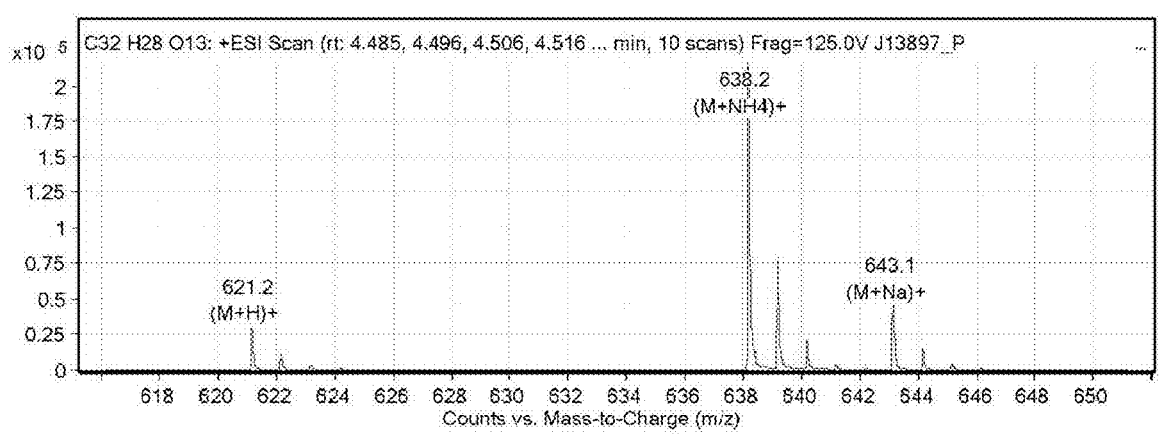
FIG. 13b: Mass spectrum of Bis(2,4-di-tert-butylphenyl) pentaerythritol monophosphate ion.
Figure 14A:
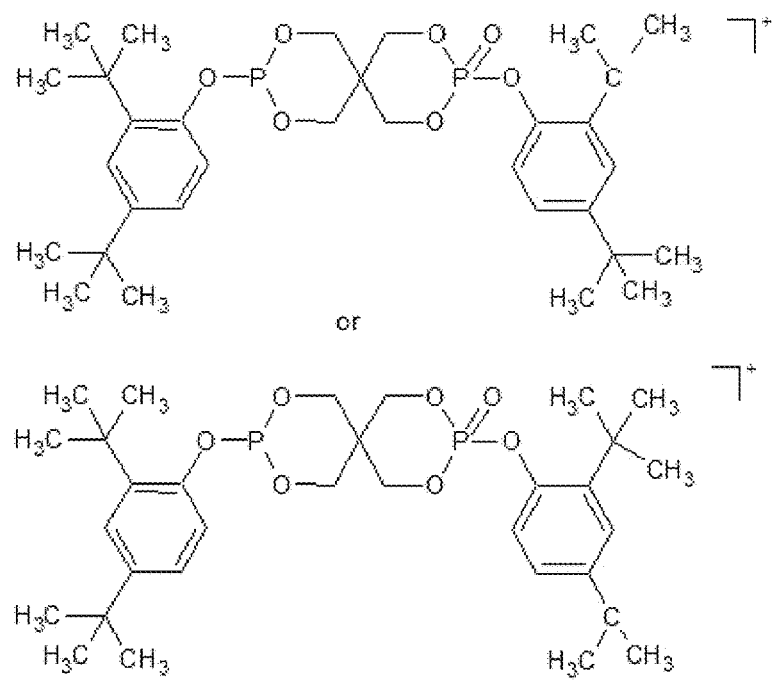
FIG. 14a: Structure of ions formed after fragmentation of one methyl group from Bis(2,4-di-tert-butylphenyl)pentaerythritol monophosphate (Mass: 605.6).
Figure 14B:
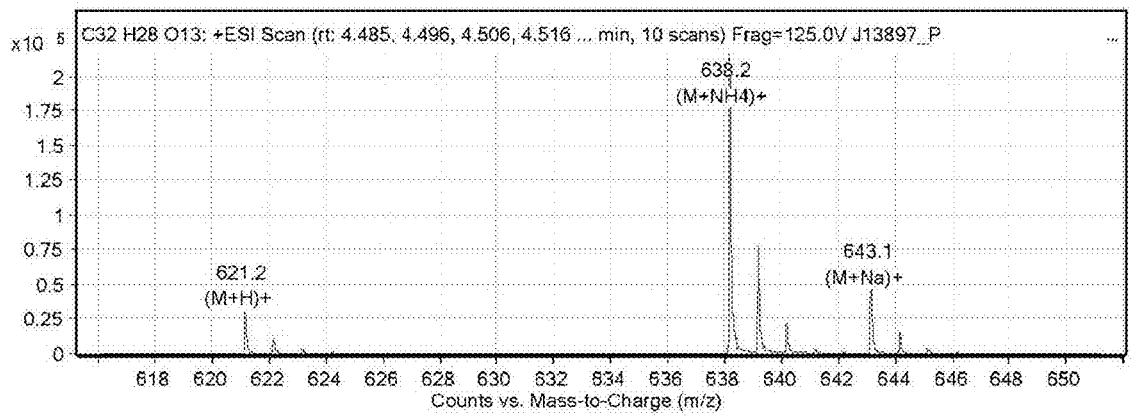
FIG. 14b: Mass Spectrum for the fragmentation of one methyl group from Bis(2,4-di-tert-butylphenyl)pentaerythritol monophosphate.
Figure 15A:
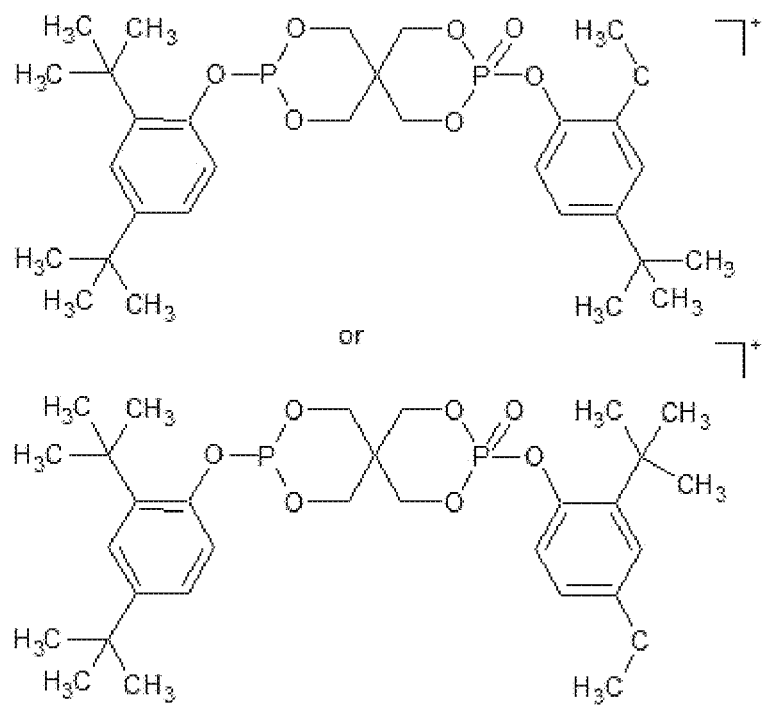
FIG. 15a: Structure of ions formed after fragmentation of two methyl groups from Bis(2,4-di-tert-butylphenyl)pentaerythritol monophosphate (Mass: 590.6).
Figure 15B:
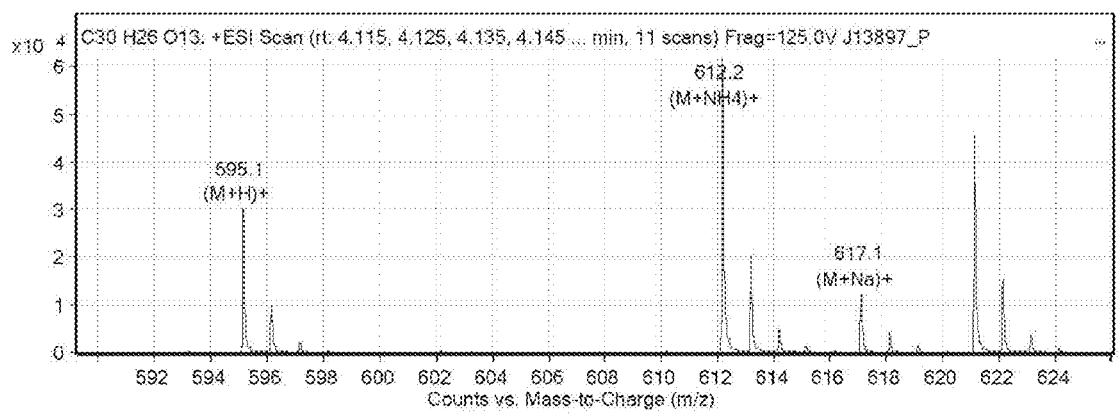
FIG. 15b: Mass Spectrum for the fragmentation of two methyl groups from Bis(2,4-di-tert-butylphenyl)pentaerythritol monophosphate.
Figure 16A:
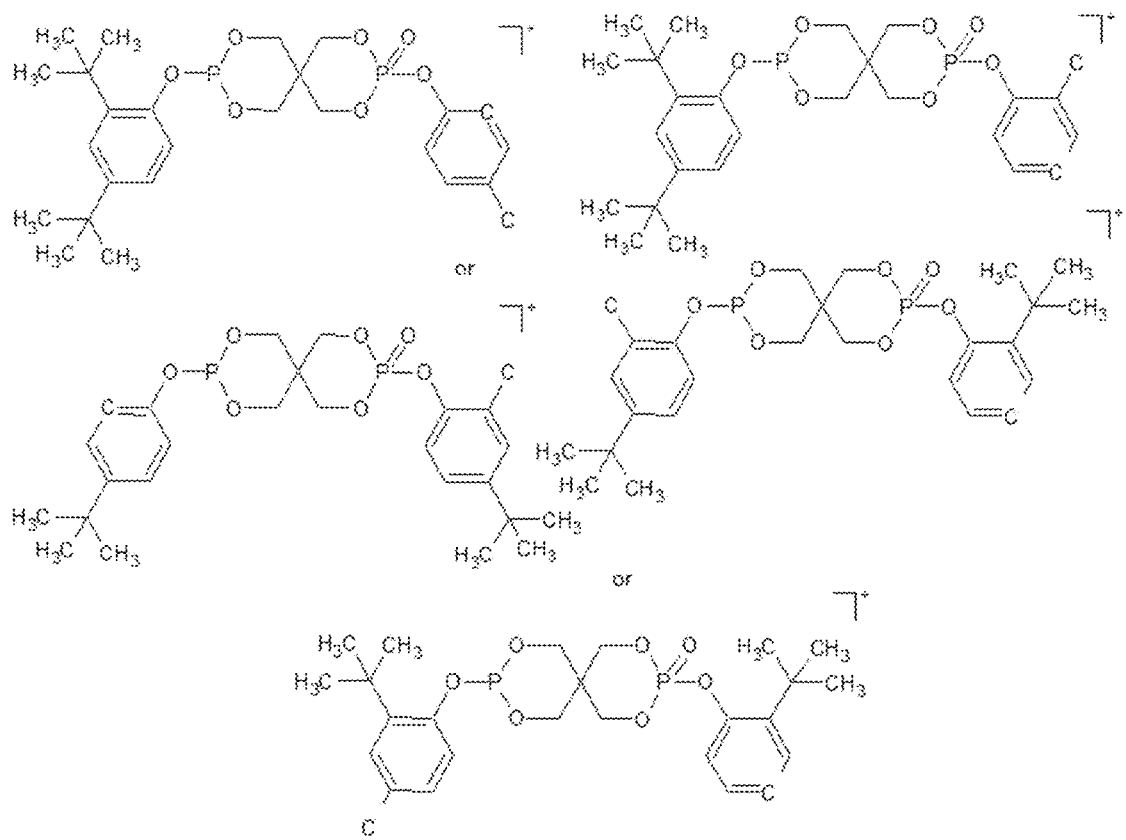
FIG. 16a: Structure of ions formed after fragmentation of one tert-butyl and three methyl groups from Bis(2,4-di-tert-butylphenyl)pentaerythritol monophosphate (Mass: 518.4).
Figure 16B:
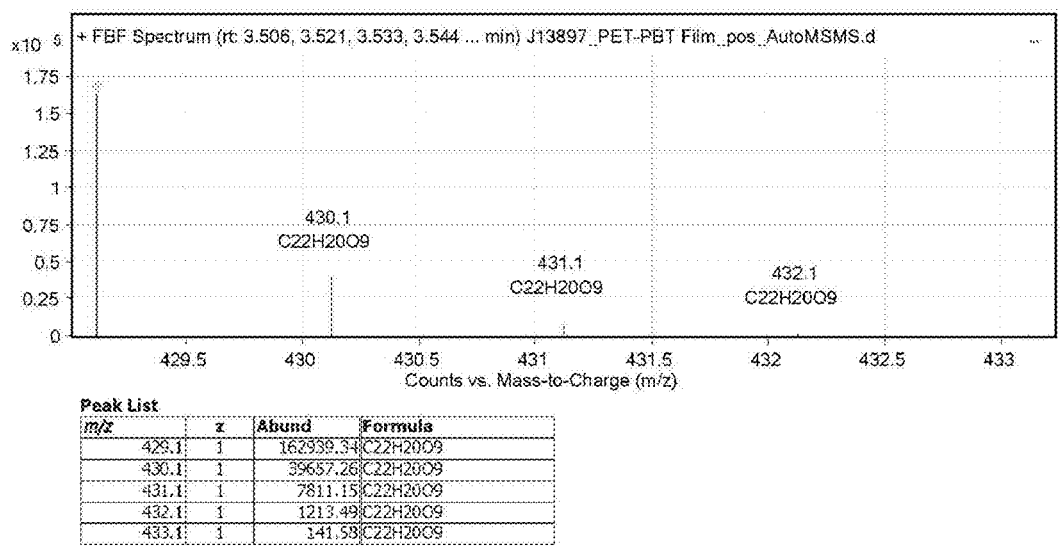
FIG. 16b: Mass Spectrum for the fragmentation of one tert-butyl and three methyl groups from Bis(2,4-di-tert-butylphenyl)pentaerythritol monophosphate.
Figure 17A:
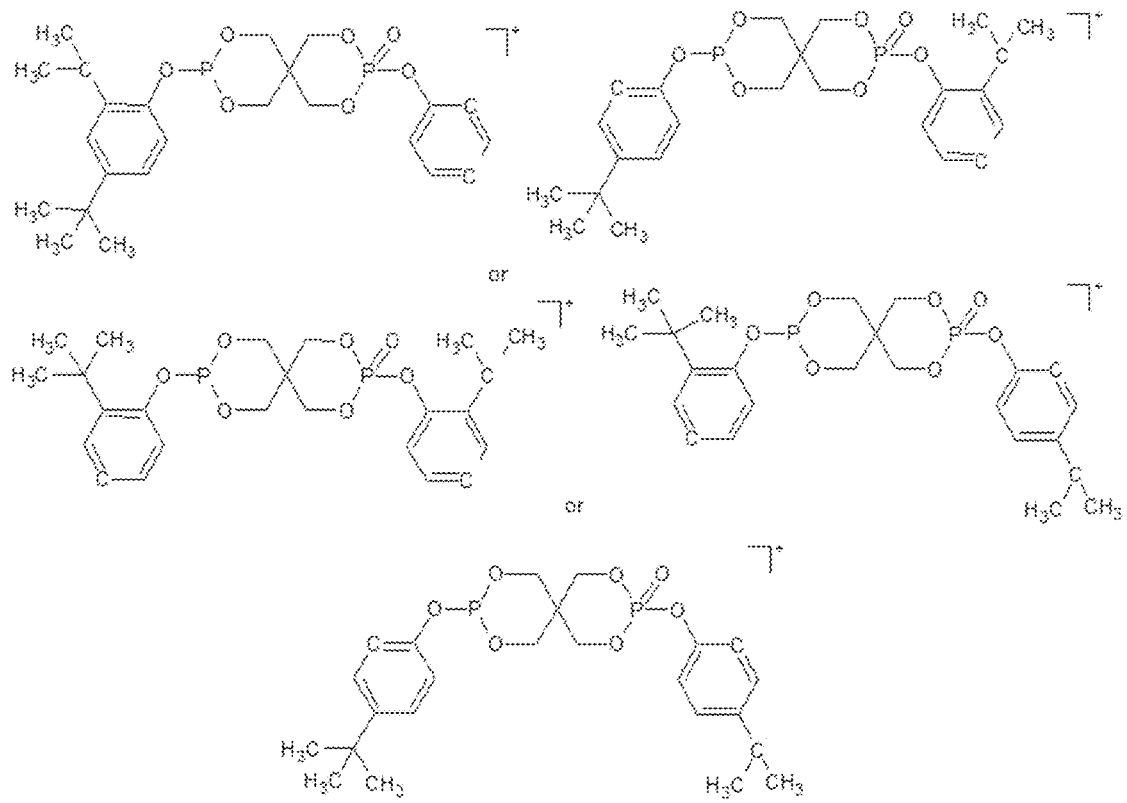
FIG. 17a: Structure of ions formed after fragmentation of two tert-butyl and one methyl groups from Bis(2,4-di-tert-butylphenyl)pentaerythritol monophosphate (Mass: 491.4).
Figure 17B:
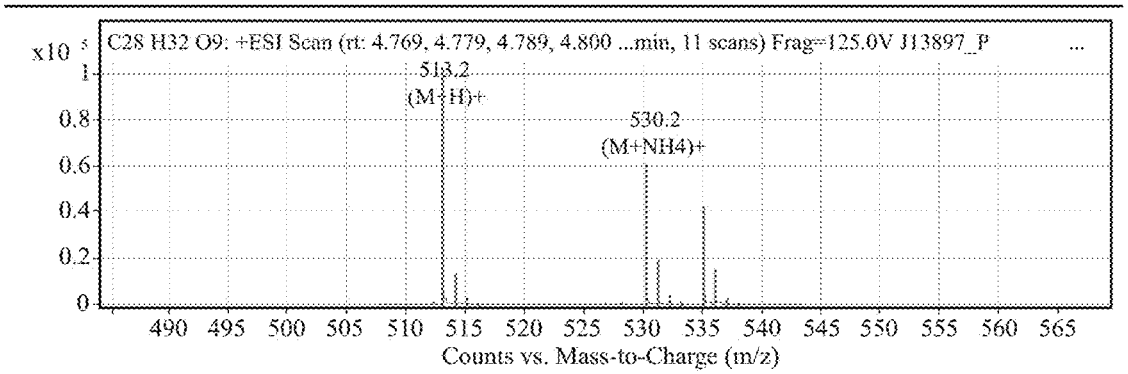
FIG. 17b: Mass Spectrum for the fragmentation of two tert-butyl and one methyl groups from Bis(2,4-di-tert-butylphenyl)pentaerythritol monophosphate.
Figure 18A:
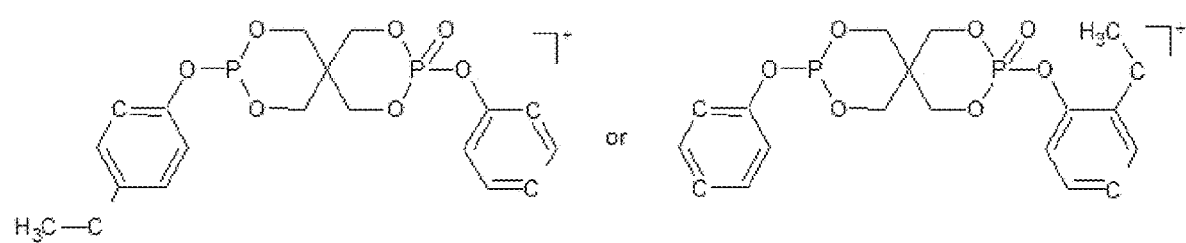
FIG. 18a: Structure of ions formed after fragmentation of three tert-butyl and two methyl groups from Bis(2,4-di-tert-butylphenyl)pentaerythritol monophosphate (Mass: 419.2).
Figure 18B:
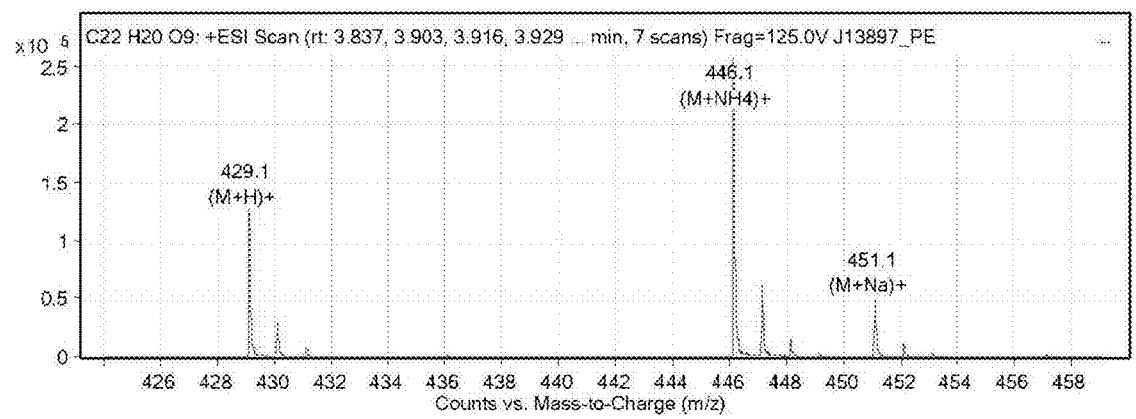
FIG. 18b: Mass Spectrum for the fragmentation of three tert-butyl and two methyl groups from Bis(2,4-di-tert-butylphenyl)pentaerythritol monophosphate.
Figure 19A:
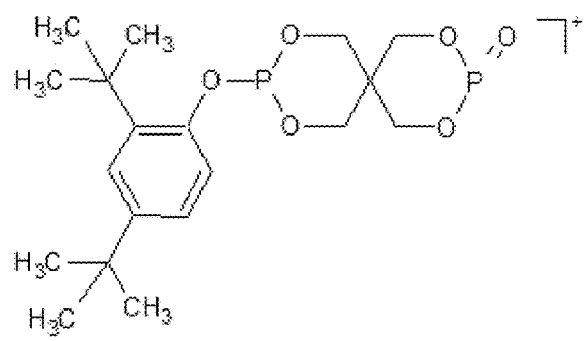
FIG. 19a: Structure of ion formed after fragmentation of one 2,4-di-tert-butylphenoxy group from Bis(2,4-di-tert-butylphenyl)pentaerythritol monophosphate (Mass: 415.3).
Figure 19B:
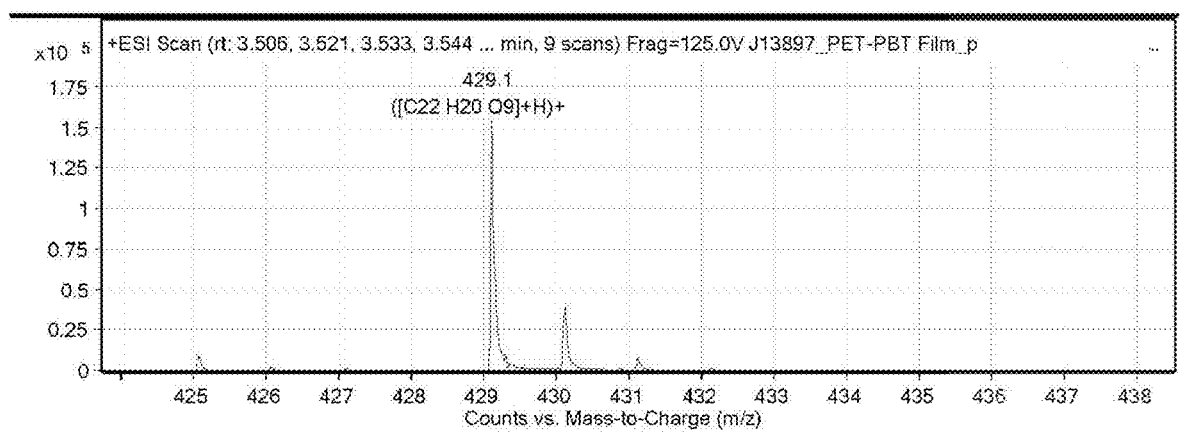
FIG. 19b: Mass Spectrum for the fragmentation of one 2,4-di-tert-butylphenoxy group from Bis(2,4-di-tert-butylphenyl)pentaerythritol monophosphate.
Figure 20A:
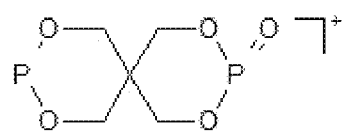
FIG. 20a: Structure of ion formed after fragmentation of two 2,4-di-tert-butylphenoxy groups from Bis(2,4-di-tert-butylphenyl)pentaerythritol monophosphate (Mass: 210.0).
Figure 20B:
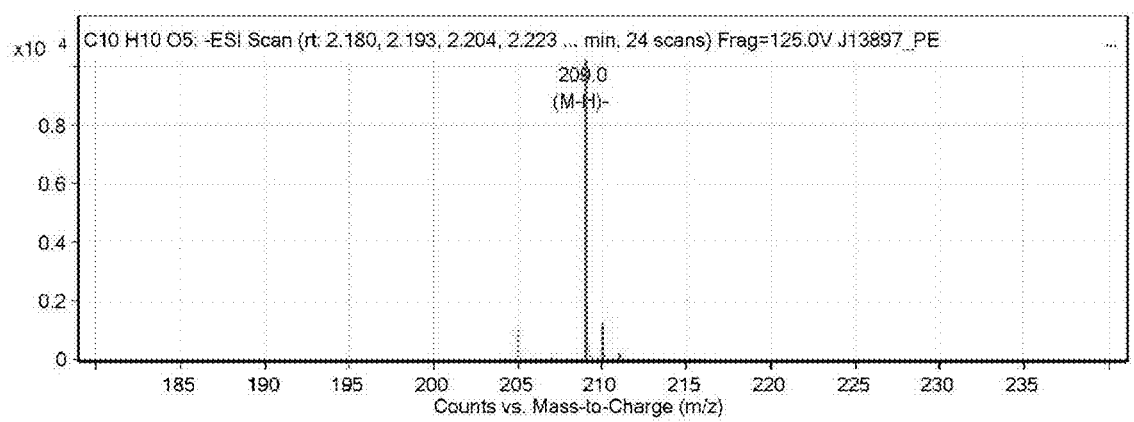
FIG. 20b: Mass Spectrum for the fragmentation of two 2,4-di-tert-butylphenoxy groups from Bis(2,4-di-tert-butylphenyl)pentaerythritol monophosphate.
Figure 21:
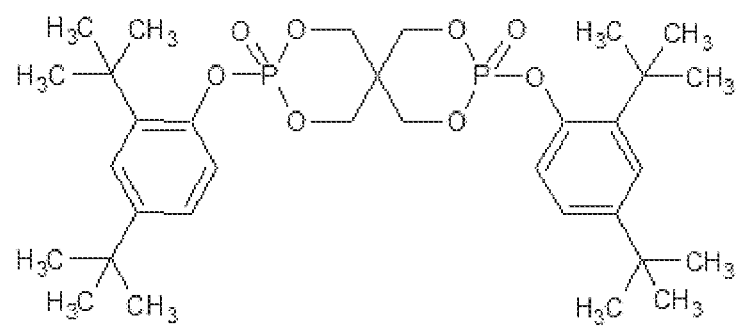
FIG. 21: Structure of Bis(2,4-di-tert-butylphenyl)pentaerythritol diphosphate (Mass: 636.6).
Figure 22A:
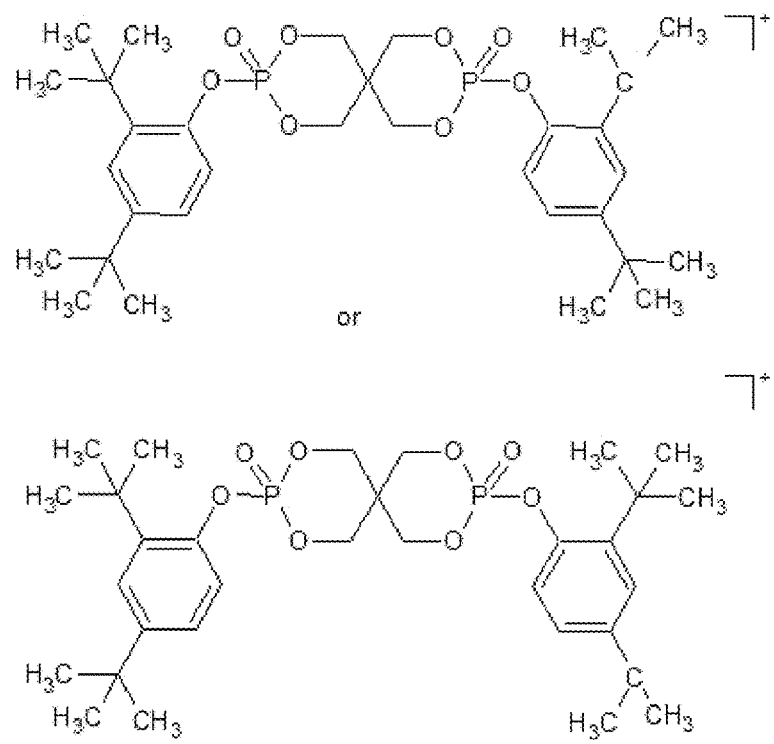
FIG. 22a: Structure of ions formed after fragmentation of one methyl group from Bis(2,4-di-tert-butylphenyl)pentaerythritol diphosphate (Mass: 621.6).
Figure 22B:
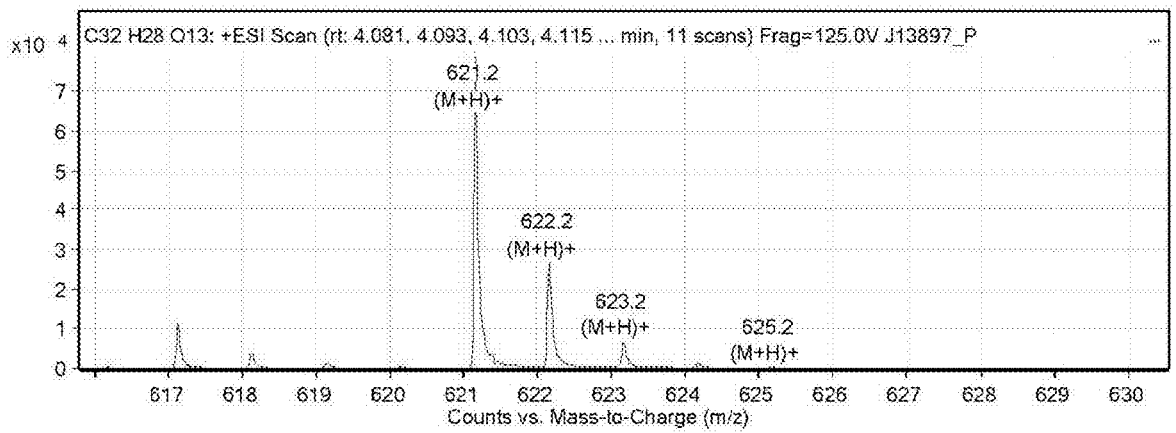
FIG. 22b: Mass Spectrum for the fragmentation of one methyl group from Bis(2,4-di-tert-butylphenyl)pentaerythritol diphosphate.
Figure 23A:
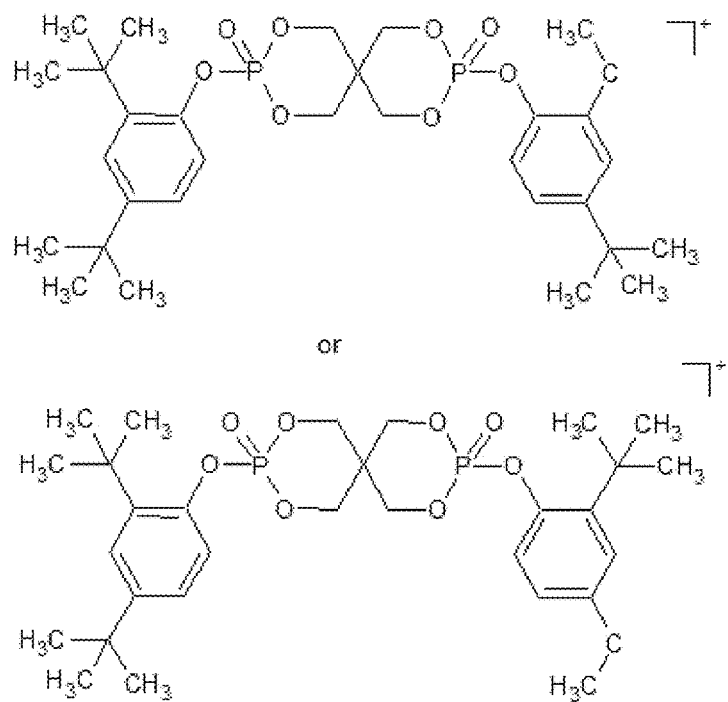
FIG. 23a: Structure of ions formed after fragmentation of two methyl groups from Bis(2,4-di-tert-butylphenyl)pentaerythritol diphosphate (Mass: 606.6).
Figure 23B:
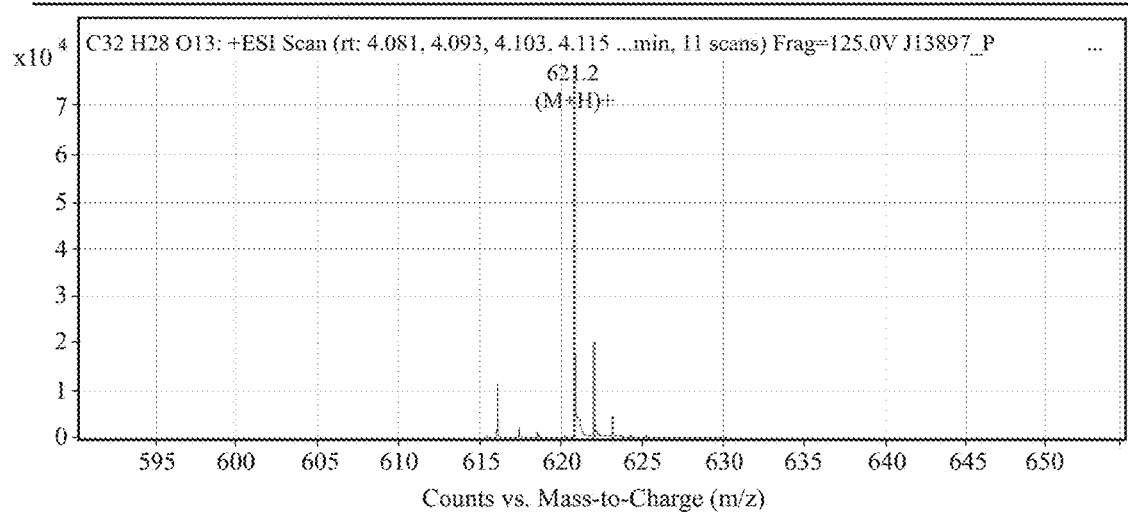
FIG. 23b: Mass Spectrum for the fragmentation of two methyl groups from Bis(2,4-di-tert-butylphenyl)pentaerythritol diphosphate.
Figure 24A:
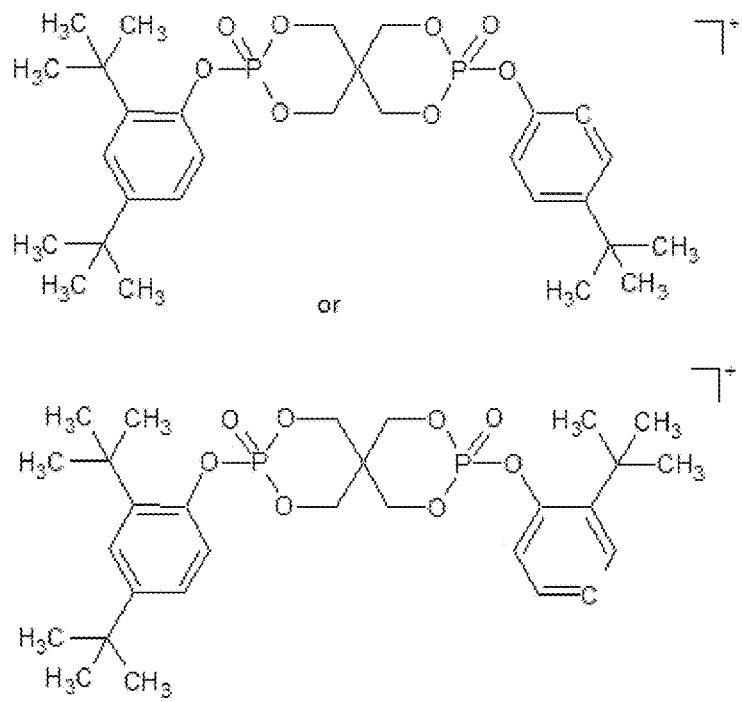
FIG. 24a: Structure of ions formed after fragmentation of one tert-butyl group from Bis(2,4-di-tert-butylphenyl)pentaerythritol diphosphate (Mass: 579.5).
Figure 24B:
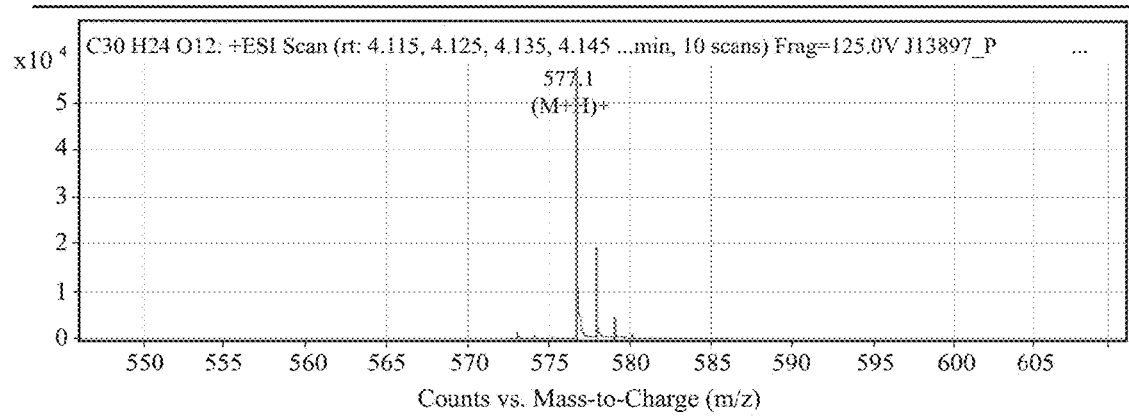
FIG. 24b: Mass Spectrum for the fragmentation of one tert-butyl group from Bis(2,4-di-tert-butylphenyl)pentaerythritol diphosphate.
Figure 25A:
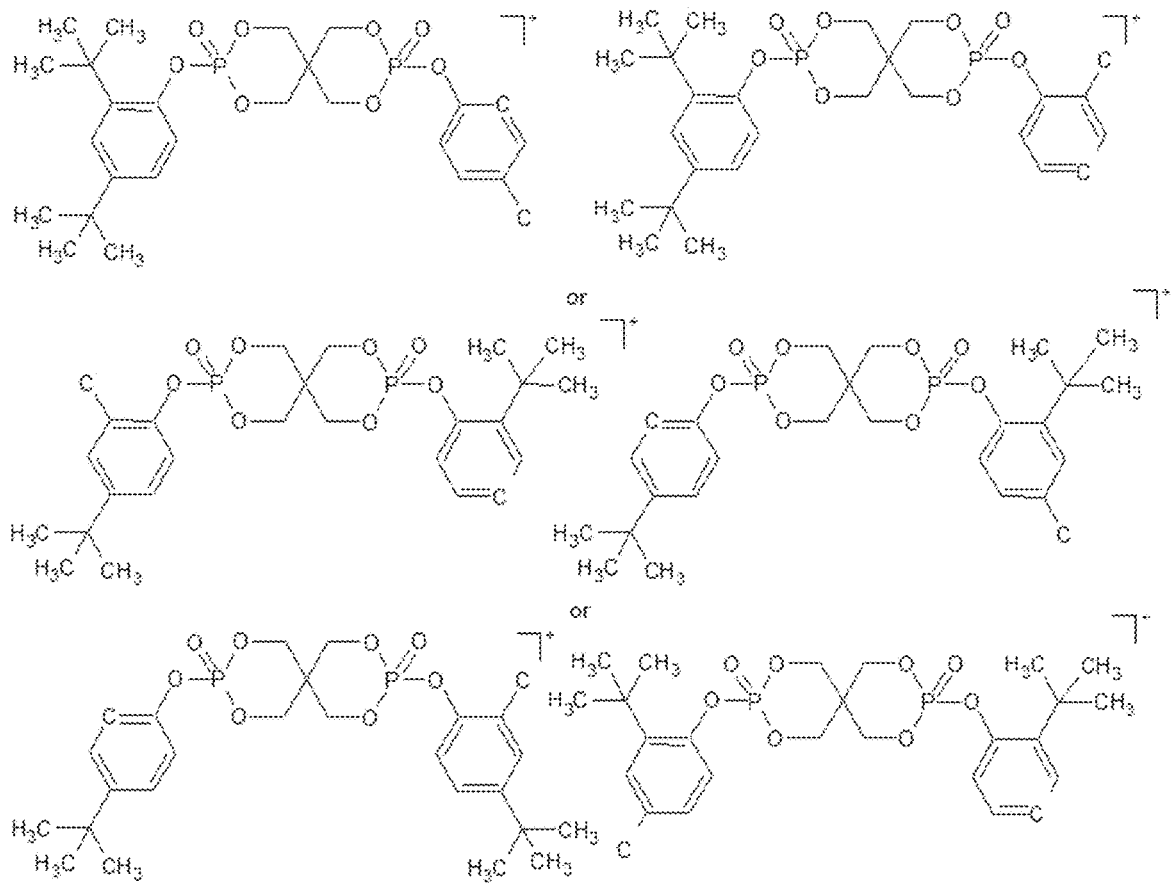
FIG. 25a: Structure of ions formed after fragmentation of one tert-butyl and three methyl groups from Bis(2,4-di-tert-butylphenyl)pentaerythritol diphosphate (Mass: 534.4).
Figure 25B:
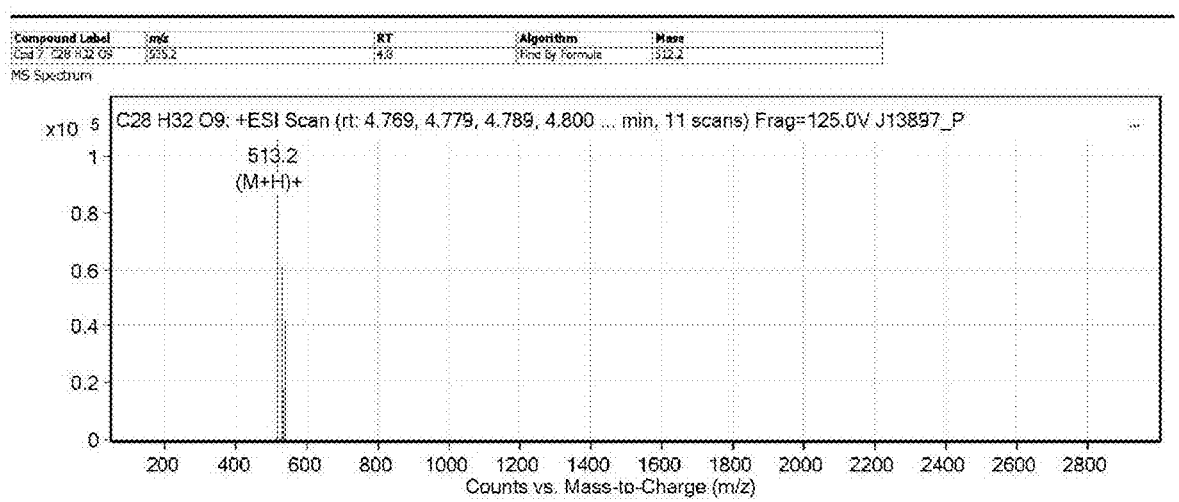
FIG. 25b: Mass Spectrum for the fragmentation of one tert-butyl and three methyl groups from Bis(2,4-di-tert-butylphenyl)pentaerythritol diphosphate.
Figure 26A:
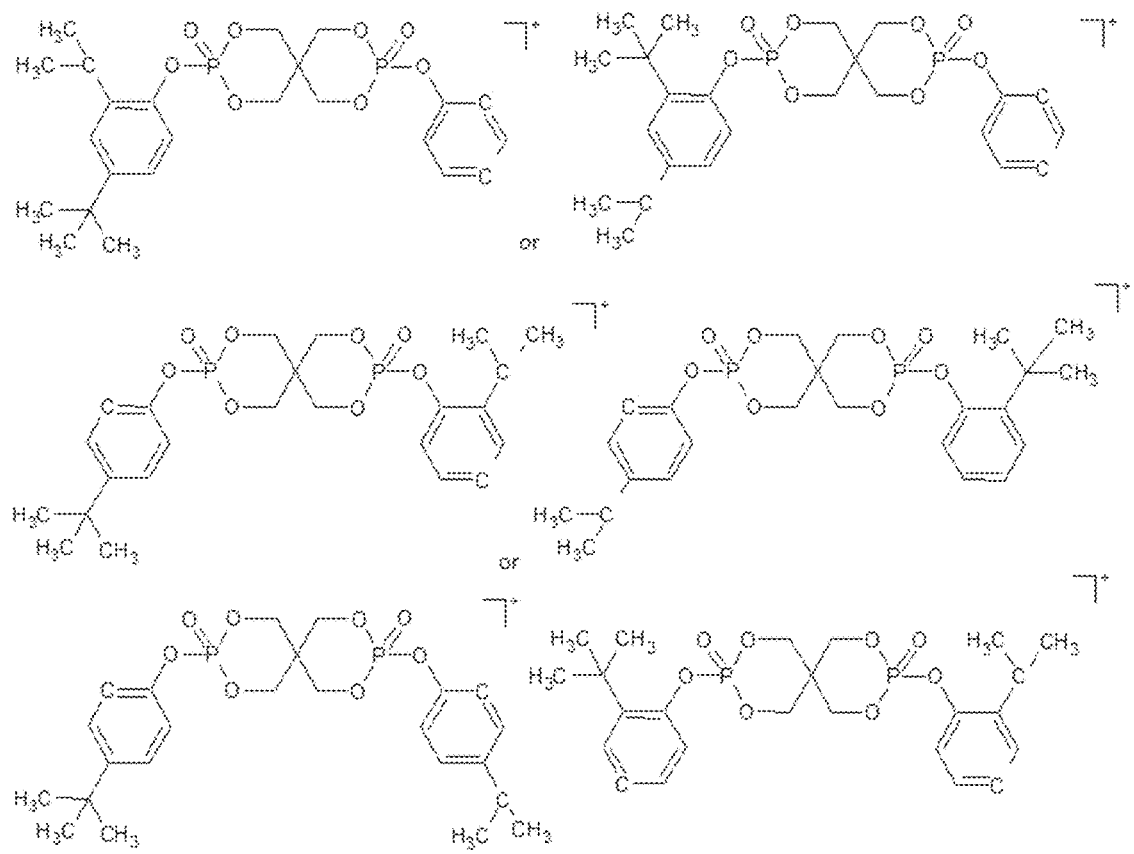
FIG. 26a: Structure of ions formed after fragmentation of two tert-butyl and one methyl groups from Bis(2,4-di-tert-butylphenyl)pentaerythritol diphosphate (Mass: 507.4).
Figure 26B:
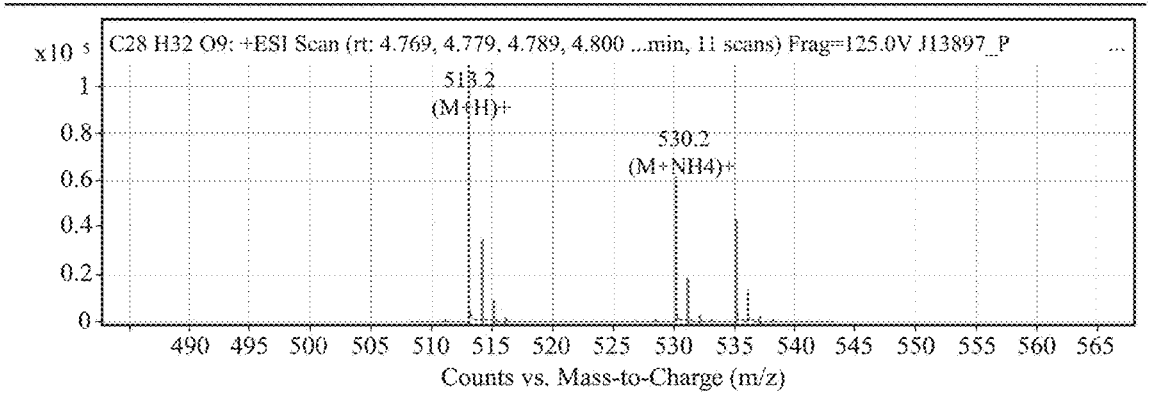
FIG. 26b: Mass Spectrum for the fragmentation of two tert-butyl and one methyl groups from Bis(2,4-di-tert-butylphenyl)pentaerythritol diphosphate.
Figure 27A:
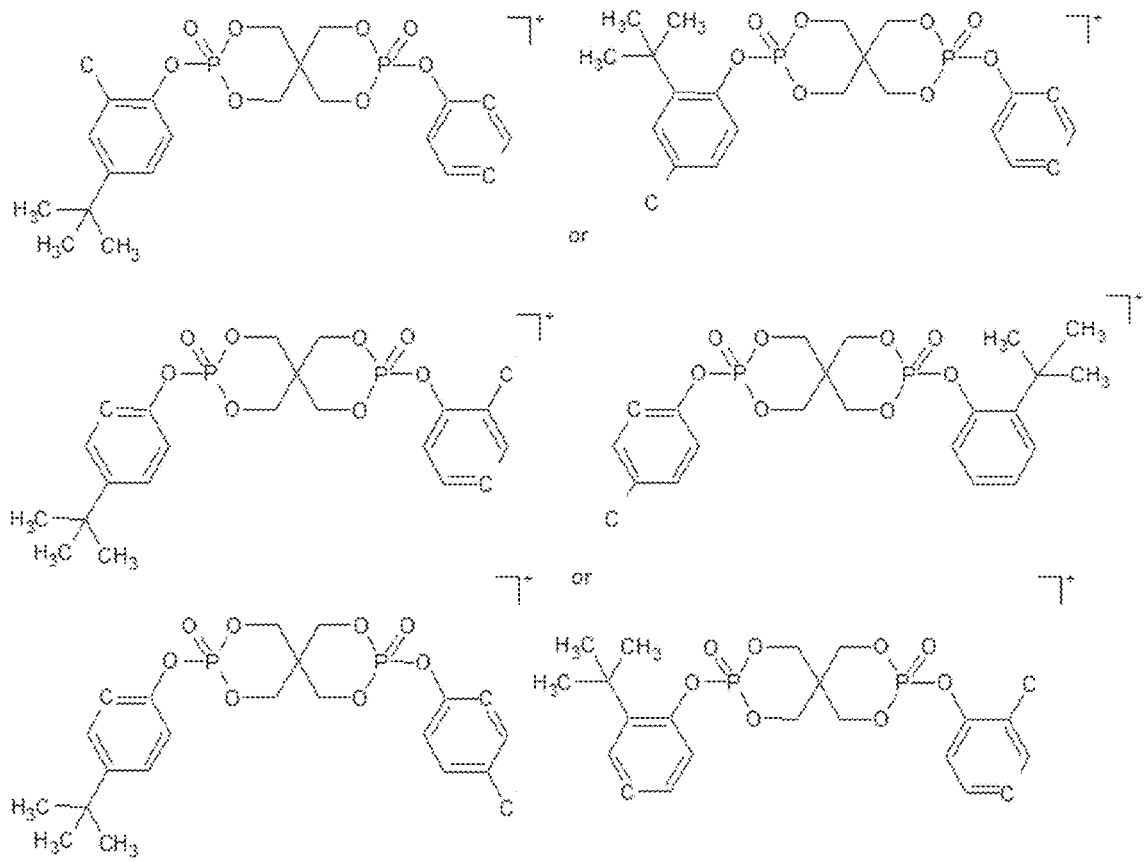
FIG. 27a: Structure of ions formed after fragmentation of two tert-butyl and three methyl groups from Bis(2,4-di-tert-butylphenyl)pentaerythritol diphosphate (Mass: 477.3).
Figure 27B:
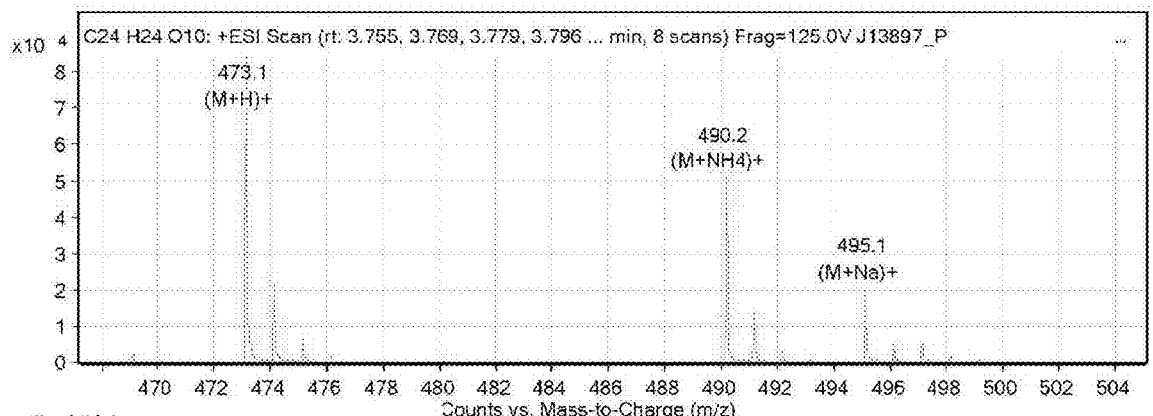
FIG. 27b: Mass Spectrum for the fragmentation of two tert-butyl and three methyl groups from Bis(2,4-di-tert-butylphenyl)pentaerythritol diphosphate.
Figure 28A:
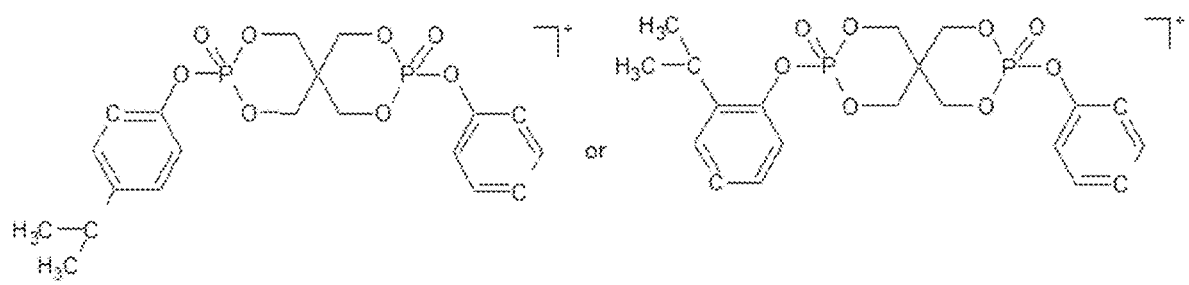
FIG. 28a: Structure of ions formed after fragmentation of three tert-butyl and one methyl groups from Bis(2,4-di-tert-butylphenyl)pentaerythritol diphosphate (Mass: 450.3).
Figure 28B:
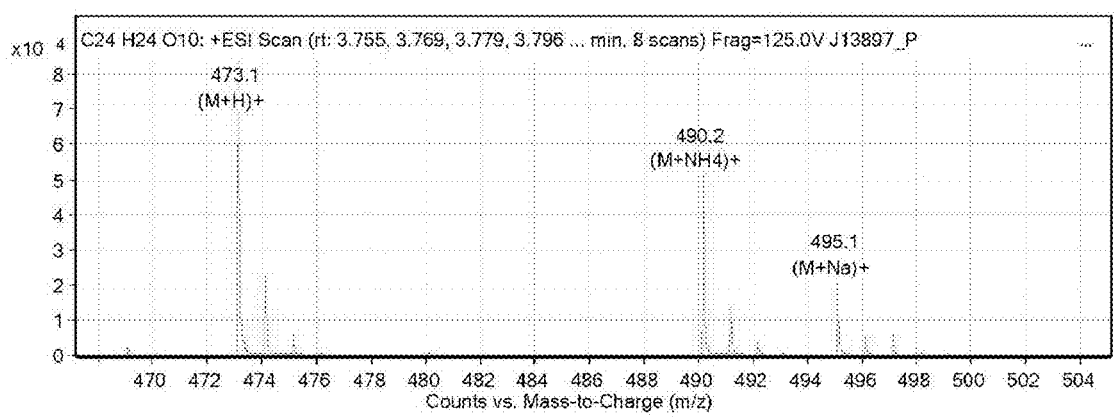
FIG. 28b: Mass Spectrum for the fragmentation of three tert-butyl and one methyl groups from Bis(2,4-di-tert-butylphenyl)pentaerythritol diphosphate.
Figure 29A:
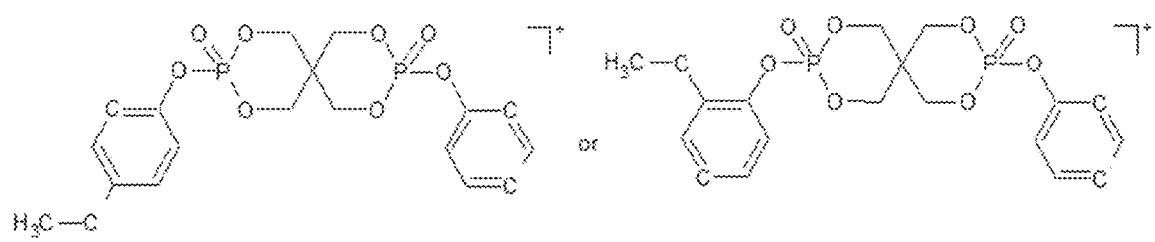
FIG. 29a: Structure of ions formed after fragmentation of three tert-butyl and two methyl groups from Bis(2,4-di-tert-butylphenyl)pentaerythritol diphosphate (Mass: 435.2).
Figure 29B:
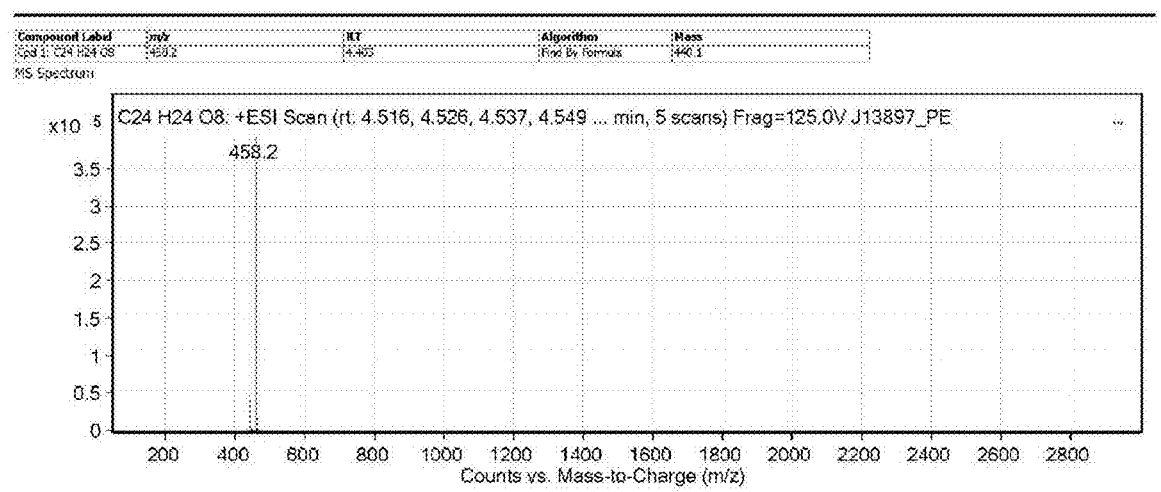
FIG. 29b: Mass Spectrum for the fragmentation of three tert-butyl and two methyl groups from Bis(2,4-di-tert-butylphenyl)pentaerythritol diphosphate.
Figure 30A:
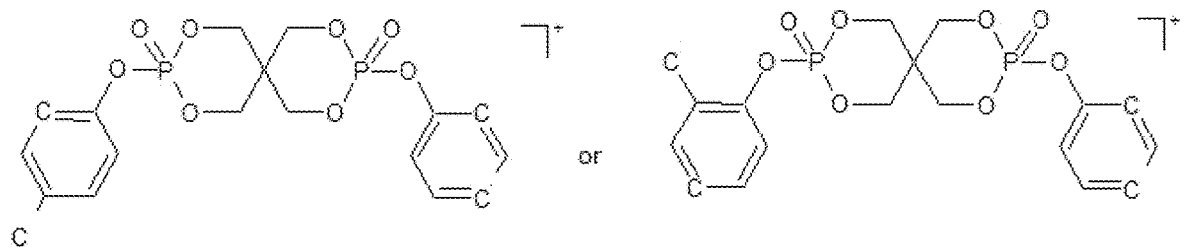
FIG. 30a: Structure of ions formed after fragmentation of three tert-butyl and three methyl groups from Bis(2,4-di-tert-butylphenyl)pentaerythritol diphosphate (Mass: 420.2).
Figure 30B:
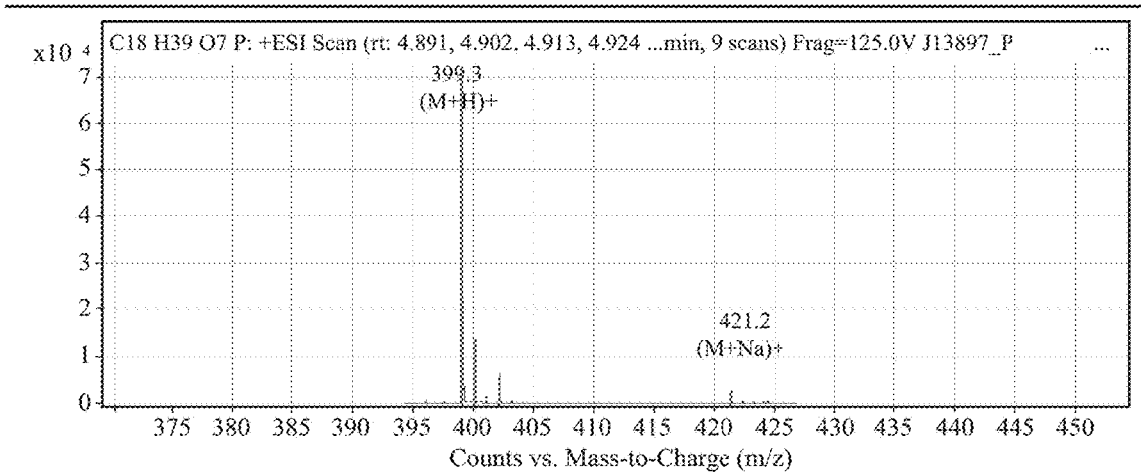
FIG. 30b: Mass Spectrum for the fragmentation of three tert-butyl and three methyl groups from Bis(2,4-di-tert-butylphenyl)pentaerythritol diphosphate.
Figure 31A:
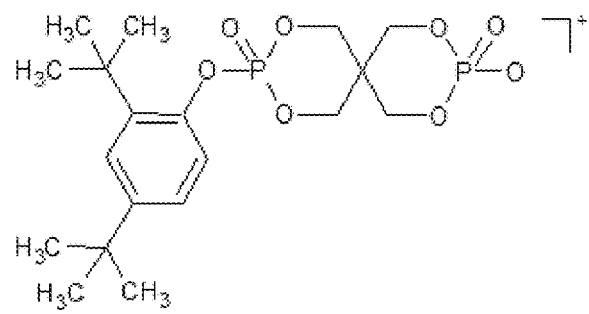
FIG. 31a: Structure of ion formed after fragmentation of one 2,4-di-tert-butylphenyl group from Bis(2,4-di-tert-butylphenyl)pentaerythritol diphosphate (Mass: 447.3).
Figure 31B:
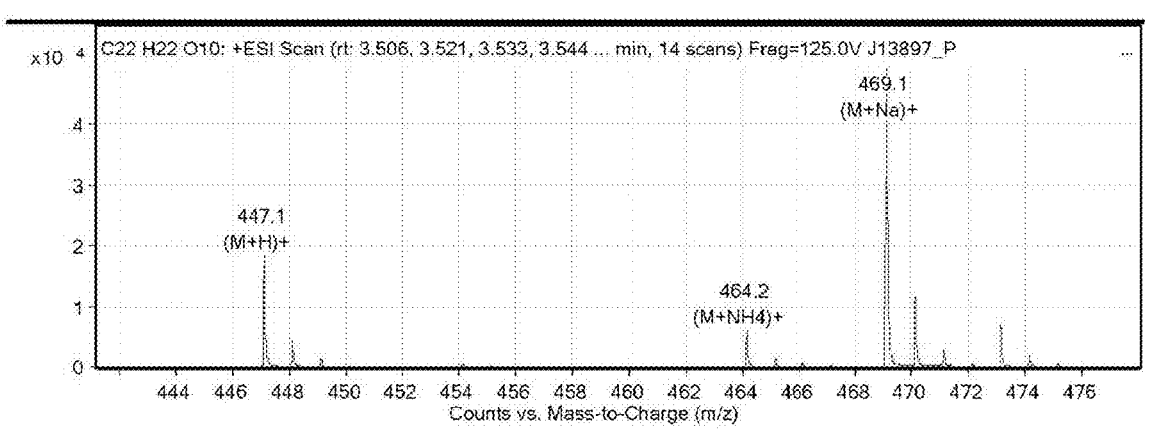
FIG. 31b: Mass Spectrum for the fragmentation of one 2,4-di-tert-butylphenyl group from Bis(2,4-di-tert-butylphenyl)pentaerythritol diphosphate.
Figure 32A:
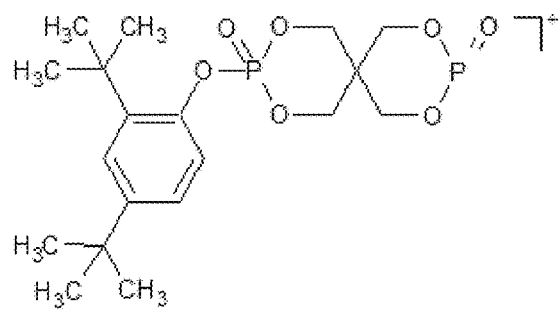
FIG. 32a: Structure of ion formed after fragmentation of one 2,4-di-tert-butylphenyoxy group from Bis(2,4-di-tert-butylphenyl)pentaerythritol diphosphate (Mass: 431.3).
Figure 32B:
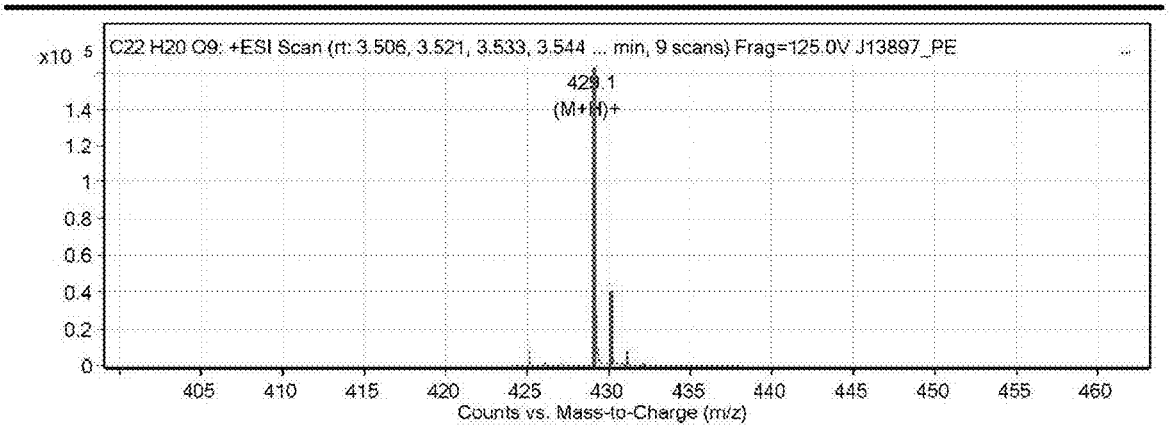
FIG. 32b: Mass Spectrum for the fragmentation of one 2,4-di-tert-butylphenyoxy group from Bis(2,4-di-tert-butylphenyl)pentaerythritol diphosphate.

The identification of the three compounds and the associated ion fragmentation and mass spectral analysis are as follows:

a) Bis(2,4-di-t-butylphenyl)pentaerythritol diphosphite with a molecular weight of 604.6 as evidenced from examining the fragment ions are presented in FIG. 2a to FIG. 1a and confirming their formation using their associated mass spectral analysis are presented in FIG. 2b to FIG. 11b.

b) Bis(2,4-di-t-butylphenyl)pentaerythritol monophosphate with a molecular weight of 620.6 as evidenced from examining fragment ions are presented in FIG. 14a to FIG. 20a and confirming their formation using their associated mass spectral analysis are presented in FIG. 14b to FIG. 20b.

c) Bis(2,4-di-t-butylphenyl)pentaerythritol diphosphate with a molecular weight of 636.6 as evidenced from examining fragment ions are presented in FIG. 22a to FIG. 32a and confirming their formation using their associated mass spectral analysis as presented in FIG. 22b to FIG. 32b.

Table 1 provides a summary of the LCMS results of PET/PBT film with 0.1 wt. % Ultranox 626 powder.

TABLE 1

Summary of LCMS Results - PET/PBT Film with 0.1% Ultranox 626 added

| RT | Positive m/z | Negative m/z | Mass | Best Match | Score | Diff. | Possible ID |
|---|---|---|---|---|---|---|---|
| 2.245 | | 209.0047 | 210.0528 | $C_{10}H_{19}O_5$ | 77.76 | 4.11 | Polyethylene terephthalate (PET) related |
| 3.529 | 429.1183 | | 428.1107 | $C_{22}H_{20}O_9$ | 80.46 | −0.64 | PET/Polybutylene terephthalate (PBT) related |
| 3.53 | 447.1285 464.1551 469.1106 | 491.1187 | 446.1213 | $C_{22}H_{22}O_{10}$ | 80.35 | −1.78 | |
| 3.561 | 403.1025 420.1289 425.0841 | 401.0874 | 402.0951 | $C_{20}H_{18}O_9$ | 82 | −1.35 | |
| 3.609 | | 178.0266 357.0612 | 358.0689 | $C_{18}H_{14}O_8$ | 91.25 | 1.52 | |
| 3.778 | 473.1447 490.1709 495.1261 | | 472.1369 | $C_{24}H_{24}O_{10}$ | 97.1 | 0.4 | |
| 3.862 | 429.1185 446.1448 451.1000 | | 428.1107 | $C_{22}H_{20}O_9$ | 92.52 | −0.67 | |
| 4.104 | | 683.1608 | 684.169 | $C_{33}H_{32}O_{16}$ | 98.36 | 1.5 | |
| 4.111 | 621.1608 | | 620.153 | $C_{32}H_{28}O_{13}$ | 99.32 | −0.69 | |
| 4.111 | 639.1708 656.1966 661.1526 | | 638.1636 | $C_{32}H_{30}O_{14}$ | 94.97 | 0.82 | |
| 4.152 | 595.1445 612.1716 617.1266 | 593.1298 639.1623 | 594.1373 | $C_{30}H_{26}O_{13}$ | 91.16 | −1.11 | |
| 4.151 | 577.1343 | | 576.1268 | $C_{30}H_{24}O_{12}$ | 92.53 | −0.39 | 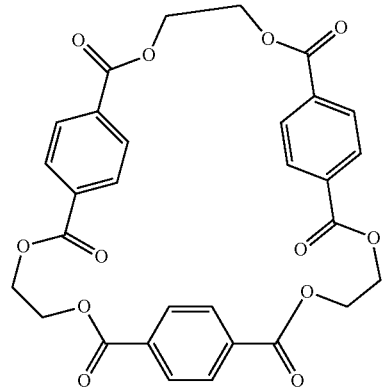 PET trimer |
| 4.198 | 551.1204 568.1454 573.1019 | 274.0482 549.1033 595.1353 | 550.1111 | $C_{28}H_{22}O_{12}$ | 96.79 | −1.03 | PET/PBT related |
| 4.289 | 531.2226 553.2041 | | 530.2152 | $C_{28}H_{34}O_{10}$ | 89.63 | 0.02 | |

TABLE 1-continued
Summary of LCMS Results - PET/PBT Film with 0.1% Ultranox 626 added
| RT | Positive m/z | Negative m/z | Mass | Best Match | Score | Diff. | Possible ID |
|---|---|---|---|---|---|---|---|
| 4.408 | 441.1546<br>458.1810<br>463.1364 | | 440.1471 | $C_{24}H_{24}O_8$ | 93.44 | −0.5 | 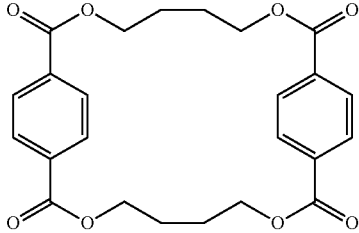<br>PBT dimer |
| 4.405 | 369.0973<br>386.1149 | | 368.0896 | $C_{20}H_{16}O_7$ | 92.31 | −1.08 | PET/PBT related |
| 4.485 | | 785.1728 | 786.1796 | $C_{40}H_{34}O_{17}$ | 92.71 | 0.86 | 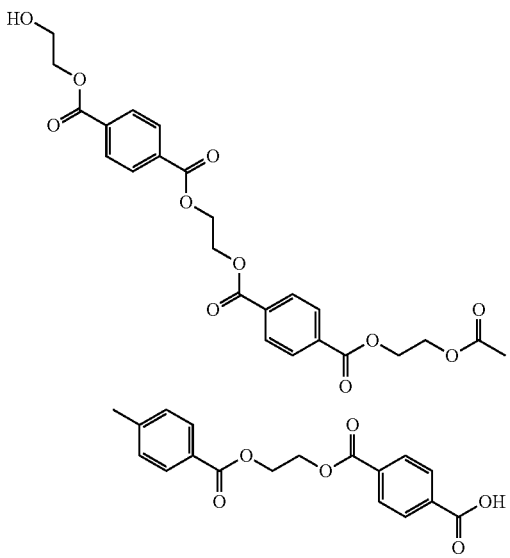<br>PET tetramer |
| 4.519 | 621.1600<br>638.1869<br>643.1423 | | 620.153 | $C_{32}H_{28}O_{13}$ | 97.15 | −0.44 | PET/PBT related |
| 4.538 | | 741.146 | 742.1534 | $C_{38}H_{30}O_{16}$ | 98.75 | 0.38 | |
| 4.599 | 594.1607 | | 576.1268 | $C_{30}H_{24}O_{12}$ | 99.23 | −0.51 | PET trimer |
| 4.657 | | 439.139 | 440.1471 | $C_{24}H_{24}O_8$ | 95.37 | 2.22 | PBT dimer isomer |
| 4.718 | 813.2013<br>830.2286<br>835.1832 | | 812.1952 | $C_{42}H_{36}O_{17}$ | 99.45 | 0.62 | PET/PBT related |
| 4.799 | 513.2126<br>530.2387<br>535.1937 | | 512.2046 | $C_{28}H_{32}O_9$ | 79.92 | −0.99 | |

TABLE 1-continued
Summary of LCMS Results - PET/PBT Film with 0.1% Ultranox 626 added
| RT | Positive m/z | Negative m/z | Mass | Best Match | Score | Diff. | Possible ID |
|---|---|---|---|---|---|---|---|
| 4.921 | 399.2513<br>421.2316 | | 398.2433 | $C_{18}H_{39}O_7P$ | 80.36 | −1.37 | 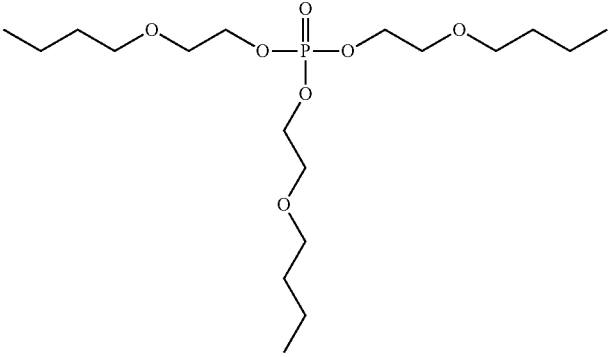<br>Phosphoric acid, tri(butoxyethyl) ester |
| 4.956 | 786.2026 | | 768.169 | $C_{40}H_{32}O_{16}$ | 87.82 | 0.2 | 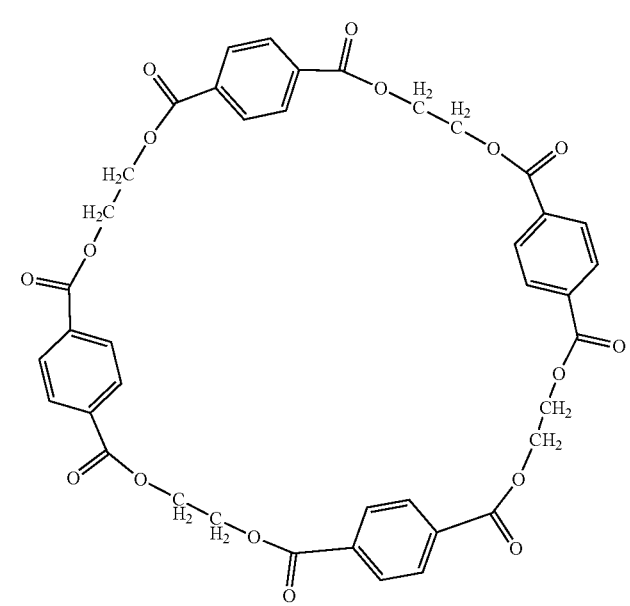 [SMILES: O=C1OCCOC(=O)c2ccc(cc2)C(=O)OCCOC(=O)c2ccc(cc2)C(=O)OCCOC(=O)c2ccc(cc2)C(=O)OCCOC(=O)c2ccc1cc2] |
| 5.185 | 661.2276<br>678.2544<br>683.2100 | | 660.2207 | $C_{36}H_{36}O_{12}$ | 89.92 | 0 | 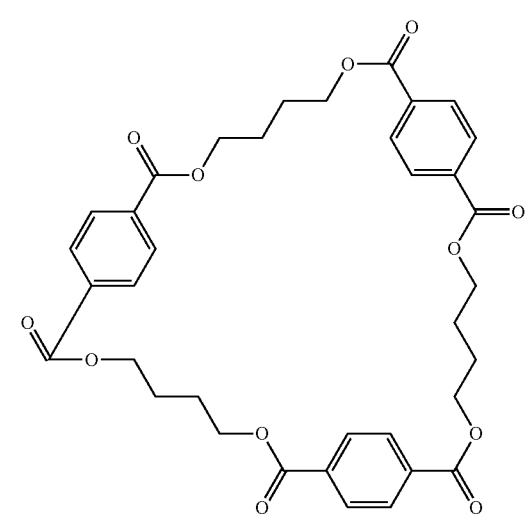<br>PBT trimer |

TABLE 1-continued

Summary of LCMS Results - PET/PBT Film with 0.1% Ultranox 626 added

| RT | Positive m/z | Negative m/z | Mass | Best Match | Score | Diff. | Possible ID |
|---|---|---|---|---|---|---|---|
| 5.341 | 881.2995<br>898.3274<br>903.2821 | | 880.2942 | $C_{48}H_{48}O_{16}$ | 89.98 | 0.95 | 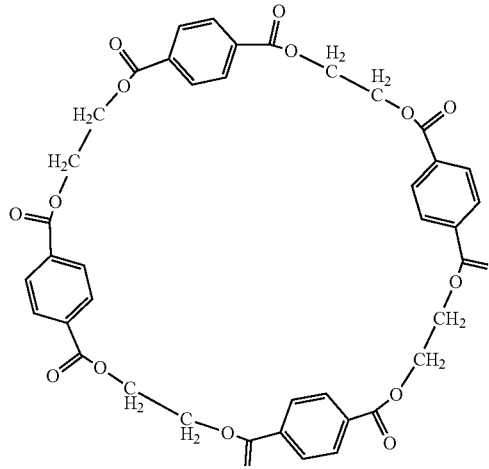<br>PBT tetramer |
| 5.545 | 1118.3995 | | 1100.3678 | $C_{60}H_{60}O_{20}$ | 97.16 | 2.06 | 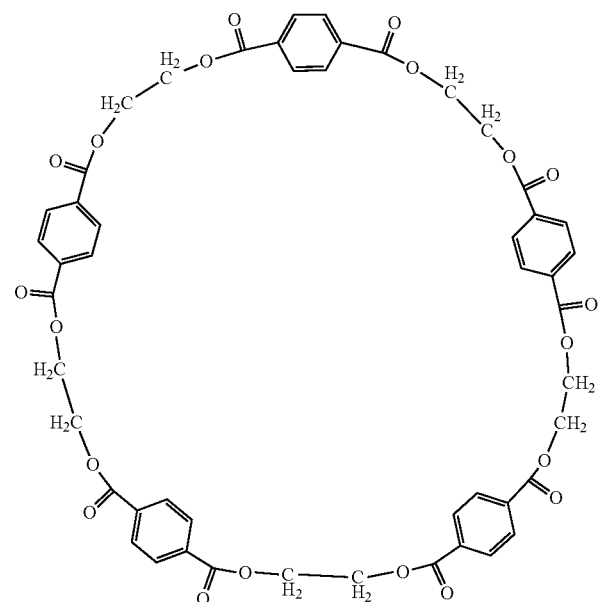<br>PBT oligomer |

Example 10: Analysis of Ultranox 626 Derivatives in the 10 wt % Ultranox Masterbatch or Ultranox 626 Pellet (Also Described as Ultranox 626 Powder Melt Blended with PET Forming a 10 wt % Ultranox 626 Masterbatch in PET) by $^{13}$C CPMAS NMR and $^{31}$P MAS NMR The melt blended pellets of PET homopolymer PQB7-76 with blushing-retardant or blushing controlling component which is a derivative of Ultranox 626 from Addivant and the two components are in the ratio of 90:10 are analyzed using both $^{13}$C CPMAS NMR and the $^{31}$P MAS NMR.

The $^{13}$C NMR spectrum of Ultranox 626 Pellet sample was obtained on the 360-1 instrument. The sample spectrum was acquired on a Tecmag Redstone System with a 363 MHz Oxford Magnet (operating at 8.5 Tesla). A 7 mm Doty XC CPMAS probe was used. Data were collected using TMNR software and processed using Acorn NUTS 2D Professional version 20070706.

Figure 33:
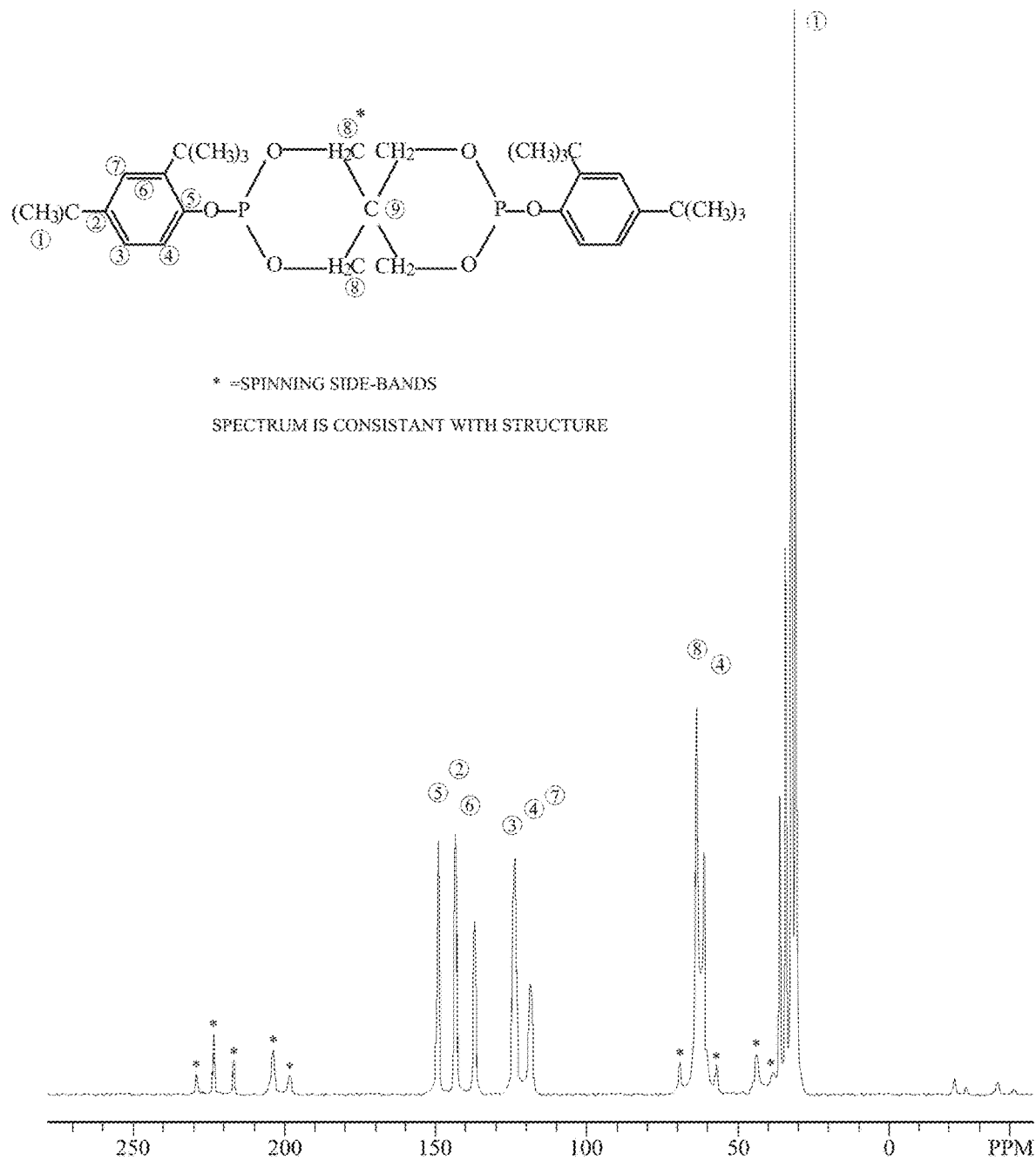
FIG. 33: $^{13}$C NMR spectrum of Ultranox 626 powder.
Figure 34:
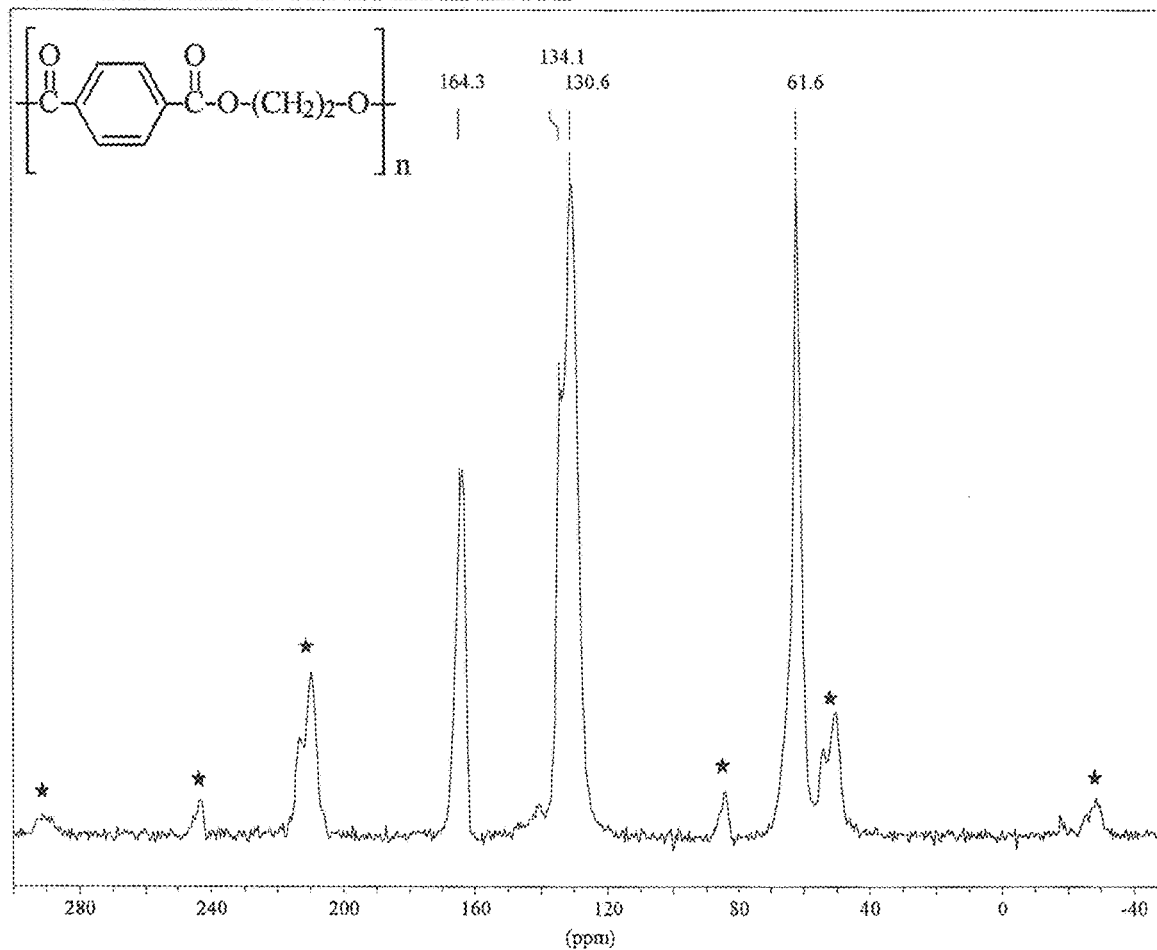
FIG. 34: $^{13}$C NMR spectrum of PET from published literature.
Figure 35:
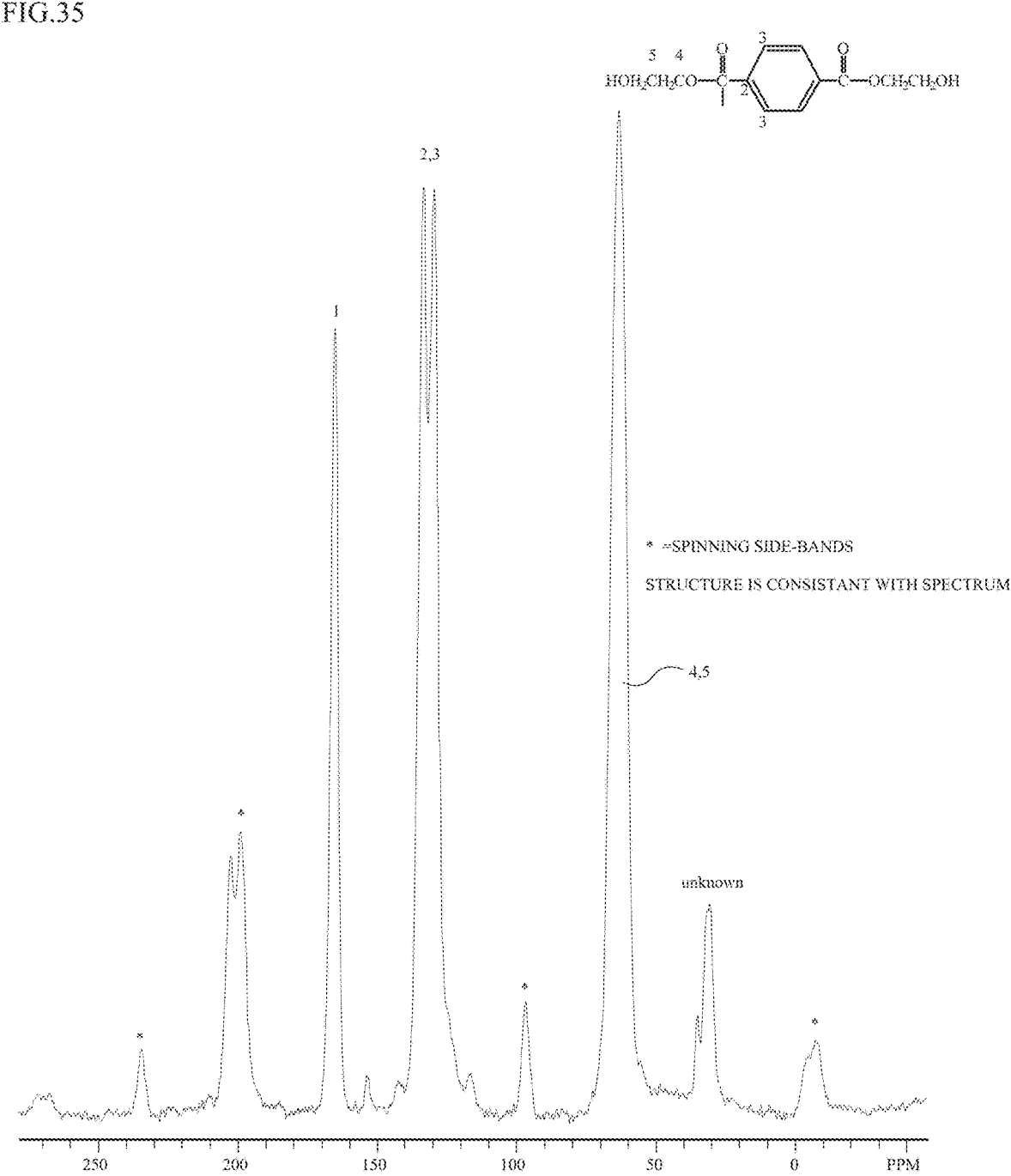
FIG. 35: $^{13}$C CPMAS NMR spectrum of Ultranox 626 Pellet (90/10 PET/modified Ultranox 626 powder).

The $^{13}$C CPMAS NMR spectrum of Ultranox 626 Pellet sample is consistent with the structure of PET, showing multiple C-atom related peaks of Ultranox 626 Pellet overlapping with PET around 61, 130, 134 and 164 ppm as FIGS. 33 and 34.

Figure 36:
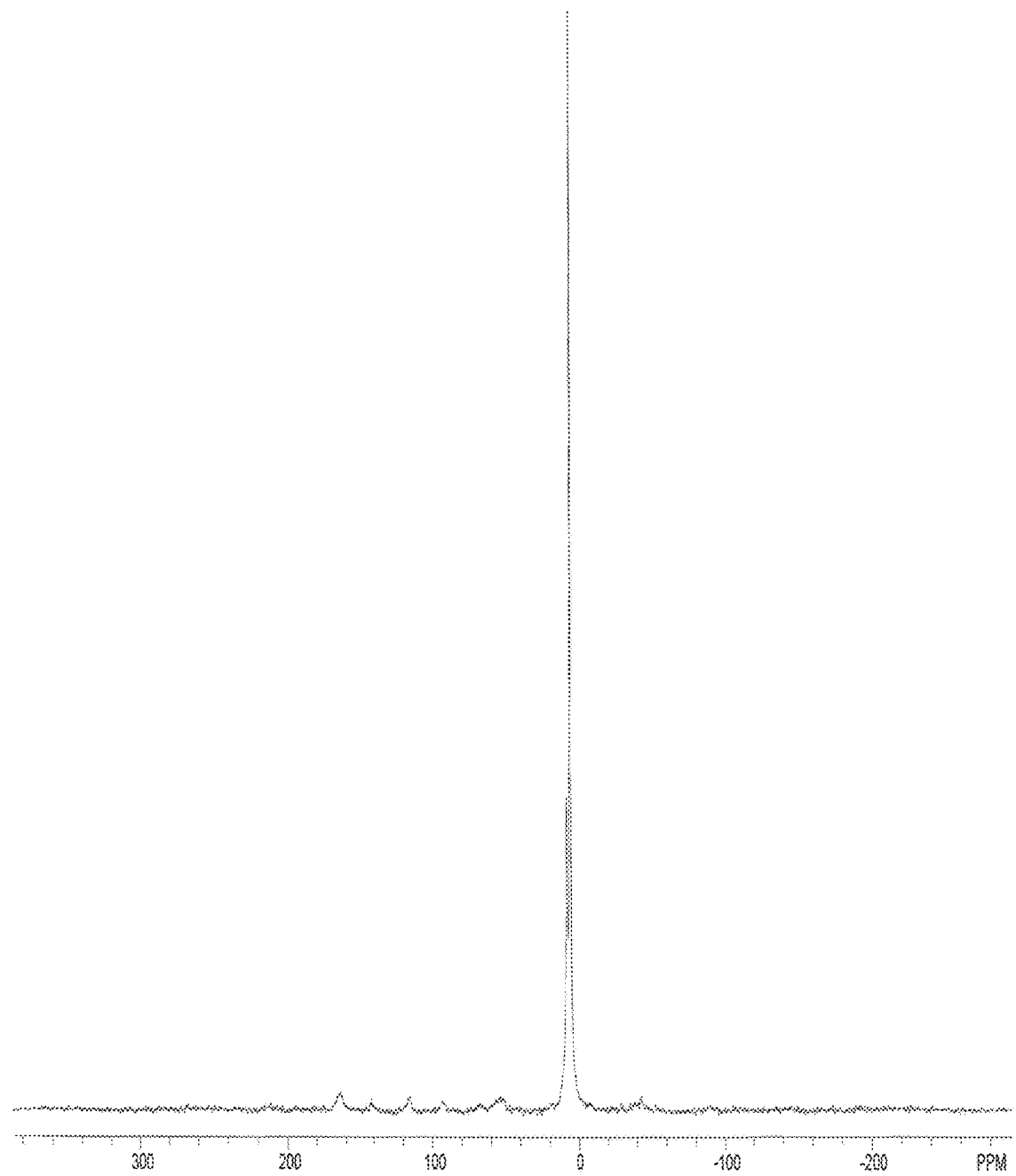
FIG. 36: $^{31}$P NMR spectrum of Ultranox 626 pellet (90/10 PET/modified Ultranox 626 powder).

The Pentaerythritol structure of Bis(2,4-di-tert-butylphenyl)pentaerythritol diphosphite in Ultranox 626 Powder would show or be detected about 65-60 ppm in the $^{13}$C NMR of Ultranox 626 Pellet (90-10 PET-modified Ultranox 626 Powder) but they overlap with the peaks from PET as shown in FIG. 36.

Figure 37:
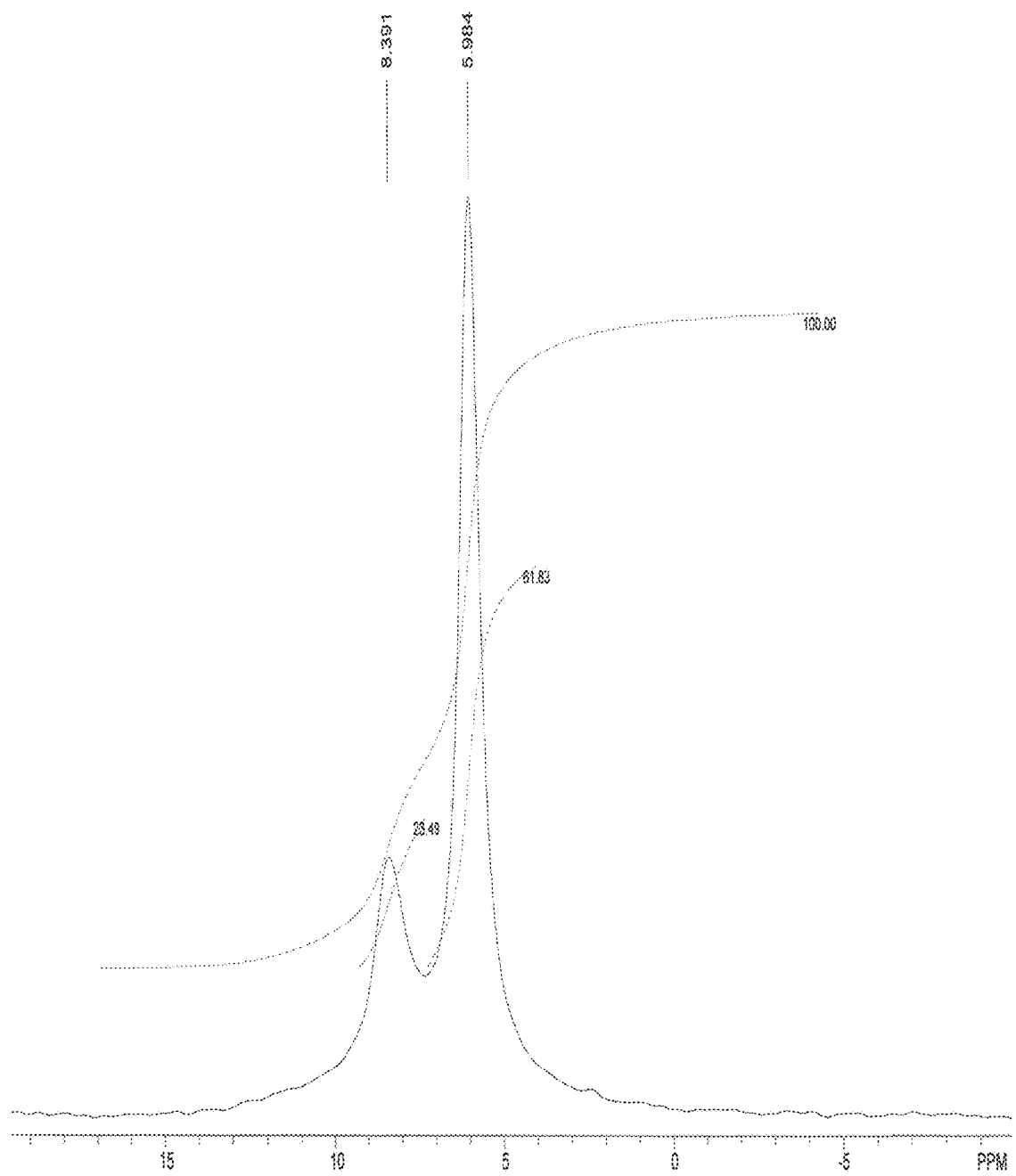
FIG. 37: $^{31}$P NMR spectrum of Ultranox 626 pellet (90/10 PET/modified Ultranox 626 powder) with expanded x-axis.

The main peaks from $^{31}$P MAS NMR spectrum of Ultranox 626 pellet shown in FIG. 37 are at 8.4 and 6.0 ppm, consistent with monophosphate and orthophosphate as shown in Table 2 with Chemical Shift range for different phosphorous compounds.

Figure 38:
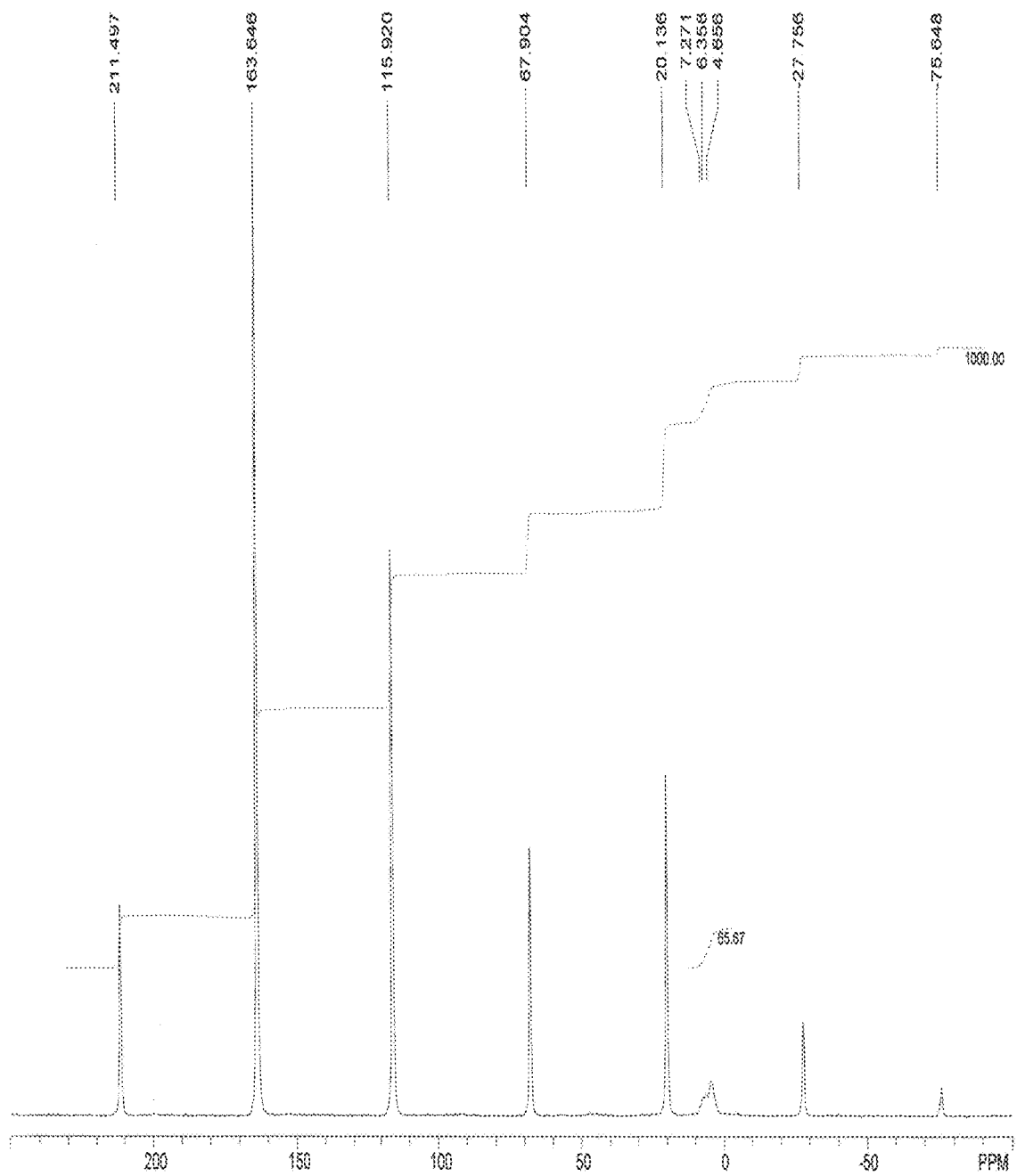
FIG. 38: $^{31}$P NMR spectrum of pure unmodified Ultranox 626 powder.
Figure 39:
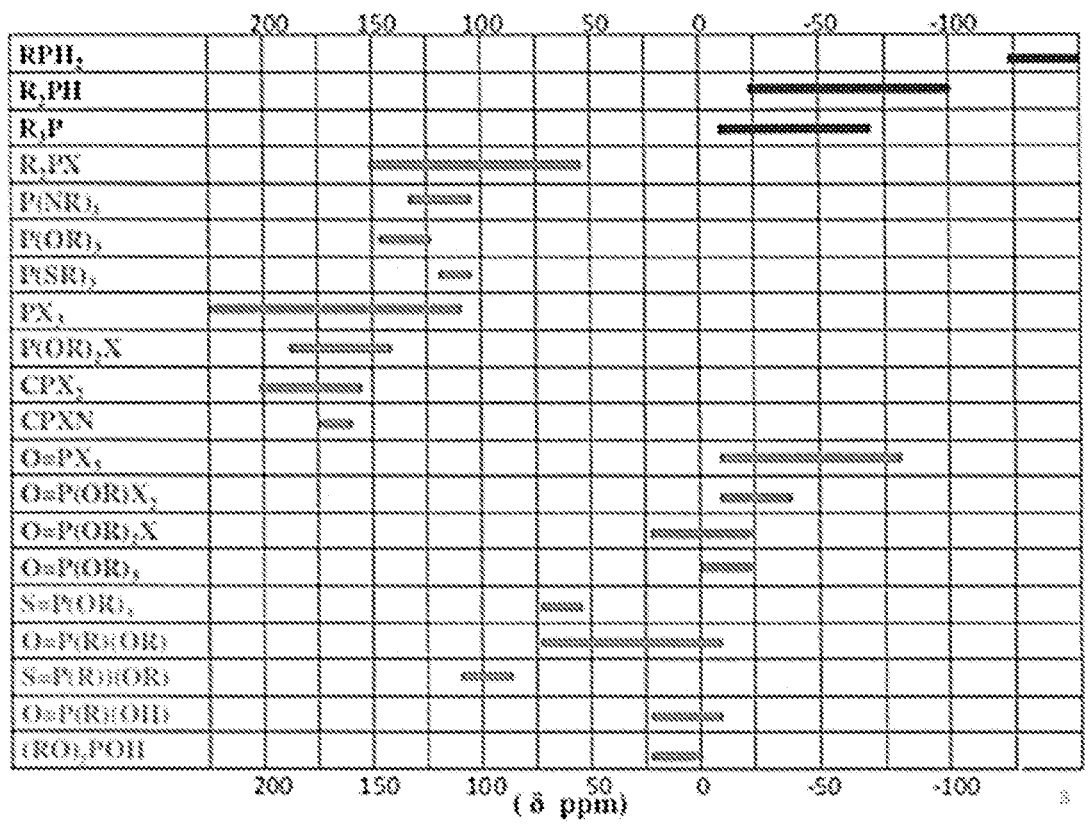

There are also some small peaks at 50 to 150 ppm, likely phosphite from pure Ultranox 626 but their concentration is very low and significantly reduced when compared to the phosphite peak at 116 ppm from $^{31}$P MAS NMR spectrum of pure unmodified Ultranox 626 powder as shown in FIG. 38.

$^{13}$C NMR and the $^{31}$P NMR data shows that the melt blended pellets of PET homopolymer and blushing-retardant or blushing controlling component (which is a derivative of Ultranox 626), are consistent with PET (polyethylene terephthalate), orthophosphate and monophosphate.

The NMR results show that pellets of Ultranox 626 powder melt blended with PET forming a 10 wt % Ultranox 626 masterbatch in PET or (the melt blended pellets of PET homopolymer and blushing-retardant or blushing controlling component) contains PET and bis(2,4-di-tert-butylphenyl)pentaerythritol orthophosphate and/or bis(2,4-di-tert-butylphenyl)pentaerythritol monophosphate Ultranox 626 (bis(2,4-di-tert-butylphenyl)pentaerythritol diphosphite) powder component has been transformed or derivatized into bis(2,4-di-tert-butylphenyl)pentaerythritol orthophosphate and/or bis(2,4-di-tert-butylphenyl)pentaerythritol monophosphate. The presence and concentration of the phosphite from the pure Ultranox 626 powder is very low and significantly reduced when compared to their concentration in Ultranox 626 powder.

The invention claimed is:

1. A method of reducing blushing on a film laminated to a metal, comprising:
   a. exposing the film to a retort process, and
   b. obtaining a blush-free film after the retort process;
   c. wherein the film comprises a polyethylene terephthalate (PET), a polybutylene terephthalate (PBT) and a derivative of bis(2,4-di-tert-butylphenyl) pentaerythritol diphosphite, and
   d. wherein the derivative comprises a phosphate and has a higher molecular weight than that of the bis(2,4-di-tert-butylphenyl) pentaerythritol diphosphite.

2. The method of claim 1, wherein the derivative has a molecular weight greater than 604.

3. The method of claim 1, wherein the derivative has a molecular weight in the range of about 605 to 700.

4. The method of claim 1, wherein the derivative has a molecular weight in the range of about 610 to 660.

5. The method of claim 1, wherein the derivative has a molecular weight in the range of about 620 to 640.

6. The method of claim 1, wherein the derivative comprises a monophosphate and a diphosphate.

7. The method of claim 6, wherein the monophosphate comprises bis(2,4-di-tert-butylphenyl) pentaerythritol monophosphate.

8. The method of claim 6, wherein the diphosphate comprises bis(2,4-di-tert-butylphenyl) pentaerythritol diphosphate.

9. The method of claim 1, wherein derivative comprises an orthophosphate.

10. The method of claim 1, wherein the PBT is at least about 40% by weight in the film.

11. The method of claim 10, wherein the PBT is about 40% to about 80% by weight in the film.

12. The method of claim 11, wherein the PBT is about 50% weight to about 70% in the film.

13. The method of claim 1, wherein the film is laminated on an exterior surface of a container.

14. The method of claim 1, wherein an average melting point of the PET in the film as measured by a differential scanning colorimeter (DSC) ranged from about 244.0° C. to about 250.0° C.

15. The method of claim 14, wherein the average melting point of the PET in the film ranged from 244.0° C. to 248.5° C.

16. The method of claim 1, wherein the film is laminated on an interior surface of a container.

17. The method of claim 1, wherein the film comprises a single layer.

18. The method of claim 1, wherein the film comprises at least a two layer.

19. The method of claim 1, wherein a thickness of the film is in a range of about 1 μm to about 80 μm.

* * * * *